United States Patent
Rao et al.

(10) Patent No.: US 11,224,007 B2
(45) Date of Patent: Jan. 11, 2022

(54) SYSTEM AND METHOD FOR SUPPORTING SIDELINK RADIO BEARERS

(71) Applicant: HUAWEI TECHNOLOGIES CO., LTD., Shenzhen (CN)

(72) Inventors: Jaya Rao, Ottawa (CA); Sophie Vrzic, Kanata (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 16/677,055

(22) Filed: Nov. 7, 2019

(65) Prior Publication Data

US 2020/0163005 A1 May 21, 2020

Related U.S. Application Data

(60) Provisional application No. 62/769,371, filed on Nov. 19, 2018.

(51) Int. Cl.
| | |
|---|---|
| *H04W 48/16* | (2009.01) |
| *H04W 76/27* | (2018.01) |
| *H04W 76/11* | (2018.01) |
| *H04W 4/40* | (2018.01) |
| *H04W 8/24* | (2009.01) |
| *H04W 92/18* | (2009.01) |

(52) U.S. Cl.
CPC ............ *H04W 48/16* (2013.01); *H04W 4/40* (2018.02); *H04W 8/24* (2013.01); *H04W 76/11* (2018.02); *H04W 76/27* (2018.02); *H04W 92/18* (2013.01)

(58) Field of Classification Search
CPC ..... H04W 48/16; H04W 76/11; H04W 76/27; H04W 4/40; H04W 8/24; H04W 92/18
USPC .......................................................... 370/329
See application file for complete search history.

(56) References Cited

U.S. PATENT DOCUMENTS

| | | | |
|---|---|---|---|
| 2014/0247802 A1 | 9/2014 | Wijting et al. | |
| 2016/0338095 A1* | 11/2016 | Faurie | H04W 28/0278 |
| 2017/0181206 A1* | 6/2017 | Lee | H04W 28/06 |
| 2018/0084497 A1* | 3/2018 | Jung | H04W 72/0406 |
| 2018/0092067 A1* | 3/2018 | Liu | H04W 72/048 |
| 2018/0255499 A1* | 9/2018 | Loehr | H04W 40/22 |
| 2019/0059019 A1* | 2/2019 | Wallentin | H04W 4/40 |

(Continued)

FOREIGN PATENT DOCUMENTS

| | | |
|---|---|---|
| WO | 2018029620 A1 | 2/2018 |
| WO | 2018062857 A1 | 4/2018 |

OTHER PUBLICATIONS

3GPP TSG RAN WG1 Meeting #95, R1-1813427:"Design aspects and requirements for QoS", Qualcomm Incorporated, Spokane, USA, Nov. 12-16, 2018, total 6 pages.

(Continued)

*Primary Examiner* — Mong-Thuy T Tran

(57) ABSTRACT

Embodiments of the invention provide methods and systems to support QoS for unicast and groupcast casting types using sidelink radio bearers over the NR PC5 interface. Embodiments of the invention provide methods and systems to configure and activate sidelink radio bearers using AS-level signaling between the Tx UE and Rx UEs over the NR PC5 interface. Embodiments of the invention provide methods and systems to perform resource allocation and resource reservation in a platoon for sidelink transmissions.

21 Claims, 28 Drawing Sheets

(56) References Cited

U.S. PATENT DOCUMENTS

| | | | |
|---|---|---|---|
| 2019/0215685 A1* | 7/2019 | Wang | H04W 8/30 |
| 2019/0289615 A1 | 9/2019 | Lee et al. | |
| 2019/0313359 A1* | 10/2019 | Lee | H04W 76/14 |
| 2019/0335532 A1* | 10/2019 | Kim | H04W 4/90 |
| 2019/0350045 A1* | 11/2019 | Lee | H04W 36/08 |
| 2020/0092692 A1* | 3/2020 | Wang | H04W 4/40 |
| 2020/0107236 A1* | 4/2020 | Tseng | H04W 4/50 |
| 2020/0145867 A1* | 5/2020 | Tseng | H04W 76/14 |
| 2020/0146094 A1* | 5/2020 | Wu | H04W 4/40 |
| 2021/0068120 A1* | 3/2021 | Jung | H04W 76/14 |
| 2021/0219105 A1* | 7/2021 | Fan | H04W 24/02 |

OTHER PUBLICATIONS

Huawei, HiSilicon, Potential AS layer impacts on SL connection setup and configuration in unicast. 3GPP TSG-RAN WG2 # 104, Spokane, USA, Nov. 12-16, 2018, R2-1816517, 4 pages.

Huawei, HiSilicon, Views on 5G V2X work in Rel-16. 3GPP TSG RAN#80, La Jolla, USA, Jun. 11-14, 2018, RP-180890, 12 pages.

Oppo, Discussion on Sidelink Unicast and Groupcast for NR-V2X. 3GPP TSG-RAN WG2 Meeting #104, Spokane, US, Nov. 12-16, 2018, R2-1816339, 5 pages.

Huawei, HiSilicon, Radio bearer configuration and management for NR sidelink. 3GPP TSG-RAN WG2 Meeting #104, Spokane, USA, Nov. 12-16, 2018, R2-1816522, 5 pages.

LG (rapporteur), Report of [103bis#38] SL unicast/groupcast (LG). 3GPP TSG-RAN WG2 #104, Spokane, USA, Nov. 12-16, 2018, R2-1818496, 20 pages.

* cited by examiner

US 11,224,007 B2

SYSTEM AND METHOD FOR SUPPORTING SIDELINK RADIO BEARERS

CROSS-REFERENCE TO RELATED APPLICATIONS

This application claims the benefit of the prior-filed provisional patent application in the United States, with application No. 62/769,371, filed on Nov. 19, 2018 and entitled "SYSTEM AND METHODS FOR SUPPORTING SIDELINK RADIO BEARERS", the contents of which are incorporated herein by reference in their entirety.

FIELD OF THE INVENTION

The present invention generally pertains to the field of communications networks, and particular embodiments or aspects relate to wireless communication networks which support sidelink radio bearers (SL-RB).

BACKGROUND

The 3rd Generation Partnership Project (3GPP) has proposed vehicle-to-everything (V2X) communication standards for Fifth Generation (5G) and New Radio (NR) systems. 5G and NR systems allow for sidelink communications between multiple vehicle user equipment (UEs) and between an infrastructure UE (e.g. road side unit (RSU)) and UEs. For supporting more advanced V2X sidelink communication, such as platooning and advanced driving, a more stringent and varied Quality of Service (throughput, latency and reliability) is required that is not satisfied by the prior art. As such, there is a need for efficiently handling the Quality of Service (QoS) of sidelink communications.

Accordingly, there may be a need for a system and method for supporting sidelink communications in wireless networks that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

Embodiments of the invention provide methods and systems to support QoS for unicast and groupcast transmissions using sidelink radio bearers over the Proximity Services (ProSe) NR PC5 interface. Embodiments of the invention provide methods and systems to configure and activate sidelink radio bearers using access stratum (AS)-level signaling between a Transmitting (Tx) UE and Receiving (Rx) UEs over the NR PC5 interface. Embodiments of the invention provide methods and systems to perform resource allocation and resource reservation in a platoon for sidelink transmissions.

An aspect of the disclosure provides a method for configuring an AS-layer for sidelink data communications. The method includes: transmitting, by a first UE to a second UE, an access stratum (AS)-layer configuration using a preconfigured sidelink signaling radio bearer; and receiving, by the first UE, an AS-layer configuration complete message sent by the second UE using a preconfigured sidelink signaling radio bearer, the AS-layer configuration complete message indicating the AS-layer has been configured for sidelink data communications.

In another aspect, the method includes, prior to transmitting the AS-layer configuration, receiving, by the first UE from the second UE, an indication of second UE's capability using the preconfigured sidelink signaling radio bearer.

In another aspect, the method includes transmitting a request, by the first UE to the second UE, for the second UE's capability; and receiving, by the first UE from the second UE, an indication of second UE's capability using the preconfigured sidelink signaling radio bearer.

In another aspect, the AS-layer configuration comprises at least one of: UE-Identifier (ID), Group-ID, sidelink component carrier configuration, SL-RB configuration for data communications, and resource allocation configuration.

In another aspect, the preconfigured sidelink signaling radio bearer is a PC5 radio resource control (RRC) interface.

In another aspect, the method includes transmitting, by the first UE to the second UE, a AS-layer configuration modification message to modify the AS-layer configuration.

In another aspect, the method includes, prior to the transmitting: transmitting, by the first UE to a radio access network (RAN) node in radio resource control (RRC) signaling, UE capability information of the first UE for supporting sidelink data communications; and receiving, by the first UE from the RAN node in the radio resource control (RRC) signaling, configuration information for the sidelink signaling radio bearer; and configuring the sidelink signaling radio bearer based on the received configuration information to produce the preconfigured sidelink signaling radio bearer.

In another aspect, the method includes receiving in the RRC signaling, configuration information for the sidelink data radio bearer; and configuring the sidelink data radio bearer based on the received configuration information for the sidelink data radio bearer, wherein the configuration information for the sidelink data radio bearer includes: at least one default sidelink data radio bearer to support unicast sidelink transmissions; and at least one default sidelink data radio bearer to support groupcast sidelink transmissions.

In another aspect, the method includes, prior to the transmitting: receiving, by the first UE from the RAN node, in a system information block (SIB), configuration information for the sidelink signalling radio bearer; and configuring the sidelink signaling radio bearer based on the received configuration information for the sidelink signalling radio bearer to produce the preconfigured sidelink signaling radio bearer.

In another aspect, the method includes receiving in the SIB, configuration information for the sidelink data radio bearer; and configuring the sidelink data radio bearer based on the received configuration information for the sidelink data radio bearer, wherein the configuration information for the sidelink data radio bearer includes: at least one default sidelink data radio bearer to support unicast sidelink transmissions; and at least one default sidelink data radio bearer to support groupcast sidelink transmissions.

Another aspect of the disclosure provides a user equipment (UE) comprising: a processor; a memory storing machine readable instructions which, when executed by the processor cause the UE to: transmit to a second UE, an access stratum (AS)-layer configuration using a preconfigured sidelink signaling radio bearer; and receive, from the second UE, an AS-layer configuration complete message sent by the second UE using a preconfigured sidelink signaling radio bearer, the AS-layer configuration complete message indicating the AS-layer has been configured for sidelink data communications.

An aspect of the disclosure provides a method of configuring a sidelink radio bearer (SL-RB) in an electronic device for communication via sidelink transmissions. The electronic device may be a road side unit (RSU), a UE, a vehicle UE (V-UE) or an infrastructure UE (I-UE). The method includes receiving a sidelink radio-bearer configuration message sent by an authorized UE, the configuration message including information to update pre-configured SL-RB parameters and an operation status information indicating the status of the SL-RB. The method further includes communicating using the SL-RB based on the SL-RB configuration message.

Another aspect of the disclosure provides a method of configuring a sidelink radio bearer (SL-RB) in a UE. The method includes receiving a SL-RB configuration message sent by an authorized UE and an operation status message indicating a status of the SL-RB, the SL-RB configuration message including information to update pre-configured SL-RB parameters. The method further includes communicating using the updated SL-RB configuration. In some embodiments, the SL-RB parameters are pre-configured by receiving a sidelink radio bearer pre-configuration message sent by a gNB (i.e., RAN node), the pre-configuration message including information indicative of a default mapping between sublayers in the L2 protocol stack and the pre-configured SL-RB parameters. In some embodiments, the method further includes pre-configuring, based on the sidelink radio bearer pre-configuration message, at least the SL-RB. In some embodiments, the SL-RB configuration message specifies a mapping rule to map between the upper layer QoS indicators and the SL-RBs. In some embodiments, the SL-RB pre-configuration is received via radio resource control (RRC) message sent by gNB. In some embodiments, the SL-RB configuration message is received in a first sidelink RRC message and the SL-RB operation status message is received in the second sidelink RRC message sent by the authorized UE. In some embodiments, the SL-RB configuration message and the SL-RB operation status message are received in sidelink RRC messages sent by the authorized UE. In some embodiments, the SL-RB configuration message is received in a sidelink RRC message and the SL-RB operation status message is received in a sidelink Medium Access Control (MAC) control element (CE) sent by the authorized UE. In some embodiments, the SL-RB configuration message is received in a first sidelink MAC CE and the SL-RB operation status message is received in a second sidelink MAC CE sent by the authorized UE. In some embodiments, the method further includes pre-configuring, based on the sidelink radio bearer pre-configuration message, at least one SL-RB to support unicast sidelink transmissions and at least one SL-RB to support groupcast transmissions. In some embodiments, the method further includes determining whether to activate, deactivate or switch between two SL-RB designs, based on the status indicated in the SL-RB operation status message. In some embodiments, the SL-RBs are configured to support sidelink transmission according to QoS requirements (Proximity Services (ProSe) Per-packet priority (PPPP)/ProSe per-packet reliability (PPPR) bit rate, delay bound, reliability).

Another aspect of the disclosure provides a method of allocating sidelink radio resources by an authorized UE belonging to a platoon. The method includes sending a request for sidelink radio resource to a gNB (i.e., RAN node), the request comprising parameters associated with the requested sidelink radio resource, the parameters including a parameter indicating a total estimated data volume required by all UEs in the platoon, a traffic pattern parameter indicating timing information of data transmission for groupcast and unicast transmission, and a number of transmissions, and a parameter indicating geo-location of UEs in platoon/group. The method also includes receiving the resource configuration from gNB, the resource configuration indicating the resource pool assigned to the platoon. The method also includes sending resource allocation messages to each member of the platoon. In some embodiments, the method further includes receiving a request for sidelink radio resources from a UE belonging to the platoon, the request containing the parameters for sidelink radio resources, the parameters for sidelink radio resources including a parameter indicating estimated data volume UE identifier and a parameter indicating the associated logical channel group identifier. In some embodiments, the method further includes determining the sidelink radio resources, based on the request received from the UE. In some embodiments, the method further includes sending a resource grant and a resource reservation to the UE, the resource grant and reservation indicating the determined resource allocation and validity duration of resources.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description of embodiments, taken in combination with the appended drawings, in which.

DETAILED DESCRIPTION

Figure 1:
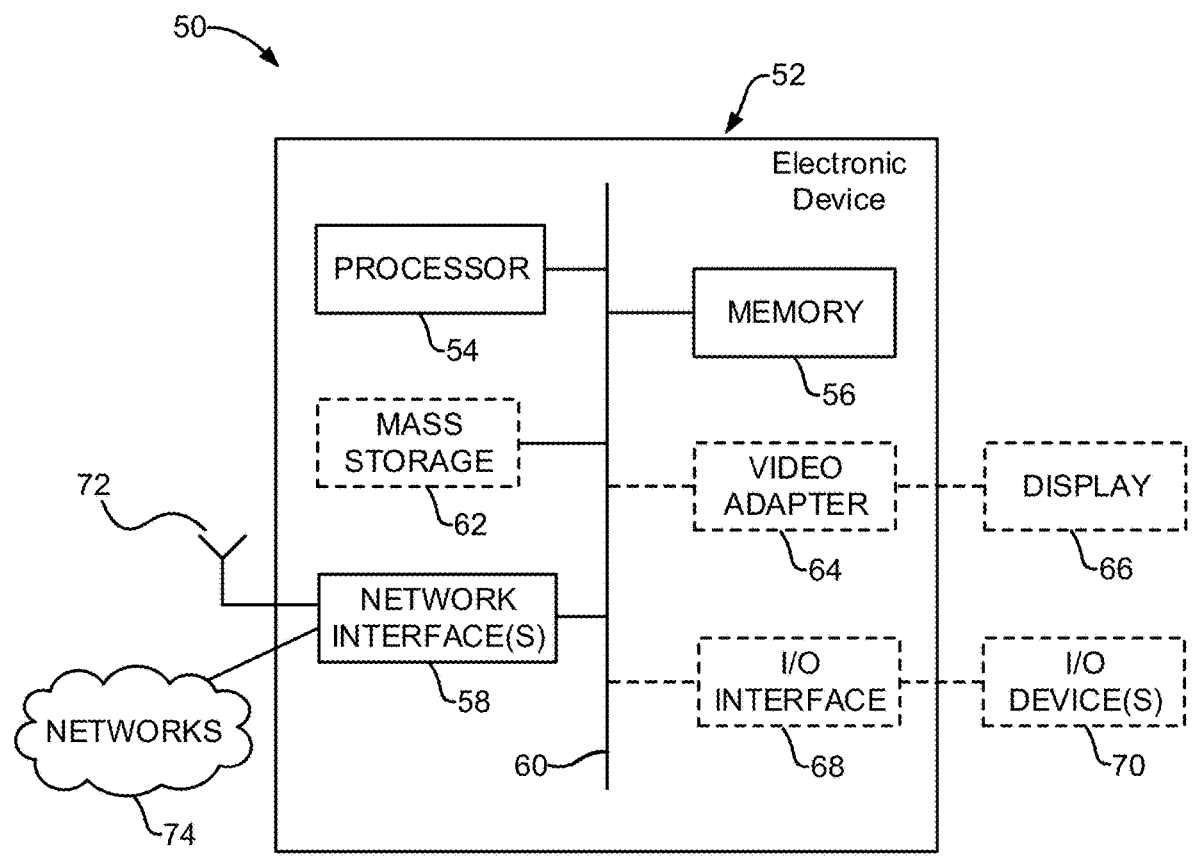
FIG. 1 is a block diagram of an electronic device within a computing and communications environment that may be used for implementing devices and methods in accordance with representative embodiments of the present invention.

To satisfy the stringent requirements of new services in 5G V2X, embodiments of the present invention allow for the support of different QoS for communications between vehicle UE (V-UE) to V-UEs and between V-UE and infrastructure UEs (I-UEs) on sidelink new radio (NR) PC5 interface in different types of transmissions including unicast transmissions, groupcast (i.e. multicast) transmissions and broadcast transmissions.

Since each of the V2X services have different throughput, latency and reliability requirements embodiments discussed herein implement radio bearers on the sidelink. The sidelink radio bearers (SL-RBs) enable supporting the transmission of continuous flow of packets from a Tx UE to Rx UE(s) with different QoS requirements. In contrast, the establishment of multiple SL-RBs with various QoS profiles was not required in the existing Release 14 LTE V2X standard because the transmissions of basic safety related messages consisted of only a single packet with small payload size, and the basic safety related messages were typically sent infrequently (e.g. 10 packets per second) between the UEs.

In NR V2X, a V-UE in the radio resource control (RRC) Connected state can be configured with multiple SL-RBs, each SL-RB associated with a QoS profile based on the Proximity Services (ProSe) Per-packet priority (PPPP), ProSe per-packet reliability (PPPR) and other QoS requirements (e.g. 5QI). However, since the V-UEs (i.e., Tx UEs and Rx UEs) can be in either a RRC Connected state or a RRC state, there is no assurance that both the Tx UEs and Rx UEs are configured and maintain the same SL-RB settings at any given time. Additionally, a V-UE can operate in Mode 2 without an RRC connection with the network (i.e. conventionally Mode 4 in LTE), making it even more challenging to ensure that the SL-RBs in Rx UE are configured similarly with those in the Tx UE.

In these scenarios, it can be beneficial to use a lightweight access stratum (AS) level connection to provide a radio bearer-like support over the sidelink and to facilitate the transmission of a flow of packets with a given QoS.

In NR V2X, the V-UEs can operate either in Mode 1 (Mode 3 in legacy LTE V2X) or Mode 2 (Mode 4 in legacy LTE V2X). Note that Mode 1 operation refers to the case where the radio resources required for performing sidelink transmissions are allocated by a radio access network (RAN) node to the transmitting UE (Tx UE). In contrast, in Mode 2 operation, the radio resources for performing sidelink transmissions are determined autonomously by the Tx UE. The RRC connection, linking a UE (e.g., a V-UE) and a RAN node (e.g. gNB) via the NG Uu interface, can be used for configuring the sidelink radio bearer (SL-RB) in the V-UE. Specifically, the SL-RB configuration settings may include i) L2 AS-level mapping between different sublayer entities, ii) service level mapping from PPPR, PPPP or QoS-flow indicator (QFI) to different number of logical channels, iii) parameter setting such as sequence number range related to PDCP sublayer; parameter setting such as RLC mode (i.e. UM, AM) related to the RLC sublayer, iv) enforcements of mapping restrictions related to logical channel to sidelink carrier mapping in the MAC sublayer, v) parameter settings for logical channel prioritization (LCP), vi) resource related parameter settings for semi-persistent scheduling (SPS) or configured grant, and vii) geographic location (geo-location) of the V-UE. The SL-RB configuration settings are included in a configuration message. In some embodiments, the SL-RB configuration settings can also include: the configuration of packet forwarding information at a relay UE including mapping between a destination UE ID to intermediate (next-hop) UE ID when supporting sidelink communications based relaying. It should be noted that "AS-level" and "AS-layer" may be used interchangeably in this disclosure.

In Mode 1 operation, the transmitting (Tx) UE establishes and maintains an RRC connection with a gNB (i.e., a RAN node) in order to request for sidelink radio resources, which are indicated to the Tx UE via SL grants. After obtaining the SL grants from the gNB (i.e., RAN node), the Tx UE is able to perform packet transmissions using the configured SL-RB. For successfully receiving and decoding the packets with specific QoS, the Rx UE uses the configured SL-RB (configured in the UE via an RRC connection) while in RRC Connected state. In the case when both the Tx and Rx V-UE transitions to RRC Idle state, the previously obtained SL-RB configuration may be valid only within the coverage area of the serving gNB. If the UE moves to coverage area of a new gNB, the SL-RB configuration may need to be updated. Since the UE, in RRC Idle state, to not undergo a handover procedure when moving between different coverage areas in RRC Idle state, the UE will not obtain the updated SL-RB configuration until it establishes an RRC connection with the new gNB. Also, it is not necessary for the V-UE to establish the RRC connection with the new gNB and continue to operate in RRC Idle state if it only intends to receive the packets on the sidelink and not to perform any transmissions.

In Mode 2 operation, the Tx UE can always perform transmissions on sidelink, whether in RRC Idle state or RRC Inactive state, without having to establish an RRC connection with a gNB. In this case, the Tx UE can use either pre-configured SL-RB settings or obtain the SL-RB configuration after transitioning to RRC Connected state (temporarily) during initial access and registration with the network. However, the Rx UEs in both Mode 1 and Mode 2 may not apply the same SL-RB configuration as that applied by the Mode 2 Tx UE (i.e., a Tx UE in Mode 2) in order to successfully receive and decode the packets.

Before discussing more details of embodiments of the invention, an electronic device which can be configured for implementing the devices and methods disclosed herein will be discussed.

FIG. 1 is a block diagram of an electronic device (ED) 52 illustrated within a computing and communications environment 50 that may be used for implementing the devices and methods disclosed herein. In some embodiments, the electronic device may be an element of communications network infrastructure, such as a base station (for example a NodeB, an evolved Node B (eNodeB, or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or a Public Land Mobility Network (PLMN). In other embodiments, the electronic device may be a device that connects to the network infrastructure over a radio interface, such as a mobile phone, smart phone or other such device that may be classified as a User Equipment (UE). In some embodiments, ED 52 may be a Machine Type Communications (MTC) device (also referred to as a machine-to-machine (m2m) device), or another such device that may be categorized as a UE despite not providing a direct service to a user. In some embodiments, ED 52 may be a road side unit (RSU), a vehicle UE (V-UE), pedestrian UE (P-UE) or an infrastructure UE (I-UE). In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 52 typically includes a processor 54, such as a Central Processing Unit (CPU), and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed lines).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The electronic device 52 may also include one or more network interfaces 58, which may include at least one of a wired network interface and a wireless network interface. As illustrated in FIG. 1, network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (e.g. an eNB). When ED 52 is infrastructure at the radio edge of a network, both wired and wireless network interfaces may be included. When ED 52 is a wirelessly connected device, such as a User Equipment, radio access network interface 72 may be present and it may be supplemented by other wireless interfaces such as WiFi network interfaces. The network interfaces 58 allow the electronic device 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to the electronic device 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple the electronic device 52 to external input and output devices. Examples of input and output devices include a display 66 coupled to the video adapter 64 and an I/O device 70 such as a touch-screen coupled to the I/O interface 68. Other devices may be coupled to the electronic device 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

Embodiments of the invention provide enhancements to existing V2X systems in 3GPP to support different SL-RBs, where each SL-RB is associated with a QoS profile and/or a transmission mode (unicast/groupcast transmission), in a number of scenarios, including:

i) Both Tx V-UE and Rx V-UE are in Mode 1 RRC Connected state;

ii) Tx V-UE is in (Mode 1) RRC Connected state and Rx V-UE (Mode 1 or 2) is in RRC Idle state;

iii) Both Tx V-UE and Rx V-UE are in Mode 1 RRC Idle state; and iv) Both Tx V-UE and Rx V-UE are in Mode 2.

To address the challenges related to configuring the SL-RB in Mode 1 and 2 and coordination between the Tx UEs and the Rx UE(s), embodiments of the invention provide a new method for configuring the SL-RB. Specifically, for configuring the SL-RB, the UEs may exchange SL-RB related parameters using an in-band configuration indication or a CP context transfer over the sidelink to achieve an RRC-like configuration and ensure that the same configuration is applied in both the Tx UE and Rx UE. In this case, the SL-RB in both the Tx UE (e.g. V-UE) and Rx UE (e.g. V-UE) need not contain any context information associated to a particular UE (for unicast) or a group of UEs (for groupcast—also known as multicast) to support a particular QoS profile. The SL-RB can be established between the Tx UE and the Rx UE when needed over a short duration and released when the transmission of the flow of packets with QoS is complete. To minimize the signaling overhead over the sidelink, in some embodiments, only the SL-RB related parameters are exchanged between the UEs during the SL-RB establishment. SL-RB related parameters may include parameters that are specific to the unicast or groupcast connection (e.g. SL-RB ID, QoS flow to SL-RB mapping). Further, parameters that need to be consistent at both ends of the connection (i.e. the Tx UE end and the Rx UE end) are exchanged between the UEs during the SL-RB establishment.

Similar to the L2 protocol stack used in the NG Uu interface, the L2 protocol stack for each SL-RB used in the NR PC5 interface includes the entities within each sublayer. Additionally, each SL-RB may be assigned by the RAN with either the same or different identifier (ID) as that assigned for L2 (L2 ID) with a one-to-one mapping. The mapping between the entities and the applicable parameters in the sublayers may be undefined when the UEs are in RRC Idle state or prior to the transmission of packet flow. However, when a flow of packets with certain QoS are required to be transmitted over the sidelink, embodiments provide an indication message which is transmitted by the Tx UE to the Rx UE to configure the sidelink or activate a predefined configuration for the sidelink in supporting the required QoS. Likewise, prior to receiving the SL-RB related indication message from the Tx UE, and before the Tx UE sends the packets of a QoS flow to the Rx UE based on a defined SL-RB configuration, the Rx UE may also provide an indication of its capability in terms of supported sidelink configuration(s) to the Tx UE. The SL-RBs can also be configured to support carrier aggregation (CA) and packet duplication (PD) functionalities for V2X services requiring high throughput and high reliability where the transmissions are performed with multiple sidelink component carriers (CCs) or bandwidth parts (BWP). Note that CC may imply a resource pool consisting of a set of time-frequency radio resources which can be configured by the network individually for each V-UE or for a group of V-UEs.

In essence, the SL-RB is a type of shared sidelink radio bearer that is configurable or activated via in-band signaling without an RRC connection with the network. The SL-RB can be supported for both Mode 1 and Mode 2 UEs. In the case of Mode 1 UE operation, the network preconfigures the SL-RB in both the Rx UE and Tx-UE via an RRC during initial access. Specifically, the pre-configuration includes i) the criteria/rules and parameters which the UEs are required to apply when using their SL-RBs for performing sidelink transmissions, where the SL-RBs may include a number of different SL-RBs supporting packet flows of different QoS. The pre-configuration may further include the format in which the Tx V-UE indicates the configuration or the activation status of the selected SL-RB to the Rx V-UE via in-band signaling.

In Mode 2 UE operation, embodiments discussed herein utilize a set of SL-RBs corresponding to different QoS requirements (i.e. mapping rules to map from higher layer packets to SL-RBs). This set of SL-RBs and the corresponding mapping rules can either be preconfigured in the UE(s) (hard coded) for out-of-coverage operation or indicated by the RAN node to the UEs via the System Information Block (SIB) signaling in RRC when the UE is in coverage.

It should be noted that both higher layer and upper layer refer to the protocol stack layers above the Packet Data Convergence Protocol (PDCP) layer in L2 or the Service Data Adaptation layer (SDAP), which includes the non-access stratum (NAS) protocol data unit (PDU) layer and the application layer.

Embodiments of the invention provide methods and systems to support QoS for different types of transmissions (in other words transmission or cast types), including unicast and groupcast transmissions using sidelink radio bearers over the NR PC5 interface. Embodiments of the invention further provide methods and systems to configure and activate sidelink radio bearers using AS-level signaling between the Tx UE and Rx UEs over the NR PC5 interface. Embodiments of the invention further provide methods and systems to perform resource allocation and resource reservation in a platoon (i.e., a group of V-UEs) for sidelink transmissions.

Advantageously embodiments of the invention can: support multiple simultaneous QoS flows on sidelink (NR PC5 interface) when the UEs are in RRC Idle state; Support of RRC-like capability on sidelink (PC5 interface) to enable establishment, modification and release of the SL-RBs in scenarios without network coverage and when the V-UEs operate in Mode 2; and/or reduce or eliminate the need to transfer SL-RB configurations between the network nodes (i.e. gNBs) during handover.

Three example options for configuring a SL-RB will be discussed in more detail below. In brief, Option 1 provides in-band activation of a SL-RB; Option 2 provides in-band configuration of the SL-RB; and Option 3 provides RRC configuration of the SL-RB.

Option 1 can include pre-configuration in V-UE(s) for multiple SL-RBs for different QoS. Each pre-configured SL-RB contains predefined entities in each L2 sublayer, as well as a mapping between L2 entities. Each pre-configured SL-RB also contains applicable parameters. The method of pre-configuration for Option 1 can use RRC via NG-Uu interface (e.g. for Mode 1 UE(s)) or use system information block (SIB) (e.g. for Mode 2). Option 1 can also include on-line signaling on sidelink (NR PC5), which can provide activation indication for each of the pre-configured SL-RB. The method of on-line signaling for Option 1 can include transmission of MAC Control Element (CE) activation indication message via NR PC5.

Option 2 can include pre-configuration in V-UE for SL-RB with predefined entities within each L2 sublayers. The method of pre-configuration for option 2 can use RRC via NG-Uu interface (e.g. for Mode 1) or use SIB (e.g. for Mode 2). Option 2 can also include on-line signaling on sidelink (NR PC5), which can provide a SL-RB configuration containing mappings between L2 entities and applicable parameters. The method of on-line signaling for option 2 can include transmission of MAC CE message containing the SL-RB configuration information via NR PC5.

Option 3 can include pre-configuration in V-UE for establishment of signaling radio bearer for V2X (SRB-V or PC5 SRB or PC5 RRC) for supporting SL-RB configuration (establishment, modification, and release). The method of pre-configuration for option 3 can use RRC via NG-Uu interface (e.g. for Mode 1) or use SIB (e.g. for Mode 2). Option 3 can also include on-line signaling on sidelink (NR PC5), which includes SL-RB configuration messages for different SL-RB configurations containing mappings between L2 entities and applicable parameters. The method of on-line signaling for Option 3 can include Sidelink RRC (SL-RRC or PC5-RRC) signaling via NR PC5.

Examples of system architectures will now be discussed.

Figure 2:
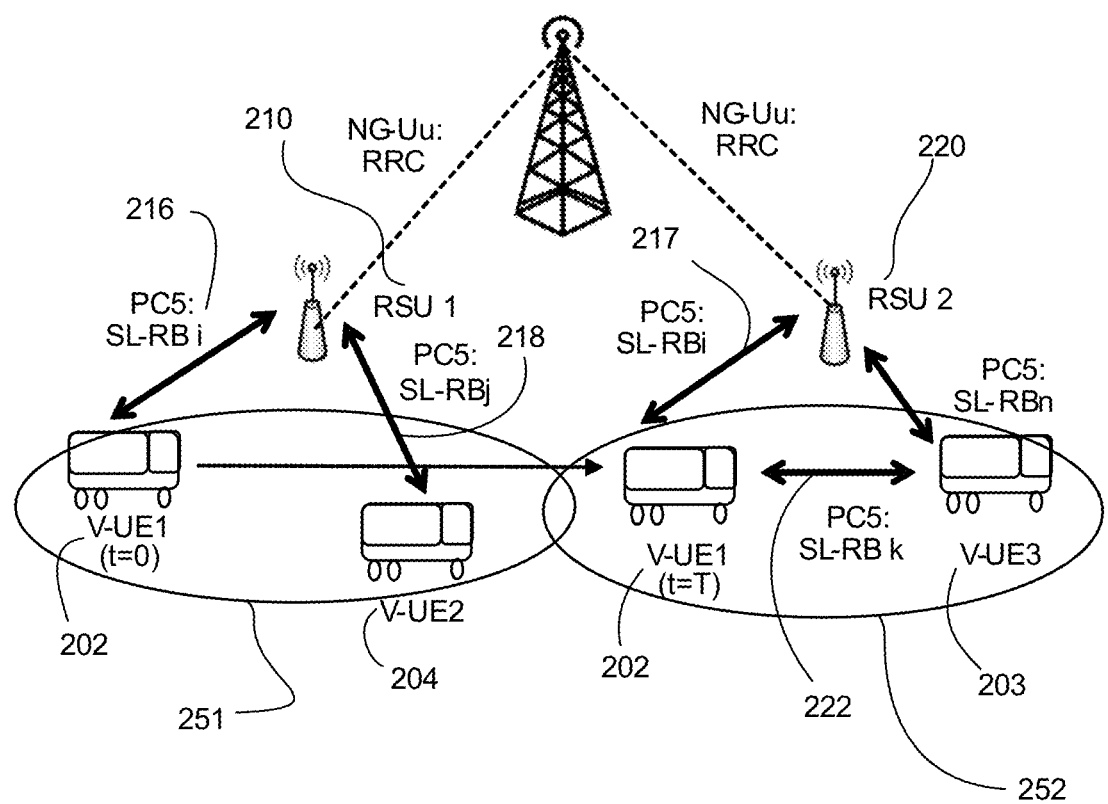
FIG. 2 illustrates support of a SL-RB on NR PC5 interface in Mode 1 and Mode 2 according to an embodiment.

FIG. 2 illustrates support of a SL-RB on NR PC5 interface in Mode 1 and Mode 2 according to an embodiment. The SL-RB is beneficial for supporting the extended sensor, advanced sensor and platooning use cases in highway and urban-intersections, as shown in FIG. 2, where a short-lived radio bearer connection on the sidelink can be rapidly established and terminated as the V-UEs move along.

In particular, the SL-RB can be used for both unicast and groupcast transmissions in the following scenarios:

scenario A involving communications between V-UEs and road side unit (RSU), which may comprise the transmission of data from V-UEs to the RSU and the transmission of data from the RSU to the V-UEs; and scenario B involving communications in a platoon, which may comprise supporting transmissions from the leading vehicle UE (L-UE) to the following vehicle UEs (F-UEs).

Prior to performing transmissions, the V-UEs and I-UEs (RSU) can discover the mutual V2X service information (i.e. L2 Destination IDs for V2X services supported, V-UE ID) via a sidelink discovery procedure. To ensure that both the V-UE(s) and the RSU are synchronized the V-UE undergoes a synchronization procedure. A V-UE may synchronize either with a RSU, a gNB (i.e., a RAN node) or a Global Navigation Satellite System (GNSS) (e.g. GPS).

In FIG. 2, the V-UE1 202 (at t=0) uses SL-RB i 216 to transmit its sensor data to RSU1 210 upon indicating the type and configuration of the SL-RB in-band to RSU1 210. Likewise, the V-UE2 204 uses the SL-RB j 218 to transmit its own sensor data to RSU1 210. RSU1 210 is able to distinguish the data transmitted based on the different sets of sequence numbers used by V-UE1 202 and V-UE2 204. Both V-UE1 202 and V-UE2 204 are in the coverage area 251 of RSU1 210. As V-UE1 202 moves to the coverage area 252 of RSU2 220 (at t=T), the V-UE1 202 may use a different SL-RB 217 to transmit data to RSU 2 220 with a different QoS by indicating the SL-RB type and configuration in-band to RSU2 220, without having to undergo RRC reconfiguration. Similarly, V-UE1 202 can transmit data to V-UE3 203 on the NR PC5 interface using SL-RB k 222.

A platoon includes a dynamically formed group of closely linked vehicles (i.e. vehicle UEs) that typically travel in a single file. In order to maintain the inter-vehicle distance in the platoon, each vehicle shares the status information consisting of UE location (e.g. geo-location or positioning), velocity, driving direction, breaking intent, acceleration intent and change direction intent. In some embodiments, the vehicle UEs in the platoon obtain data from the leading vehicle (L-UE) to manage and coordinate the platoon. In general, platooning allows the inter-vehicle distance to be reduced, improve the fuel consumption and potentially reduce the number of drivers needed.

The attributes of a platoon according to an embodiment will now be discussed. A platoon typically includes one Leading UE (L-UE) and K following UEs (F-UEs). The length of the platoon is defined by the transmission power and transmission range of the L-UE. All F-UEs in the platoon are able to receive the transmission of the L-UE. Likewise, the transmission of the last F-UE and other F-UEs can be received by the L-UE. The formation of the platoon, which include selection and authorization of the L-UE and the admission of other F-UEs into the platoon, may be handled both at the higher Layer (i.e. by the Core Network in coordination with the V2X application layer function) and the Access Stratum Layer (i.e. by a gNB (i.e., RAN node) in the radio access network (RAN) via the NR Uu interface and UEs in platoon via NR PC5 interface in sidelink). If AS-layer signaling is supported between the UEs, the L-UE may send AS-level signaling (e.g. SL-RRC, MAC CE) messages (in different types of transmissions (e.g., transmission types), including both unicast transmissions and groupcast transmissions) to F-UEs to configure the SL-RBs, configure resource pools, and configure channel measurement and reporting. According to an embodiment of a platooning scenario, the higher Layer is responsible for one or more of: support of intent exchange (e.g. intent to be an L-UE of a platoon, intent to join/leave the platoon), communication of safety/non-safety information to vehicle UEs within a platoon, and communications of warning/alert messages to UEs/RSUs outside of platoon; assignment and exchange of platooning service identifiers (IDs) (e.g. platoon group ID) and L2 (destination, source) ID(s) between the L-UE and F-UE; enablement of security; indication and control of the transmission or cast types (unicast transmission, groupcast transmission, broadcast transmission); negotiation of application layer QoS requirements and capability; and indication of traffic attributes/pattern (i.e. periodic, event-driven).

According to an embodiment of a platooning scenario, the access stratum layer (gNB and L-UE) is responsible for one or more of: configuration of SL-RBs and corresponding QoS-related parameters (e.g. QoS flow indication (QFI), PC5 QoS Indication (PQI); allocation of adequate resources for sidelink transmissions (Mode 1 and Mode 2) based on attributes such as traffic pattern (i.e. data volume, transmission timing information), channel conditions and UE location information (e.g. geo-location, positioning); mitigation of congestion and interference; measurement/reporting of channel and loading (Channel Busy Ratio (CBR)) conditions (i.e. channel measurement result reported by any F-UE in the platoon may be used to make resource scheduling decision at the L-UE for unicast transmission, and channel measurement result reported by last F-UE (within the platoon max range) may be used to make packet duplication activation/deactivation decision at L-UE for groupcast transmission); and support of handover (i.e. handover of NG Uu RRC connection from L-UE to F-UE using SL-RRC).

Architectural options for supporting the SL-RB according to embodiments of the invention will now be discussed.

Figure 3:
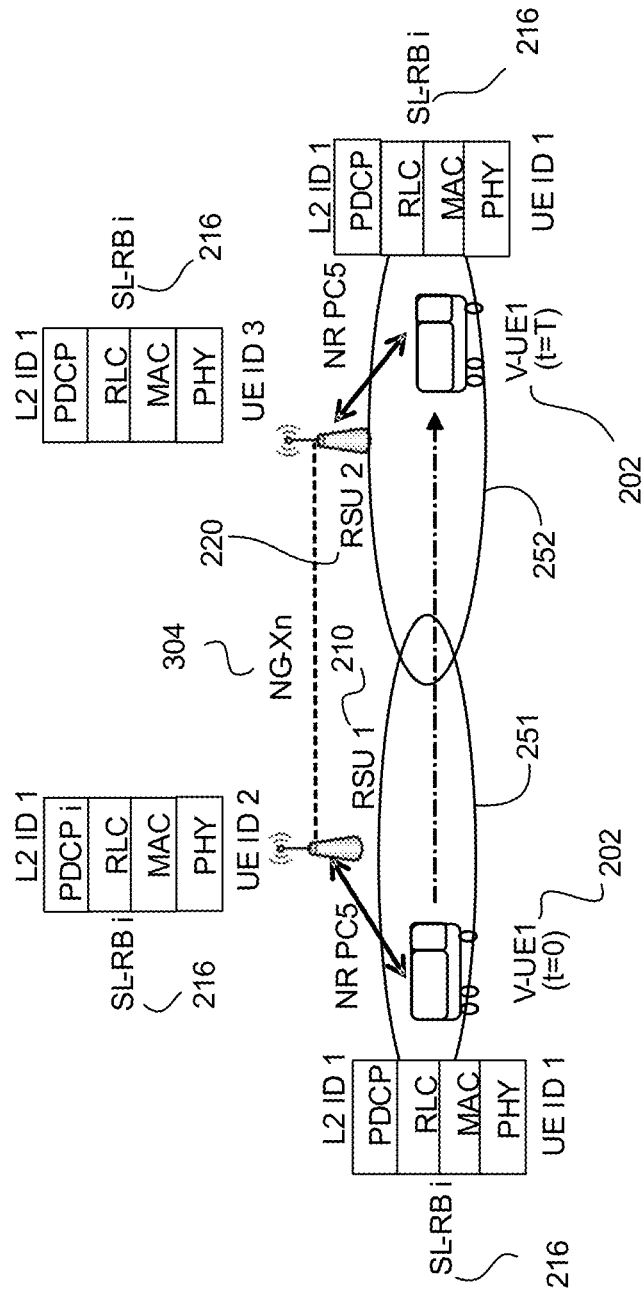
FIG. 3 illustrates support of a unicast SL-RB between a V-UE and an RSU in a standalone RSU architecture according to an embodiment.

FIG. 3 illustrates support of a unicast SL-RB between a V-UE and RSUs (also called an I-UE) in a standalone RSU architecture according to an embodiment. The Unicast SL-RB i 216 uses L2 ID 1 at higher layer and UE IDs {1,2,3} at L1. The standalone RSU supports the full L2 protocol stack on the NR PC5 interface and uses the NG-Uu interface for maintaining the RRC connection and communicating user plane (UP) data with the gNB. For communicating with other neighboring RSUs, for example 220, and for control plane (CP) and UP packet forwarding, the RSU 210 may use the NG Xn interface 304, PC5 interface or other appropriate inter-RSU backhaul interface. The V-UE 202 supports the full L2 protocol stack on the NR PC5 interface. If the V-UE 202 operates in Mode 1, the NG-Uu interface is used to maintain the RRC connection with the gNB. Otherwise, in Mode 2 the NG-Uu interface for RRC is not required. For supporting QoS on a SL-RB, the Tx UE (V-UE 202 or RSU 210) initially transmits the SL-RB configuration message to the Rx UE (V-UE 202 or RSU 210) prior to transmitting the data packets. Alternatively, the SL-RB configuration indication message may be provided by the RSU 210 to the Tx UE to indicate the potential L2 configurations that the Tx UE can use for transmitting the QoS packet flow to the RSU 210. Since the data transmitted by the V-UE 202 to RSU1 210 is intended for and localized only at RSU1 210, the flow of packets is initiated when V-UE 202 enters the coverage area 251 of RSU1 210 and terminated prior to exiting coverage area 251 of RSU1 210. Likewise, for the transmission of the packet flow from RSU1 210 to V-UE 202. When the V-UE 202 enters the coverage area 252 of RSU2 220, the flow of packets intended for RSU2 220 is transmitted and terminated before exiting the coverage area 252 of RSU2 220. In the case when a number of packets intended for an RSU have not been completely transmitted prior to exiting the RSU's coverage area, they may be transmitted to the next RSU for forwarding the data to the previous RSU (i.e. RSU2 220 to RSU1 210).

Figure 4:
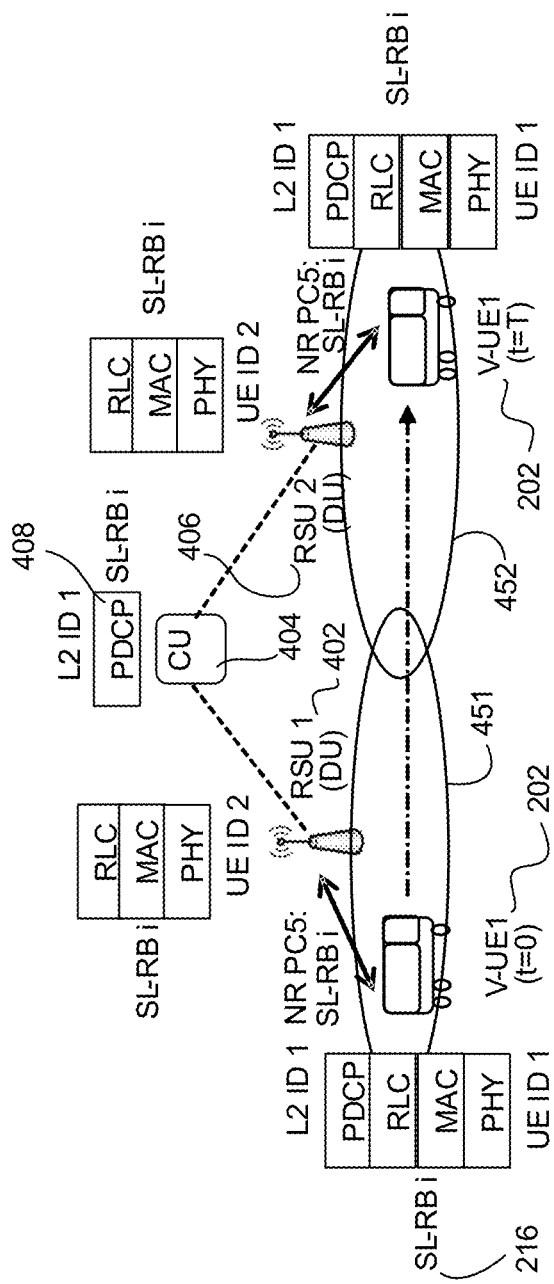
FIG. 4 illustrates support of a unicast SL-RB between a V-UE and an RSU in a centralized unit (CU)-distributed unit (DU) RSU architecture according to an embodiment.

FIG. 4 illustrates support of a unicast SL-RB between V-UE and RSU in a CU-DU RSU architecture according to an embodiment. The unicast SL-RB i 216 uses L2 ID 1 at the higher layer and UE IDs {1,2} (e.g. C-RNTI) at L1. The distributed unit (DU) RSU 402 supports the lower sublayers of L2 protocol stack consisting of Radio Link Control (RLC), MAC and PHY on the NR PC5 interface. The DU RSU 402 may be a partial stack DU and different from RSU 210, being a full stack DI. The Packet Data Convergence Protocol (PDCP) sublayer 408 is located at the centralized unit (CU) 404 and linked to the DU RSU 402 via the F1 interface. The CU 404 may be collocated with a gNB (i.e., RAN node). The V-UE 202 supports the full L2 protocol stack on the NR PC5 interface. If the V-UE 202 operates in Mode 1, the NG-Uu interface is used to maintain the RRC connection with the gNB. For supporting QoS on SL-RB, the Tx UE (V-UE 202 or RSU 402) initially transmits the SL-RB configuration message to the Rx UE (V-UE 202 or RSU 402) prior to transmitting the data packets. The data packets transmitted by the V-UE 202 to RSU1 402 is forwarded to the PDCP 408 in CU 404. The V-UE 202 can continue the transmission of the data packet in the packet flow using the existing SL-RB 216 when it leaves the coverage area 451 of RSU1 402 and enters the coverage area 452 of RSU2 406. For the transmission of the packet flow from CU 404 to V-UE 202, the packets are forwarded to either RSU1 402 or RSU2 406 based on the detection of the V-UE's 202 presence within the respective coverage areas via the SL discovery channel.

Figure 5:
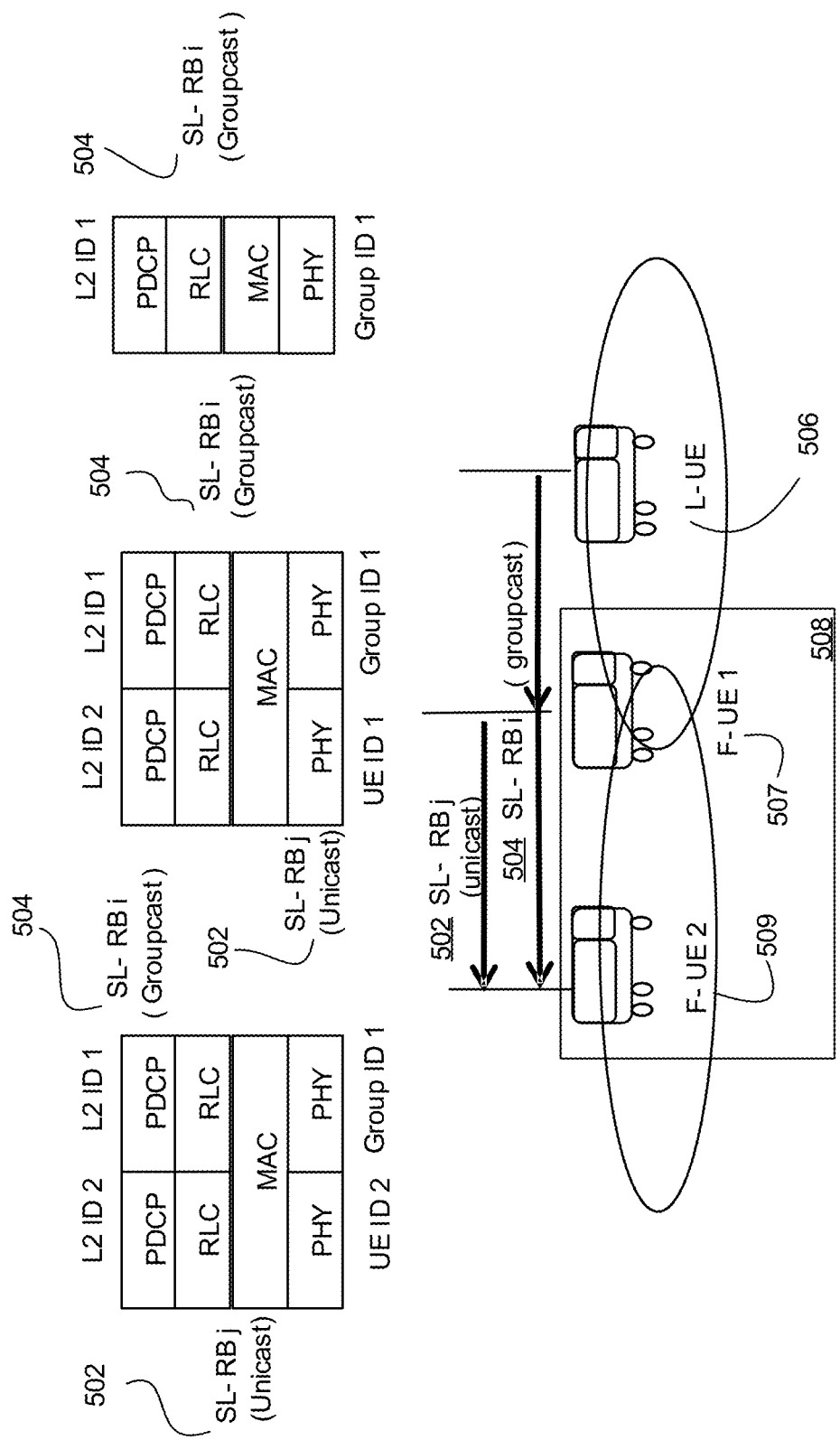
FIG. 5 illustrates support of unicast and groupcast SL-RBs between a leading vehicle UE (L-UE) and following vehicle UEs (F-UEs) in a platooning scenario according to an embodiment.

FIG. 5 illustrates support of unicast and groupcast SL-RBs between L-UE and F-UEs in a platooning scenario according to an embodiment. The unicast SL-RB j 502 uses L2 ID 2 at the higher layer and UE IDs {1,2} (e.g. C-RNTI) at L1. The groupcast SL-RB i 504 uses L2 ID 1 at higher layer and Group ID 1 at L1. The L-UE 506 supports the full L2 protocol stack on the NR PC5 interface. If the L-UE 506 operates in Mode 1, NG-Uu interface is used for maintaining the RRC connection with a gNB (i.e., RAN node). The following UEs (F-UEs 508 (F-UE1 507 and F-UE2 509)) support the full L2 protocol stack on the NR PC5 interface and may operate in either Mode 1 or Mode 2. For supporting QoS on SL-RB, the L-UE 506 initially transmits the SL-RB configuration indication message for groupcast to the F-UEs 508 prior to transmitting the data packets. The transmission of data packets in the packet flow from the L-UE 506 is initiated when a new F-UE enters the platoon and is continued throughout the duration that the platoon is maintained.

SL-RB design options for supporting AS-level QoS in NR V2X will now be discussed. These design options include a bearer-less (BL) design, a bearer-based (BB) design, and switching between bearer-based (BB) and bearer-less (BL) designs.

Figure 6A:
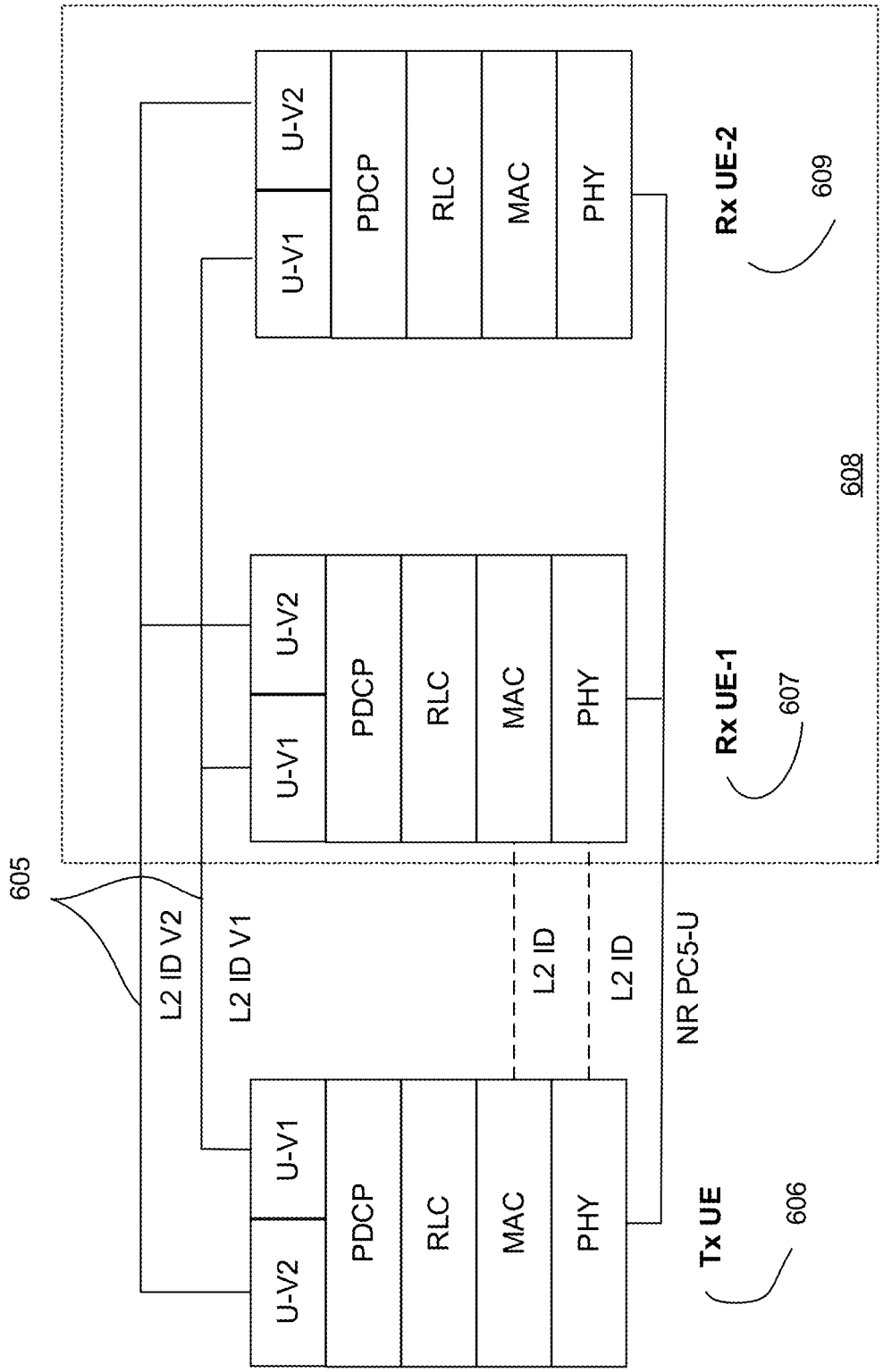
FIG. 6A illustrates an L2 protocol stack to support bearer-less (BL) design of a SL-RB according to an embodiment.

FIG. 6A illustrates a L2 protocol stack to support a bearer-less design according to an embodiment. Bearer-less design (shown in FIG. 6A) for an SL-RB refers to the case where packets can be transmitted without AS-level connection setup signaling or handshaking between a Tx UE 606 and Rx UEs 608 (Rx UE-1 607 and Rx UE-2 609). This can be applied in all different transmission types, such as unicast, groupcast and broadcast transmissions. The virtual connection between the Tx and Rx UEs 608 is handled by the higher layer (i.e. based on V2X application layer or core network (CN) configured packet filtering and QoS indicator marking layer) by exchanging and aligning 605 the L2 Destination IDs used by the devices. Specifically, the L2 destination ID provided by the higher layer can contain the transmission type (unicast, groupcast, broadcast) indicator along with the QoS related markings (e.g. PPPP, PPPR, other QoS indicators such as latency, QFI or 5G QoS Indicator (5QI)).

For unicast transmissions the Tx UE 606 and Rx UE 608 will use the unicast L2 source ID and L2 destination ID or C-RNTI (in MAC and PHY) when transmitting and receiving the packets. Likewise, for groupcast transmissions, the Tx UE 606 and a group of Rx UEs 608 configured for group communications will use a L2 source ID and common groupcast L2 destination ID or group RNTI (G-RNTI) (in MAC and PHY) when transmitting and receiving the packets. In the higher layer connection establishment procedure, an Rx UE (607 or 609) intending to subscribe to a particular set of V2X applications may obtain the L2 destination and source IDs after exchanging information with the Tx UE 606 during initial discovery procedure. After connection establishment, the indicators in the higher layer packet headers are used to apply a particular technique (e.g. packet duplication, prioritization) in the AS layer for satisfying the desired QoS requirement. Particularly, at the AS layer of Tx UE 606, an L2 protocol stack can be used and modified on a per-packet basis based on the higher layer indicators. Likewise, at the Rx UE 608, each packet is processed in the sublayers of the L2 protocol stack on a per-packet basis before sending the packets to the intended V2X application. The choice of single or multiple L2 protocol stacks and AS-level mechanisms may be up to UE implementation.

Note that since the use of L2 source and destination IDs are aligned 605 between the Tx 606 and Rx 608 UEs, from the perspective of the higher layer the SL transmissions are not entirely connectionless. However, since no AS or RAN related context is stored in the UEs, from the AS perspective the transmissions can be supported without a connection between Tx UE 606 and Rx UEs 608. In a dynamic and fast changing vehicular environments, the bearer-less design is less cumbersome and precludes the need for AS-level signaling for connection establishment and maintenance. Also, for packets that include safety information, which are sent infrequently (e.g. 10 Hz, 20 Hz), per-packet level handling using bearer-less design is adequate and no additional complexity is required to support AS-level mechanisms. This is especially the case for broadcast transmissions.

On the downside, since the bearer-less design relies more on higher layer for connection management and QoS handling, further enhancements may be required at higher layer applications to support adaptation based on AS-layer conditions. For example, to minimize the reception delay due to congestion experienced at the AS-layer, the higher layer of the Rx UE 608 has to provide feedback to the higher layer of Tx UE 606 to control a transmission rate for transmitting the packets (e.g. packet transmission rate).

In this case, without enabling signaling at the AS layer between the Tx 606 and Rx 608 UEs, the higher layers require visibility of the radio access conditions such as channel fluctuations and congestion at the sidelink radio interface. Ideally, the conditions at the radio access interface should be controlled using AS-level mechanisms and operate based on RAN configured rules to ensure consistent QoS handling between Tx UE 606 and Rx UEs 608 in all operational scenarios (i.e. in coverage, partial coverage and out of coverage). Additionally, the AS-level conditions should be handled without awareness in the higher layer.

Figure 6B:
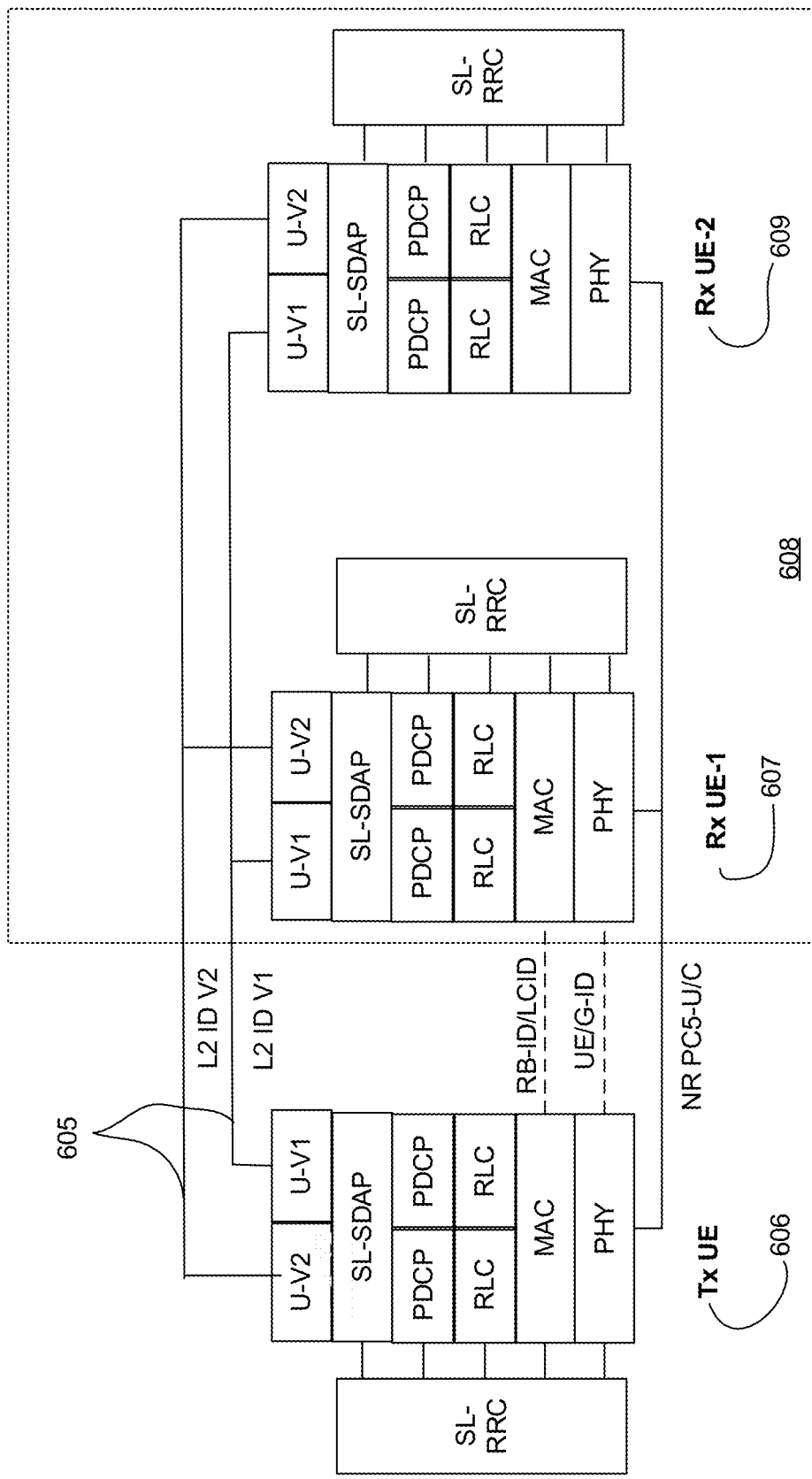
FIG. 6B illustrates an L2 protocol stack to support bearer-based (BB) design of a SL-RB according to another embodiment.

FIG. 6B illustrates a L2 protocol stack to support bearer-based design according to another embodiment.

Bearer-based design (shown in FIG. 6B) for an SL-RB refers to AS-level connection management to provide QoS support to the higher layer packets using configured SL-RBs. In contrast to bearer-less design, in bearer-based design the SL-RBs can be customized via AS-level signaling for different transmission types, including unicast transmissions and groupcast transmissions, and higher layer QoS requirements while ensuring the higher layers are transparent to the radio conditions.

Unlike in broadcast transmissions, the use of AS-level signaling in bearer-based design can be handled more efficiently for unicast transmissions and groupcast transmissions because the transmission range is relatively shorter and the number of UEs involved is relatively low for supporting reliable AS-level signaling over the PC5 sidelink interface. The first stage of connection establishment is handled by the higher layers based on exchange of per-UE L2 destination IDs and per-group L2 destination IDs to support unicast transmissions and groupcast transmission, respectively. This is followed by the second stage involving the AS-layer SL-RB establishment and configuration involving either the RAN or UE via AS-level signaling (i.e. SL-RRC). Based on the QoS and transmission type indicators provided by higher layers, the AS layer has to ensure that proper priority, reliability and resource provisioning is made to satisfy the higher layer QoS requirements in all operational scenarios (i.e. in-coverage, out-of-coverage). Note that the higher layer QoS indicators may be provided to the UE (via RAN during initial attach procedure) by the core network (CN) in the form of QoS flow indicator (QFI) marking rules. The use of a CN's NAS PDU (V2X control function (V2X-CF) or session management function (SMF)) provided layer for performing packet filtering (V2X application packets) and QFI marking may allow supporting QoS flows in the sidelink in a manner that is unified and consistent with that of the QoS flows supported for UP traffic via the NR Uu interface in the RAN and N3 interface in CN. Alternatively, the higher layer QoS indicators may be the existing PPPP or PPPR, marked in each packet.

The higher layer packets, marked with QoS indicators (e.g. 5QI/QFI), are mapped to the appropriate SL-RB in the AS-layer. The mapping from higher-layer packets to SL-RB can be performed by a service data adaptation protocol (SDAP) in AS-layer L2 protocol stack using the mapping rules configured by RAN or pre-configured in the UE or in a CN configured V2X (non-access stratum) layer above the AS layer. In the case where each V2X application or casting type in the higher layer is assigned to an SL-RB, the SL-RB ID used in the AS-level packet header (i.e. Logical Channel ID LCID used in MAC protocol data unit (PDU) header) may be the same L2 ID provided by the higher layer or a different ID with a one-to-one mapping between SL-RB ID and L2 ID.

In another embodiment, to allow more flexibility in managing the connections in the AS layer, the SL-RBs can be assigned by RAN with SL-RB IDs different from the L2 IDs assigned by higher layers and unique within the coverage area of gNB (i.e, RAN node) or UE's sidelink range. While this may result in additional overhead and mapping complexity in the UE, having SL-RB IDs different from the L2 IDs assigned by higher layers and unique within the coverage area of a gNB (i.e, RAN node) or UE's sidelink range allow for specific SL-RBs to be established and modified by the RAN (i.e. gNB) without involving the higher layer. The rules for mapping QoS requirements and QoS flow indicators (e.g. QFI, 5QI, PQI) and transmission/cast type (e.g., broadcast transmissions, unicast transmissions, or groupcast transmission) to the SL-RBs in SDAP are also configured via AS-level signaling. Additionally, multiplexing rules/restrictions should be applied at the MAC sublayer for unicast transmissions and groupcast transmissions such that packets belonging to incompatible destination are isolated and not multiplexed in the same MAC PDU with the correct L2 Destination ID (in the sub-header). On the other hand, if the same L2 IDs are used for identifying the SL-RBs, the complexity due to mapping is reduced in the UE at the expense of certain loss in multiplexing gain and AS-level flexibility.

Given the higher layer indicators, the SDAP in the AS layer can map the flow of packets with the same QoS characteristics in the higher layer to a particular configured SL-RB and apply AS-level mechanisms such as in-order packet delivery, Automatic repeat request ARQ (RLC Acknowledged Mode (AM)) feedback and LCP to support the required QoS. For example, a unicast transmission requiring high reliability (i.e. low PPPR value) can be mapped to an SL-RB configured with packet duplication at PDCP and mapping restrictions at MAC layer. Likewise, packets generated by a V2X application supporting groupcast transmission and requiring a low packet delay (i.e. low PPPP value) may be sent over an SL-RB configured with highest LCP at the MAC layer. The SL-RBs, consisting of full L2 protocol stack along with SDAP, can be configured by the RAN via RRC signaling during initial access or pre-configured in the UE. The UE can retain the SL-RB configurations even after transitioning to either RRC Idle or RRC Inactive state from the initial RRC Connected state.

In some embodiments, the SL-RB may support data packet relaying functionalities and accordingly, permit the UE to operate as a relay node. In this case, when relaying the data packets to/from the network via the NR Uu interface or to/from another UE in the PC5 interface, the L2 protocol stack of the SL-RB may be modified such that the relaying is performed at any of the following: the PHY sublayer level, the MAC sublayer level, the RLC sublayer level or the PDCP sublayer level. If data packets are relayed at any of the sublayers (i.e. PHY, MAC, RLC or PDCP), the packets need not be sent vertically to the sublayer above the relaying sublayer and instead the packets may be sent horizontally to the parallel sublayer next to the relaying sublayer in order to reduce relaying latency. The SL-RB configuration at the relay UE (i.e. L-UE or F-UE) which support relaying either at the PHY, MAC, RLC or PDCP sublayers may consist of an adaptation or re-mapping layer above any of the sublayers. The adaptation/re-mapping layer may contain a forwarding/routing table to map from the final destination UE ID to an intermediate (next-hop) relay UE ID. In any one of the relaying scenarios, the configuration to the SL-RBs in the relaying node to support relaying capability can be performed either by the RAN node via RRC signaling or by an authorized L-UE via in-band signaling or PC5-RRC.

While the RRC configuration of the SL-RBs by RAN (i.e. gNB) can be supported when both the Tx UE 606 and Rx UE 608 are in Mode 1, in Mode 2 or out-of-coverage/partial-coverage scenarios, the UE has to rely on the last configured SL-RB or pre-configured SL-RB parameters. However, this can result in a mismatch and irregularity in the SL-RB configurations between the Tx UE 606 and Rx UE 608 and potential degradation in QoS handling. In this case, to allow reconfiguration and modification of the SL-RBs, especially in partial or no coverage scenarios, the use of AS signaling between the UEs over the NR PC5 interface may be necessary. This ability provides greater flexibility in AS layer to control packet transmission based on factors at the radio interface level such as congestion and channel conditions.

In addition, the use of AS-level signaling to manage SL-RBs allows multiple transmission/cast types and applications with different QoS to be supported simultaneously over the sidelink. The simultaneous transmission is vital in the platooning scenario where a platoon leader 506 may be transmitting group related data on the groupcast SL-RB 504 and a UE related data on the unicast SL-RB 502 at the same time for platoon coordination. The bearer-based design with AS-level signaling can be efficiently applied to support unicast and groupcast transmissions in stable and non-dynamic environments where the relative velocity between the UEs is low (e.g. platoon). This is also the case when there is proper RAN coverage where the gNB (i.e, RAN node) can be used to assist with the SL-RB and resource configuration. In highly dynamic and partial/no-coverage scenarios, the bearer-less design is less complex and more suitable.

Figure 6C:
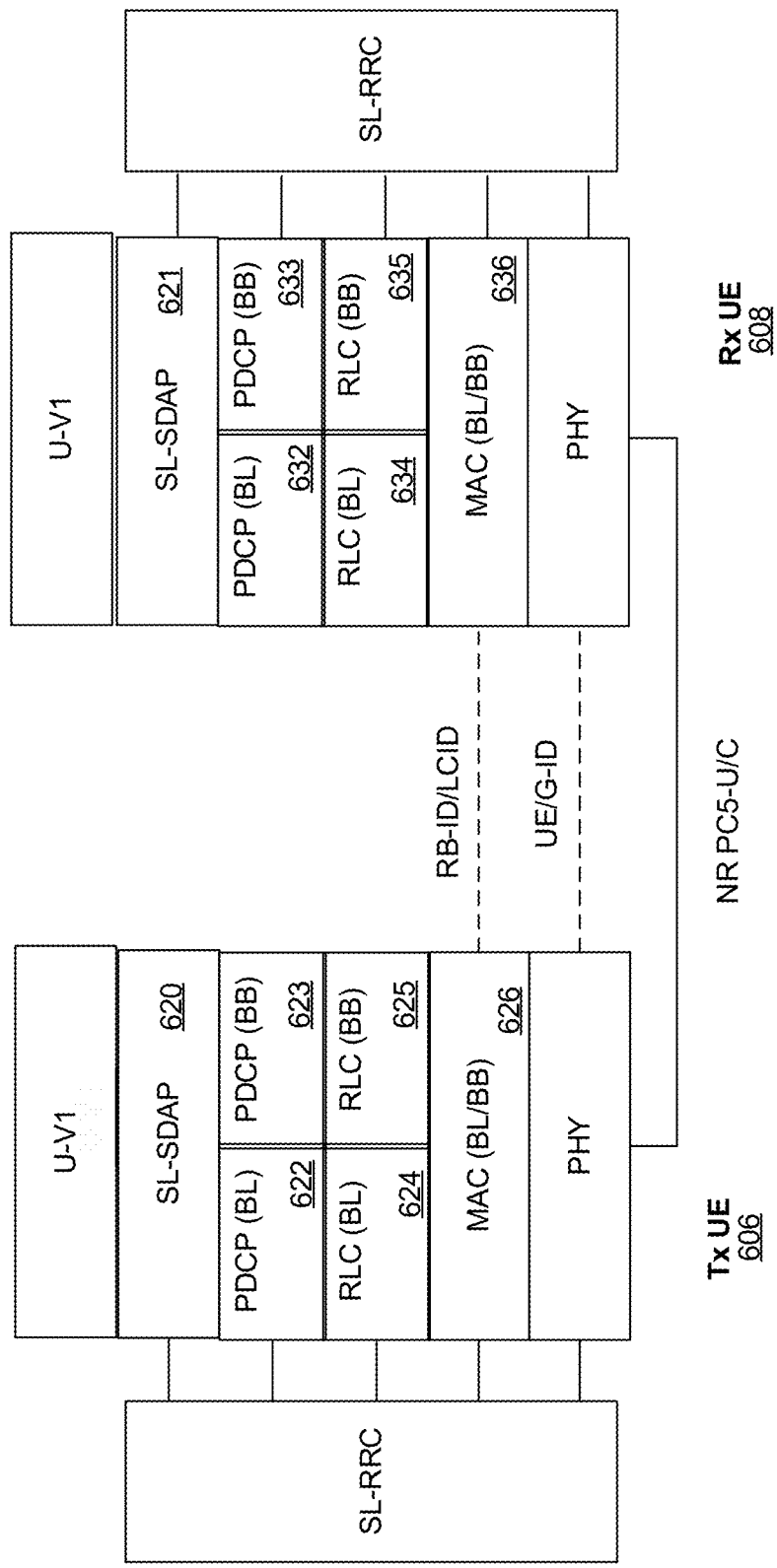
FIG. 6C illustrates an L2 protocol stack to support switching between BL and BB designs according to an embodiment.

FIG. 6C illustrates a L2 protocol stack to support switching between BL and BB designs according to an embodiment. In scenarios where the use of BB design is not sustainable due to changes in radio link conditions (e.g. channel quality deterioration, increase in congestion), it is beneficial to enable fast switching from BB to BL without undergoing SL-RB reconfiguration procedure. Likewise, in cases where the radio link between the Tx UE 606 and Rx UEs 608 stabilizes (e.g. after UE joins a platoon and the relative velocity between UEs is low), it should be possible to rapidly switch the SL-RB from BL to BB design.

Note that switching between the bearer designs implies changing the bearer type at the AS level without affecting the higher layers and maintaining the L2 IDs assigned during SL-RB configuration. While the transmission/cast type (i.e. unicast transmission, groupcast transmission) can be maintained after switching, the AS-level mechanisms (e.g. sequence number (SN) assignment in PDCP, ARQ in RLC) associated with the SL-RB are changed. The purpose of bearer design switching is to ensure that the higher layer QoS can always be satisfied and to minimize transmission interruption due to changes in radio conditions. To support the switching between the different bearer designs, the L2 protocol stack in both Tx UE 606 and Rx UEs 608 can be initially configured with both bearer design types (BB and BL for Tx UE 606: 622-626, for Rx UE 608: 632-636) with a common SDAP sublayer 620 for Tx UE 606 and 621 for Rx UEs 608. The SDAP sublayer may support a new bearer-design switching function to switch to the appropriate bearer design, while maintaining the L2 IDs (e.g. destination, source ID), based on the reception of the switching message/command.

The bearer design switching (shown in FIG. 6C) can be done semi-statically via AS-level signaling (i.e. SL-RRC/PC5-RRC) or more dynamically via SL MAC CE (sent in-band in a MAC PDU). In the dynamic case, based on the higher layer triggers (e.g. change in application and transmission type) or lower layer triggers (e.g. change in radio link conditions), the Tx UE 606 can send a MAC CE to Rx UE 608 to switch to the appropriate bearer type indicated in the MAC CE (switching command). Likewise, in a semi-static case, a switching SL-RRC message can be sent by the Tx UE 606 to Rx UE 608 based on triggering condition (i.e. based on channel conditions, congestion level, UE location information) to enable bearer-design switch. To support AS-level signaling for bearer-design switching, a default SL-RB which supports transmission and reception of signaling messages (i.e. SRB) over sidelink is established in the UEs and maintained regardless of the bearer-design used.

The triggering condition for switching can be a QoS threshold configured during SL-RB establishment. The trigger conditions may indicate that if the QoS level falls below the threshold, the switching message is sent in a MAC CE to the Rx UE 608 indicating to switch from BB to BL design and vice-versa when the QoS is above the threshold. It may also be possible for the Rx UE 608 to detect the triggering condition (e.g. change in QoS), after which an indication message (i.e. link measurement report) is sent to the Tx UE 606 to switch to the appropriate bearer design.

Figure 7:
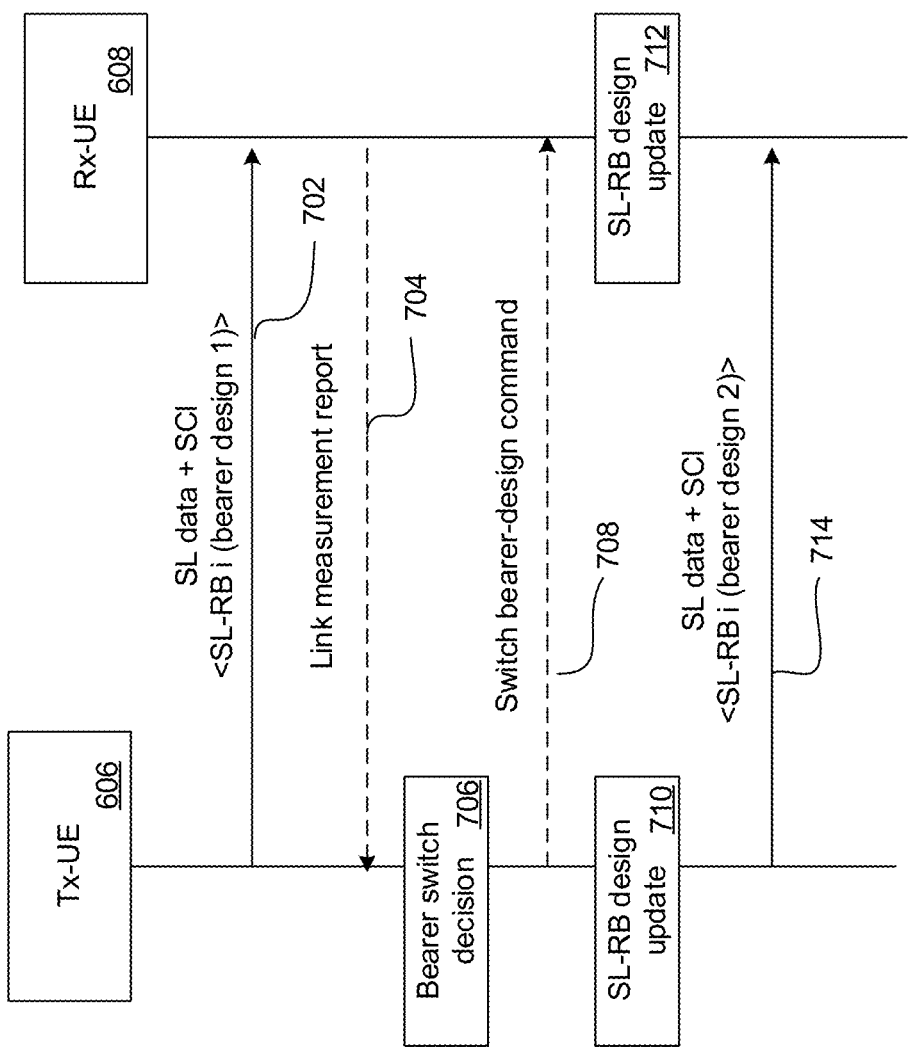
FIG. 7 illustrates signaling to support switching between BL and BB designs of FIG. 6C according to an embodiment.

FIG. 7 illustrates signaling to support switching between BL and BB designs of FIG. 6C, according to an embodiment. Referring to FIG. 7, the Tx-UE 606 may send SL data and Sidelink Control Information (SCI) on SL-RB i with a first bearer design 702 to Rx-UE 608. Then, the Rx-UE 608 may send link measurement report 704 to Tx-UE 606. As can be seen, the Tx-UE 606 makes a bearer switch decision 706 based on measurement reports received from an Rx-UE 608. Although not shown, the bearer switch decision can also be based on measurement reports made by the Tx-UE 606. Subsequently, the Tx-UE 606 may send a switch bearer-design command 708 to Rx-UE 608, and both Tx-UE 606 and Rx-UE 608 update the SL-RB 710 and 712 respectively. Then the Tx-UE 606 sends SL data and SCI on SL-RB i with an updated bearer design 714 to Rx-UE 608.

SL-RB configuration will now be discussed, according to embodiments.

The SL-RBs are configured to support sidelink transmission according to QoS requirements (PPPP/PPPR, bit rate, delay bound, reliability) and the type of transmission or type of casting (e.g. unicast transmission or groupcast transmission). Each SL-RB may be identified with a SL-RB ID. The total number of available SL-RBs may be divided between unicast and groupcast transmission modes. A set of UEs belonging to a group or a platoon may use a Group ID to denote the common V2X service subscribed (may be identified with an L2 destination ID) by all UEs in the group. In this case, the Group ID may be associated with an L2 destination ID (assigned by higher layer) and a SL-RB ID (assigned by AS layer) for a particular SL-RB supporting groupcast transmission.

The description of the entities within each sublayer in the protocol stack supporting the SL-RB are as follows.

The V2X Application/Upper/Higher Layer performs marking of PPPP, PPPR and other V2X service requirements (e.g. bit rate, delay bound, reliability, 5QI/QFI) and may provide an indication flag to indicate the type of transmission/cast corresponding to either unicast, groupcast or broadcast transmission.

The SDAP performs mapping from V2X application/service to SL-RB based on PPPP, PPPR, QFI, V2X service requirements and type of transmission or type of casting. The mapping between V2X services to SL-RBs can be one-to-one or many-to-one based on common characteristics and configured mapping rules.

The PDCP is dedicated to each SL-RB and transmission/cast type (unicast transmission, groupcast transmission). When the PDCP supports groupcast transmission, the PCDP entity can be common for all UEs pre-configured for SL-RB usage. Functionalities supported in PDCP sublayer may include ciphering, sequence number (SN) assignment, in-order packet delivery and packet duplication/removal functionalities. The initial value for the SN used by each UE may be assigned/selected from a configured SN space such that collisions with the SNs used by other UEs accessing from the same SN space concurrently is avoided. Also, for security, the keys used for ciphering/deciphering may be available at both the transmitting 606 and receiving 608 UEs, where in groupcast transmissions, the common keys are used by all receiving UEs 608 within the group.

The RLC is dedicated to each logical channel (LCH) and transmission/cast type (unicast transmission, groupcast transmission). The mapping between SL-RB to LCH may be one-to-many, considering the support of carrier aggregation and packet duplication techniques. Functionalities that are supported in RLC sublayer may include PDU segmentation/re-assembly; and the operation modes that are supported are AM, Unacknowledged Mode (UM) and Transparent Mode (TM).

The MAC is common to all SL-RBs and transmission modes (unicast transmission mode, groupcast transmission mode). The MAC performs mapping between LCHs and CCs or BWPs and can be configured to apply certain mapping restrictions on each SL-RB. Functionalities supported in the MAC sublayer may include scheduling and multiplexing/de-multiplexing.

The PHY is dedicated for each CC or BWP. The transmitted data for a particular transmission mode may be encoded using the higher layer assigned IDs (i.e. L2 destination ID) or the following AS assigned identifiers: SL unicast Radio Network Temporary Identifier (RNTI) (SL-RNTI, associated with UE ID) or cell RNTI (C-RNTI, associated with UE ID) for unicast transmission and SL group RNTI (SG-RNTI/G-RNTI, associated with Group ID) for groupcast transmission. The same identifiers are applied to decode the data at the PHY sublayer in the Rx UE(s) 608.

Figure 8A:
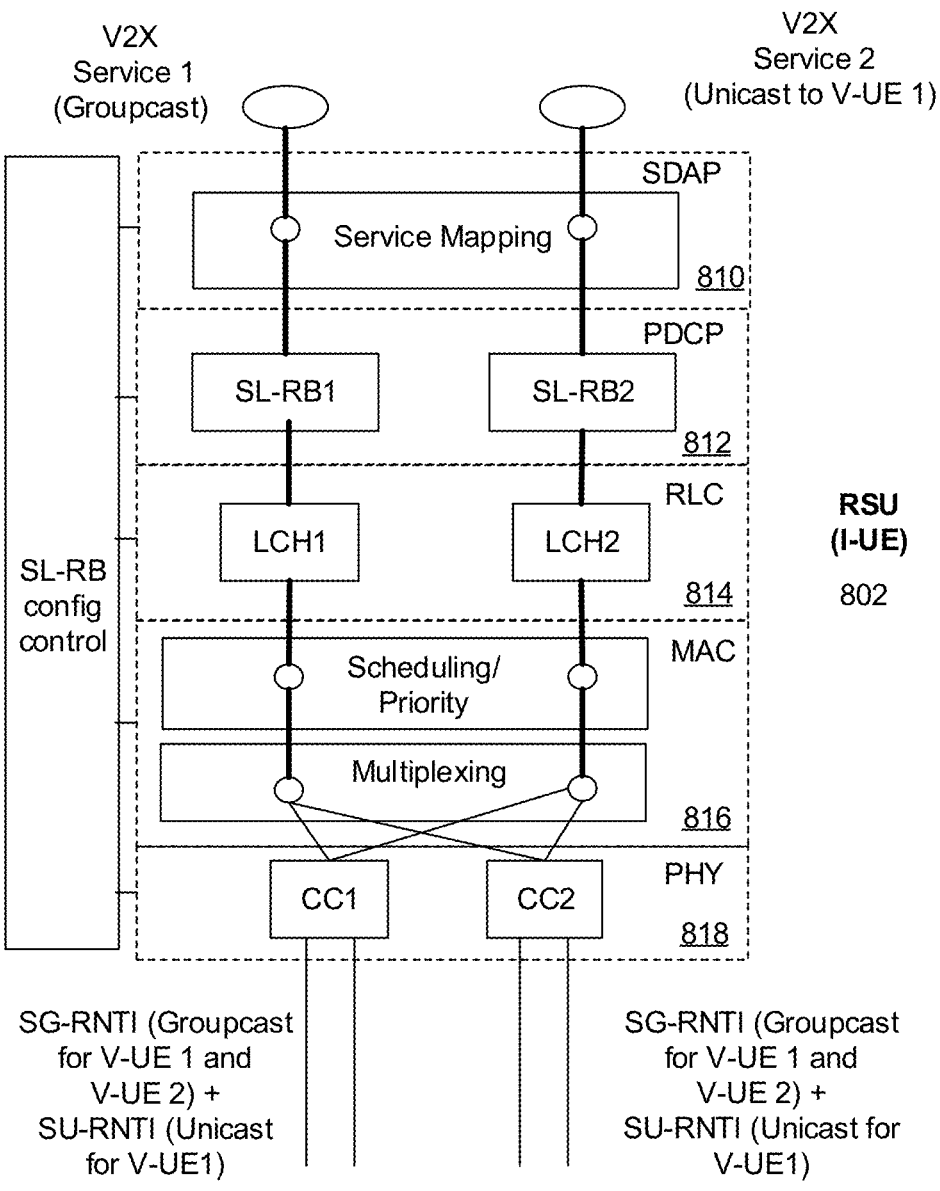
FIGS. 8A and 8B illustrate L2 protocol stack enhancements to support SL-RB (with SL-RB1 for groupcast transmissions and SL-RB2 for unicast transmissions) according to an embodiment.
Figure 8B:
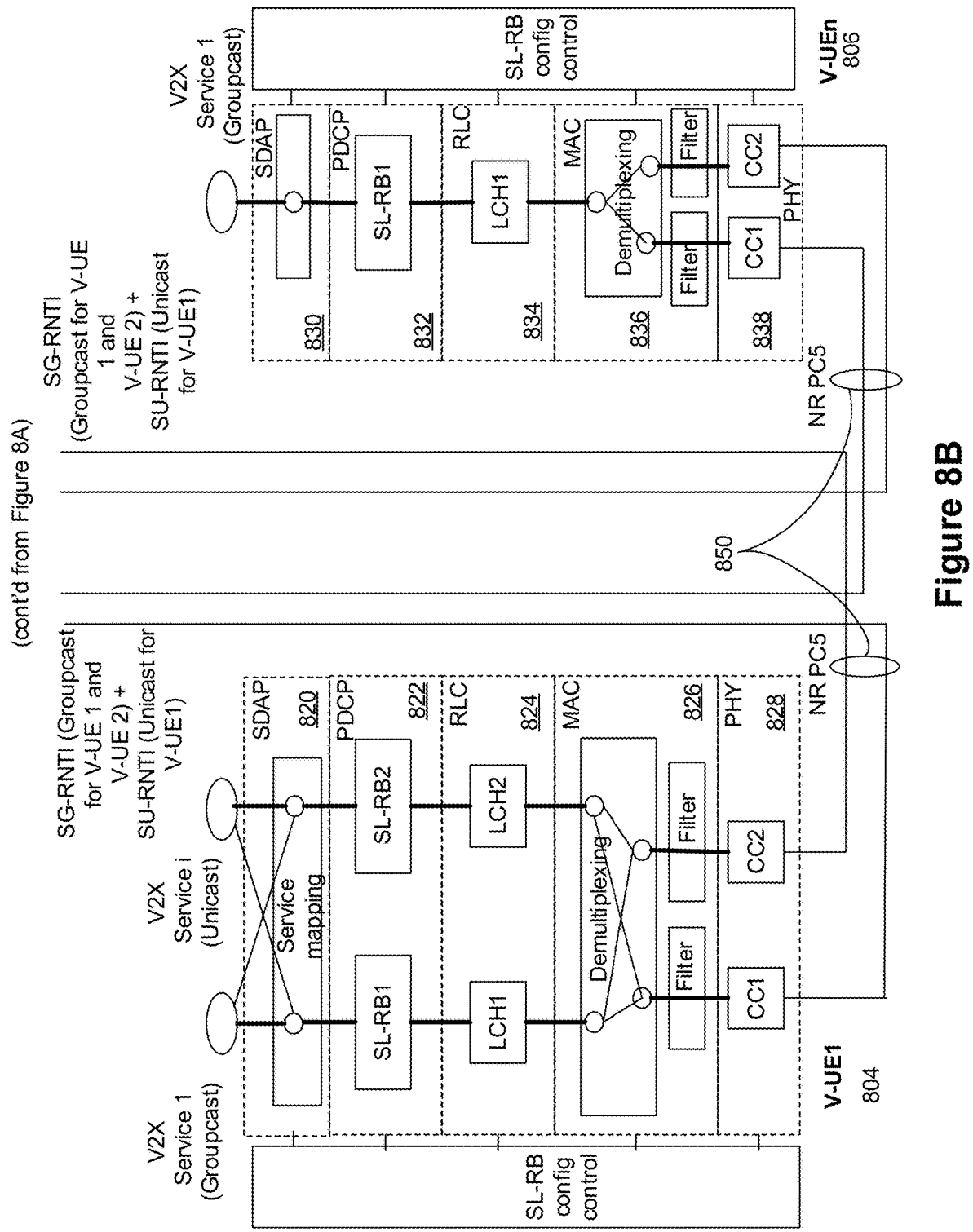

FIGS. 8A and 8B illustrate L2 Protocol Stack enhancements to support SL-RB (with SL-RB1: for groupcast transmissions and SL-RB2: for unicast transmissions) according to an embodiment. Referring to FIGS. 8A and 8B, the embodiment may comprise of UEs, which may include an RSU (I-UE) 802, a V-UE1 804 and a V-UEn 806. Each UE 802, 804, 806 protocol stack may comprise, respectively, of the following: an SDAP sublayer, 810, 820, 830, a PDCP sublayer, 812, 822, 832, an RLC sublayer 814, 824, 834, a MAC sublayer, 816, 826, 836, and a PHY sublayer 818, 828, 838. The RSU 802 may be connected to V-UE1 804 and V-UEn 806 via NR PC5 connections 850.

Figure 9A:
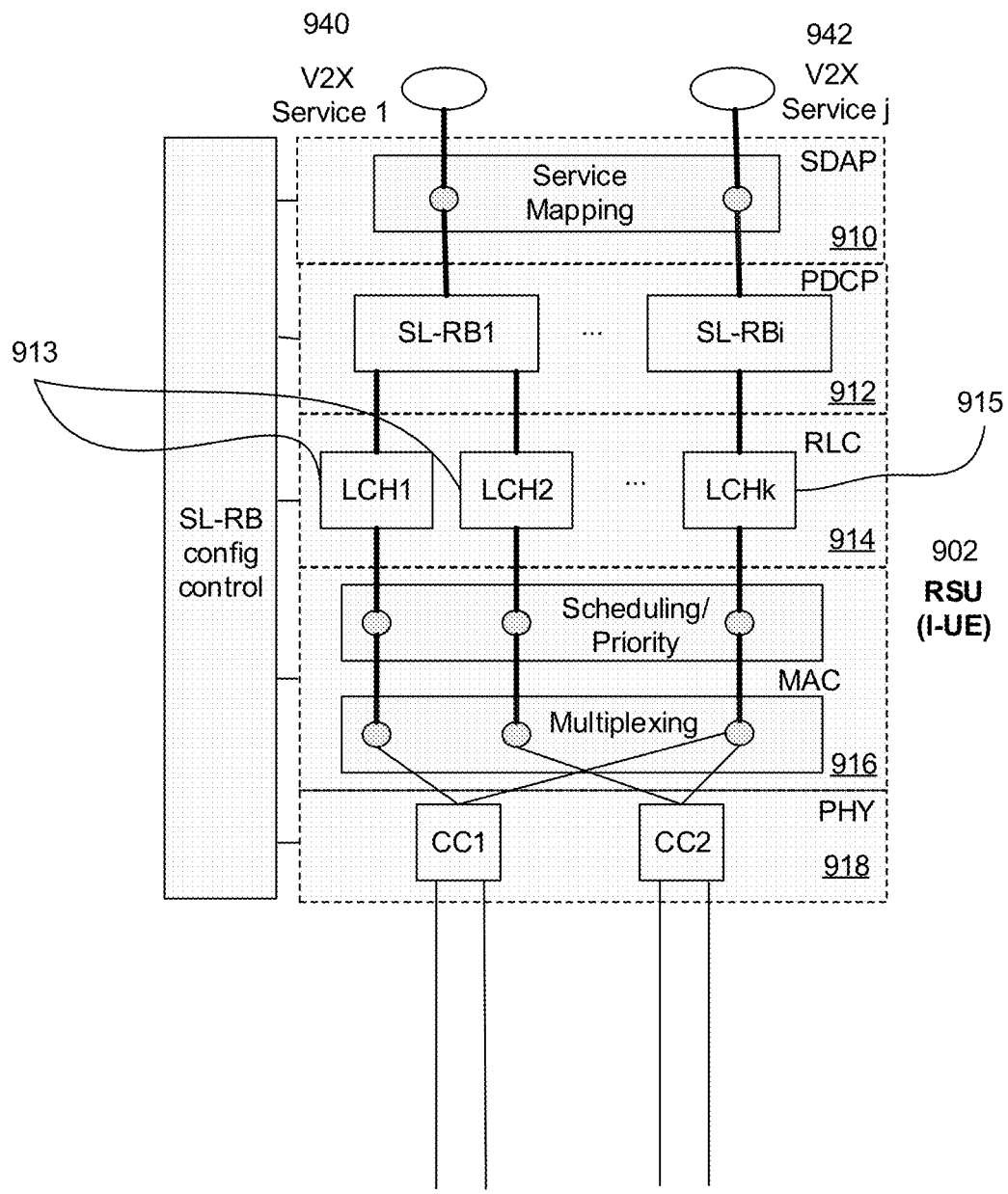
FIGS. 9A and 9B illustrate L2 protocol stack enhancements to support SL-RB with packet duplication (PD) and carrier aggregation (CA) (SL-RB1 with 2 logical channels (LCHs) for packet duplication and SL-RB i with 1 LCH for carrier aggregation) according to an embodiment.
Figure 9B:
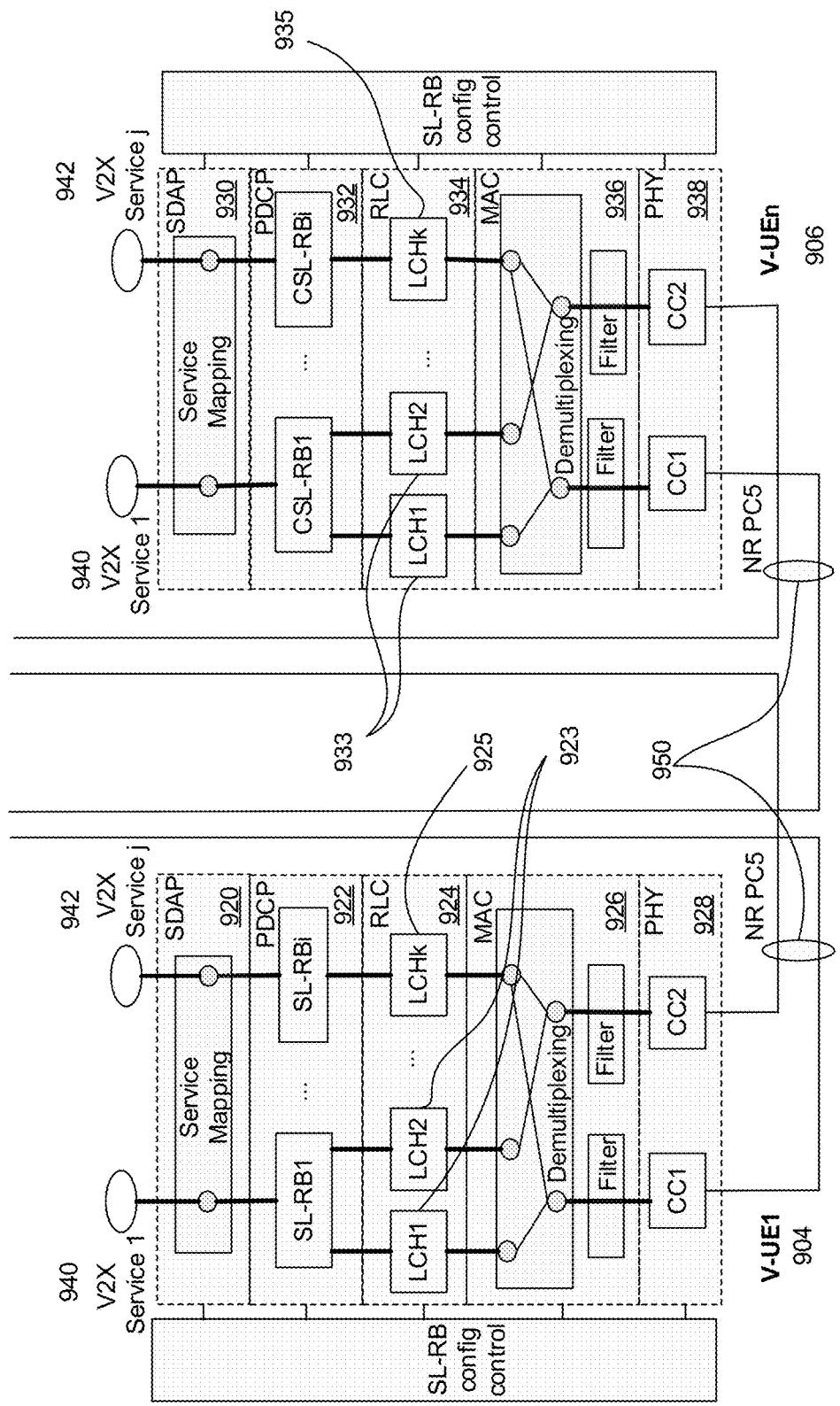

FIGS. 9A and 9B illustrate L2 protocol stack enhancements to support SL-RB with PD and CA (SL-RB1 with 2 LCHs for packet duplication and SL-RB j with 1 LCH for carrier aggregation) according to an embodiment. Referring to FIGS. 9A and 9B, the embodiment may comprise of UEs, which may include an RSU (I-UE) 902, a V-UE1 904 and a V-UEn 906. Each UE (902, 904, 906) protocol stack may comprise, respectively, of the following: an SDAP sublayer, 910, 920, 930, a PDCP sublayer, 812, 922, 932, an RLC sublayer 914, 924, 934, a MAC sublayer, 916, 926, 936, and a PHY sublayer 918, 928, 938. The RSU 902 may be connected to V-UE1 904 and V-UEn 906 via NR PC5 connections 950. Each RLC sublayer 914, 924, 934 of the UEs (902, 904, 906) provides for 2 logical channels for V2X service 1 940 for packet duplication (for RSU (I-UE) 902, 2 logical channels 913, for V-UE 1 904, 2 logical channels 923, for V-UEn 906, 2 logical channels 933) and 1 logical channel for V2X service j 942 for carrier aggregation (for RSU (I-UE) 902, 1 logical channels 915, for V-UE 1 904, 1 logical channels 925, for V-UEn 906, 1 logical channels 935).

The three example options for configuring a SL-RB and indicating, via in-band, the operation status (activate, deactivate, switch) of the SL-RB will now be discussed in more detail.

Figure 10:
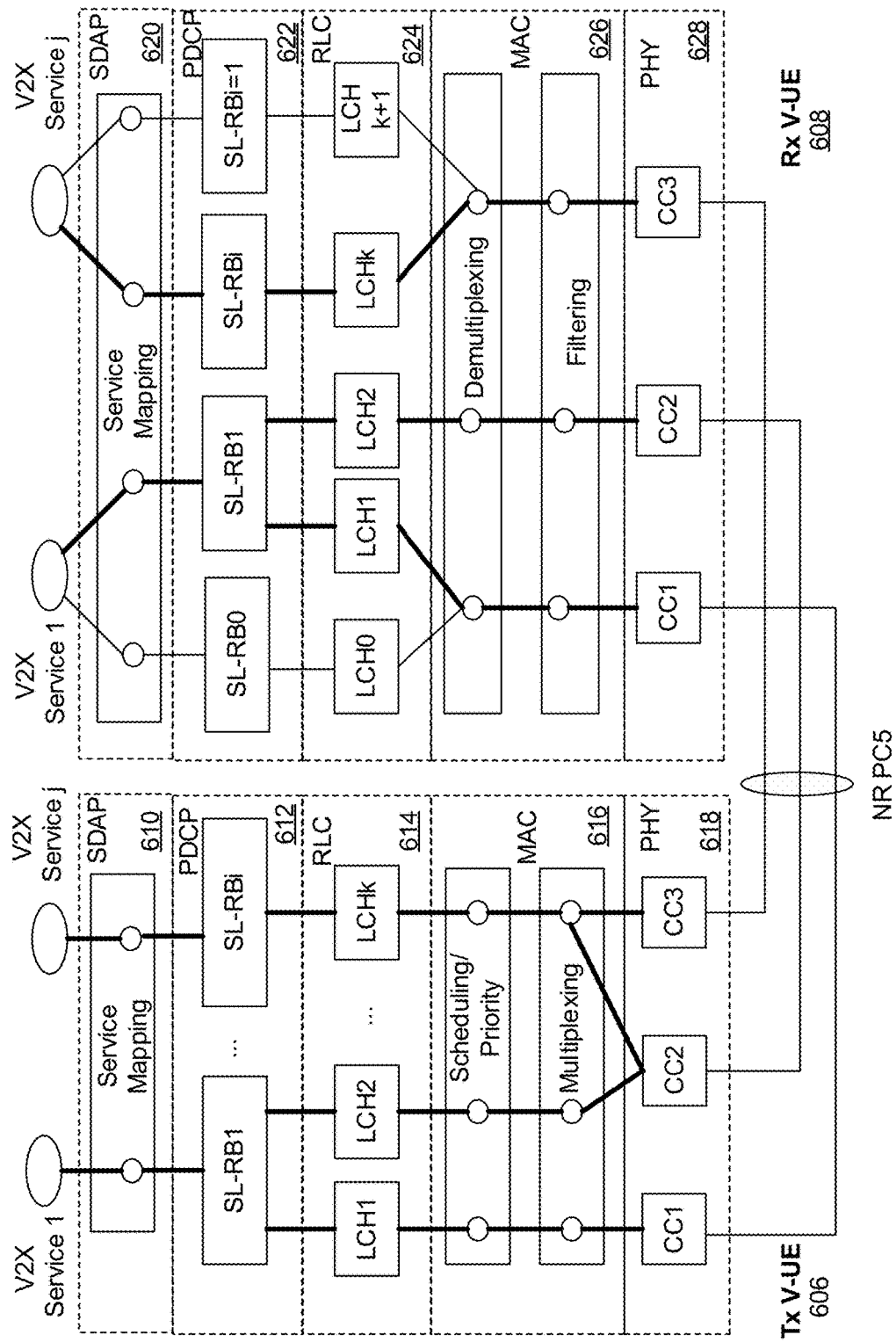
FIG. 10 illustrates an L2 protocol stack when supporting in-band SL-RB activation option according to an embodiment.

FIG. 10 illustrates an L2 protocol stack when supporting in-band SL-RB activation option according to Option 1 as discussed elsewhere herein. According to an embodiment, Option 1 provides for an in-band SL-RB configuration including the following.

In the case of an in-band SL-RB activation, each Tx UE 606 and Rx UE 608 may be pre-configured with different sets of SL-RBs (unicast, groupcast, broadcast) and SL-RB designs (BL and BB), each corresponding to a certain QoS profile. The L2 protocol stack for each pre-configured SL-RB, corresponding to the SL-RB design that can be supported by the Tx UEs 606 and Rx UEs 608, may contain: SL-SDAP sublayer 610 for mapping between/from higher layer (V2X application) and/to SL-RB; mapping between/from a number of CCs or BWPs at the PHY sublayer 618, 628 and/to a MAC entity in the MAC sublayer 616, mapping between/from the MAC entity and/to a set of logical channels (RLC entities in the RLC sublayer 614, 624), and mapping between/from RLC entities and/to a PDCP entity in the PDCP sublayer 612, 622. The pre-configuration may further contain parameters corresponding to each sublayer which include logical channel prioritization (LCP), buffer space and buffer thresholds, criteria for packet duplication activation (e.g. CBR threshold), packet filtering and multiplexing/de-multiplexing. The pre-configuration may further contain: support for in-band signaling of SL-RB activation message using MAC CE; support for in-band signaling of SL-RB operation status message using MAC CE; and configuration of a default SL-RB with both unicast and groupcast transmission capability. The default SL-RB can be used for the transmission and reception of any MAC PDUs containing data and MAC PDUs containing MAC CEs.

The pre-configuration may be performed via an RRC (during initial access over NG Uu interface) by the RAN. Alternatively, the parameters required for the pre-configuration may be indicated to the UEs via the SIBs.

Prior to transmission, the Tx UE 606 selects a pre-configured SL-RB that can best satisfy the QoS profile of a particular supported V2X service.

Next, the selection of the SL-RB is indicated in a SL-RB selection message in-band to the Rx UE(s) 608. The operation status for the selection of the SL-RB is also indicated in a SL-RB selection message in-band to the Rx UE(s) 608 to perform one of the following: activate and use a specific pre-configured SL-RB, deactivate or suspends a specific pre-configured SL-RB, or switch between bearer design types of a specific pre-configured SL-RB.

The SL-RB selection message indicating the selected SL-RB (labeled with a SL-RB ID) and the SL-RB operation status message indicating the operation status of the selected SL-RB may be included in a single MAC CE. Alternatively, the SL-RB selection message and the SL-RB operation status message may be included in two different MAC CEs. The format of the MAC CE follows a certain standardized bit-string or bitmap. The SL-RB selection message may be transmitted using the default SL-RB.

The Tx UE 606 may also provide a configuration reservation determinant (CRD) message to indicate the duration or time period during which the applied configuration is active (to support semi-persistent configuration) in either the same or a different MAC CE. Alternative to the reservation duration, the CRD message may indicate the following resource related information: i) maximum number of packets in the packet flow, ii) total buffer of the data for transmission, iii) maximum number of packets per time interval, and iv) PDCP sequence number range (initial and maximum).

If the configuration reservation determinant can be supported, the Rx UE 608 may acknowledge its capability to the Tx UE 606 in a different MAC CE. Otherwise, when the Rx UE 608 is unable to accommodate the reception of the packet flow in the specified determinant, an updated reservation determinant may be indicated to the Tx UE 606.

Based on the received indications, the Rx UE 608 activates and uses the selected SL-RB according to the pre-configured configuration information and information in the CRD. After reception of the packets transmitted by the Tx UE 606, the SL-RB ID contained in the MAC header is used to assign and treat the packets in accordance to the applied configuration. After the CRD validity of the applied SL-RB expires, the Rx UE 608 deactivates the SL-RB.

The selected SL-RB may also be released if a SL-RB operation status indicated in the SL-RB selection message (e.g., a deactivation message) is received or if no packets are received from the Tx UE 606 beyond a certain pre-configured duration. Alternatively, the selected SL-RB may be switched between bearer design types (BL and BB) if the SL-RB selection message (e.g. a switch message) is received at the Rx UE 608 due to detection of a switching criteria (e.g. change in channel conditions with respect to a threshold).

Figure 11:
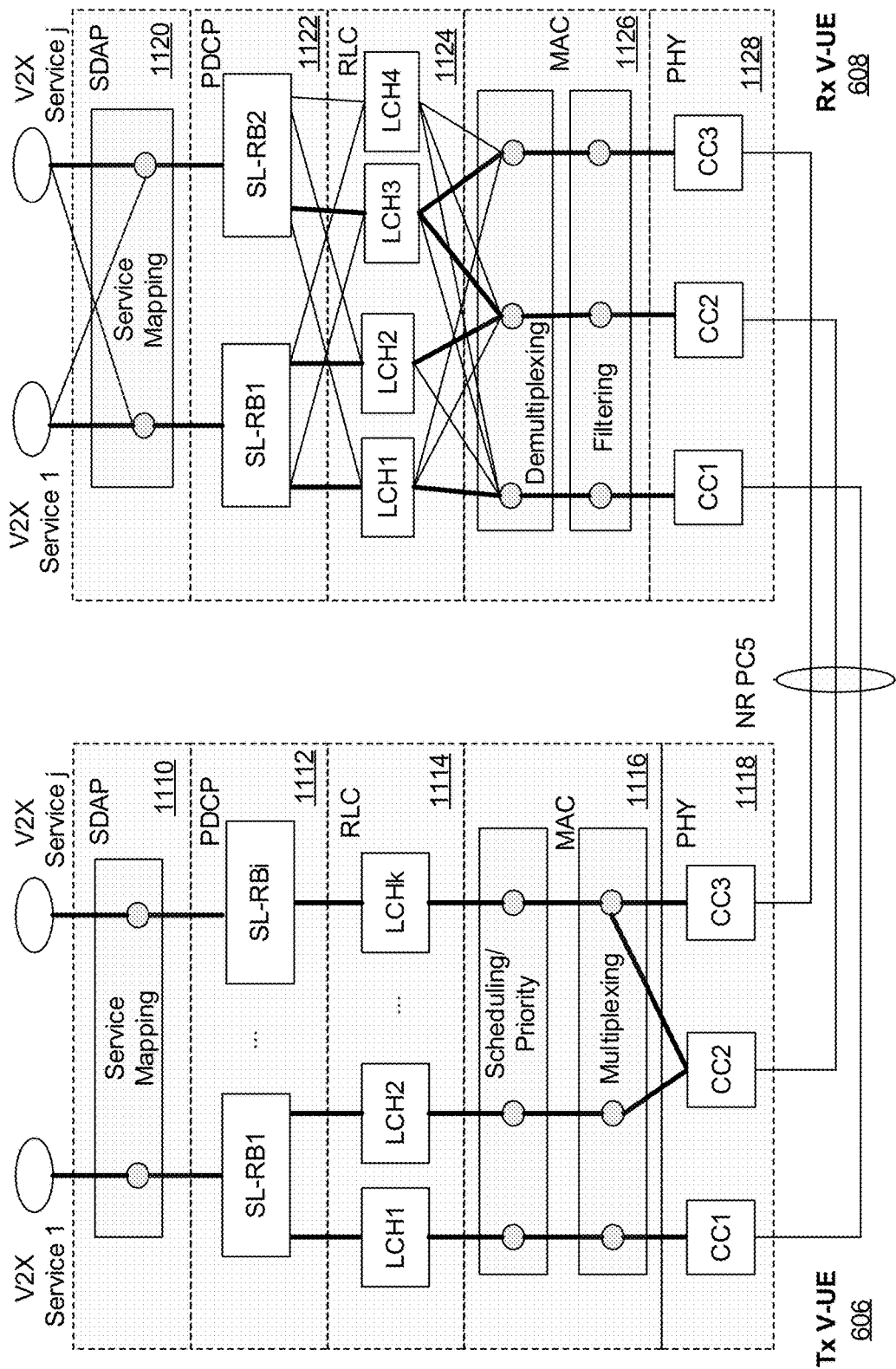
FIG. 11 illustrates an L2 protocol stack when supporting in-band SL-RB configuration option according to an embodiment.

FIG. 11 illustrates a L2 Protocol stack when supporting in-band SL-RB configuration according to Option 2 as discussed elsewhere herein. Option 2: In-band SL-RB configuration may include the following, according to an embodiment.

To support in-band SL-RB configuration, each Tx UE 606 and Rx UE 608 may be pre-configured with criteria/rules by which different types of SL-RBs can be supported and customized by the Tx UE 606 to satisfy the different QoS requirements of the V2X services. Each Tx UE 606 and Rx UE 608 may be further pre-configured with a number of L2 protocol stacks comprising a set of CCs or BWPs at the PHY sublayer 1118 and 1128, a MAC entity in the MAC sublayer, 1116, 1126, a set of logical channels (in the RLC sublayer 1114, 1124) corresponding to RLC entities and a PDCP entity, in the PCDP layer 1112, 1122. The mapping between the functional entities of each sublayer is not defined, neither are the parameters at different sublayers to handle prioritization (LCP), buffer sizes and thresholds, packet filtering and multiplexing/de-multiplexing configurations. Each Tx UE 606 and Rx UE 608 may be further pre-configured with: support for in-band signaling of SL-RB configuration message using MAC CE; support for in-band signaling of SL-RB operation status message using MAC CE; and configuration of a default SL-RB with both unicast and groupcast transmission capability. The default SL-RB can be used for the transmission and reception of any MAC PDUs containing data and MAC PDUs containing MAC CEs.

The SL-RB pre-configuration may be performed either via a RRC connection (during initial access over NG Uu interface) by RAN or indicated via the SIBs.

Prior to transmission, the Tx UE 606 selects an appropriate SL-RB configuration that can best satisfy the QoS profile of a particular supported V2X service. The selected SL-RB configuration information is indicated in-band to the Rx UE(s) 608. The selected SL-RB configuration information may include any of the following information: i) SL-RB ID (i.e. the ID may refer to a SL-RB type), ii) mapping between the sublayers in L2 protocol stack, iii) parameters affecting each sublayer (SDAP 1110, 1120, PDCP 1112, 1122, RLC 1114, 1124 MAC 1116, 1126), iv) PPPP (priority), v) PPPR (reliability), and vi) QFI/5QI.

Next, the operation status for the selected SL-RB is also indicated in an SL-RB selection message to the Rx UE(s) 608 in-band to: i) activate a specific pre-configured SL-RB, or ii) deactivate a specific pre-configured SL-RB, or iii) switch between bearer design types a specific pre-configured SL-RB. A SL-RB configuration message indicating the selected SL-RB configuration (labeled with a SL-RB ID) and the SL-RB selection message indicating the operation status of the selected SL-RB may be included in either a single MAC CE containing both messages. Alternatively, the SL-RB configuration message and the SL-RB operation status message may be included in two different MAC CEs. The format of the MAC CE follows a certain standardized bit-string or bitmap. The SL-RB configuration message may be transmitted using the default SL-RB.

The Tx UE 606 may also provide a configuration reservation determinant (CRD) message to the Rx UE 608 to indicate the duration or time period during which the applied configuration should remain active between the Tx UE 606 and Rx UE 608. Alternative to the duration, the CRD message may indicate the following resource related information: i) maximum number of packets in the packet flow, ii) total buffer of the data for transmission, iii) maximum number of packets per time interval and iv) PDCP sequence number range (initial and maximum).

The CRD is intended to achieve a semi-persistent configuration (SPC) where the configuration is valid only within the indicated determinant (e.g. duration, max packets, SN range). The CRD typically corresponds to the estimated transmission duration or estimated number of packets for the Tx UE 606 to complete the transmission of a flow of packets to the Rx UE 608. The CRD can be indicated to the Rx UE 608 in either the same MAC CE as that of the SL-RB configuration or in a different MAC CE.

If the reservation determinant can be supported, the Rx UE 608 may acknowledge the capability to the Tx UE 606 in a different MAC CE. Otherwise, when the Rx UE 608 is unable to accommodate the reception of the packet flow in the specified determinant, an updated reservation determinant may be indicated to the Tx UE 606.

Based on the received indications, the Rx UE 608 applies and caches the selected SL-RB configuration as per the CRD. Upon reception of the packets transmitted by the Tx UE 606, the SL-RB ID contained in the MAC header is used to assign and treat the packets in accordance with the applied configuration. Once the CRD validity of the applied SL-RB configuration expires, the Rx UE 608 releases the configuration.

The selected SL-RB configuration may also be released if a SL-RB selection message (e.g. a deactivation message) is received or if no packets are received from the Tx UE 606 beyond a certain pre-configured duration. Alternatively, the selected SL-RB configuration may be switched between bearer design types (BL and BB) if the SL-RB operation status message (e.g. a switch message) is received at the Rx UE 608 due to detection of a switching criteria (e.g. change in channel conditions with respect to a threshold).

Figure 12:
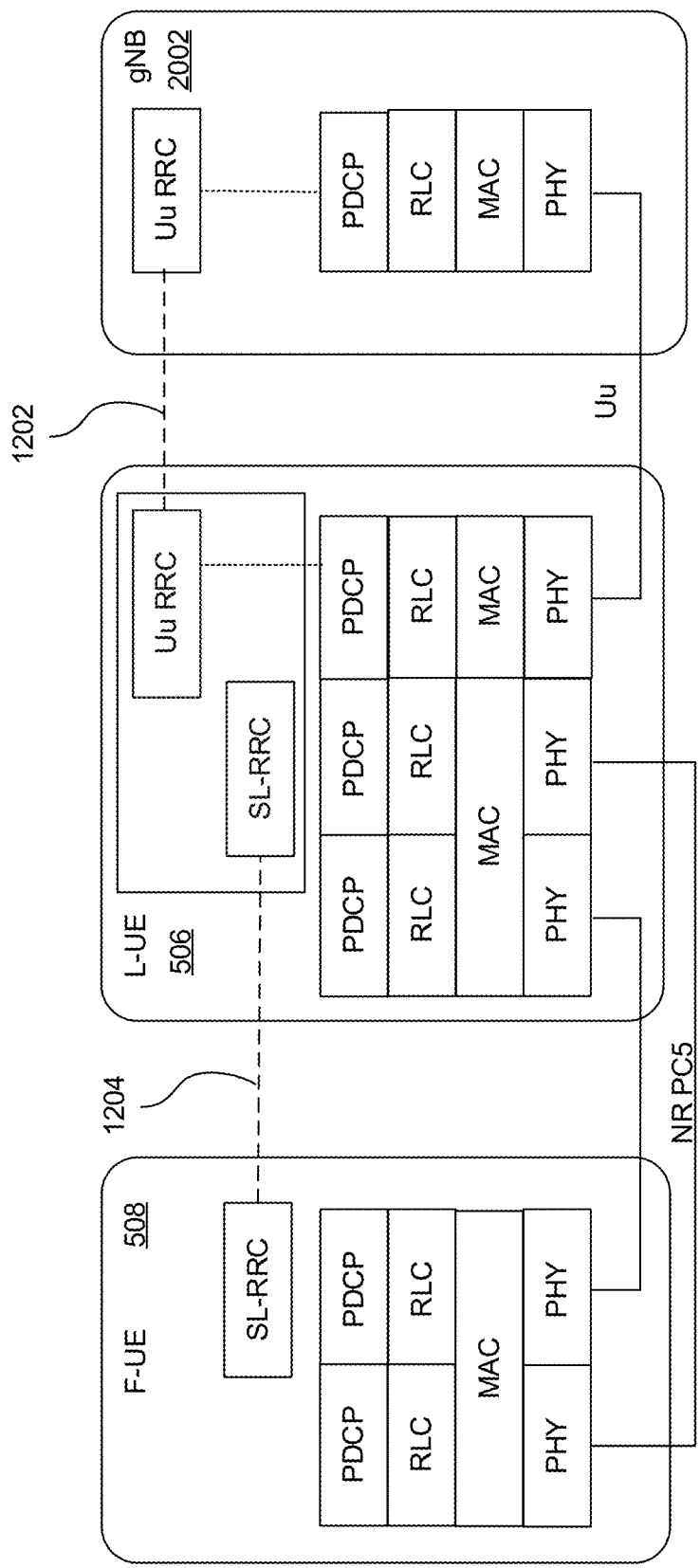
FIG. 12 illustrates an L2 protocol stack showing AS-level SL-RRC logical connection according to an embodiment.

FIG. 12 illustrates a L2 protocol stack showing AS-level SL-RRC logical connection according to an embodiment. Referring to FIG. 12, the L-UE 506 may have a Uu RRC connection 1202 with a radio access network (RAN) node, for example, a gNB (i.e, RAN node) 2002. The L-UE 506 may have an SL-RRC connection 1204 with an F-UE 508.

Figure 13:
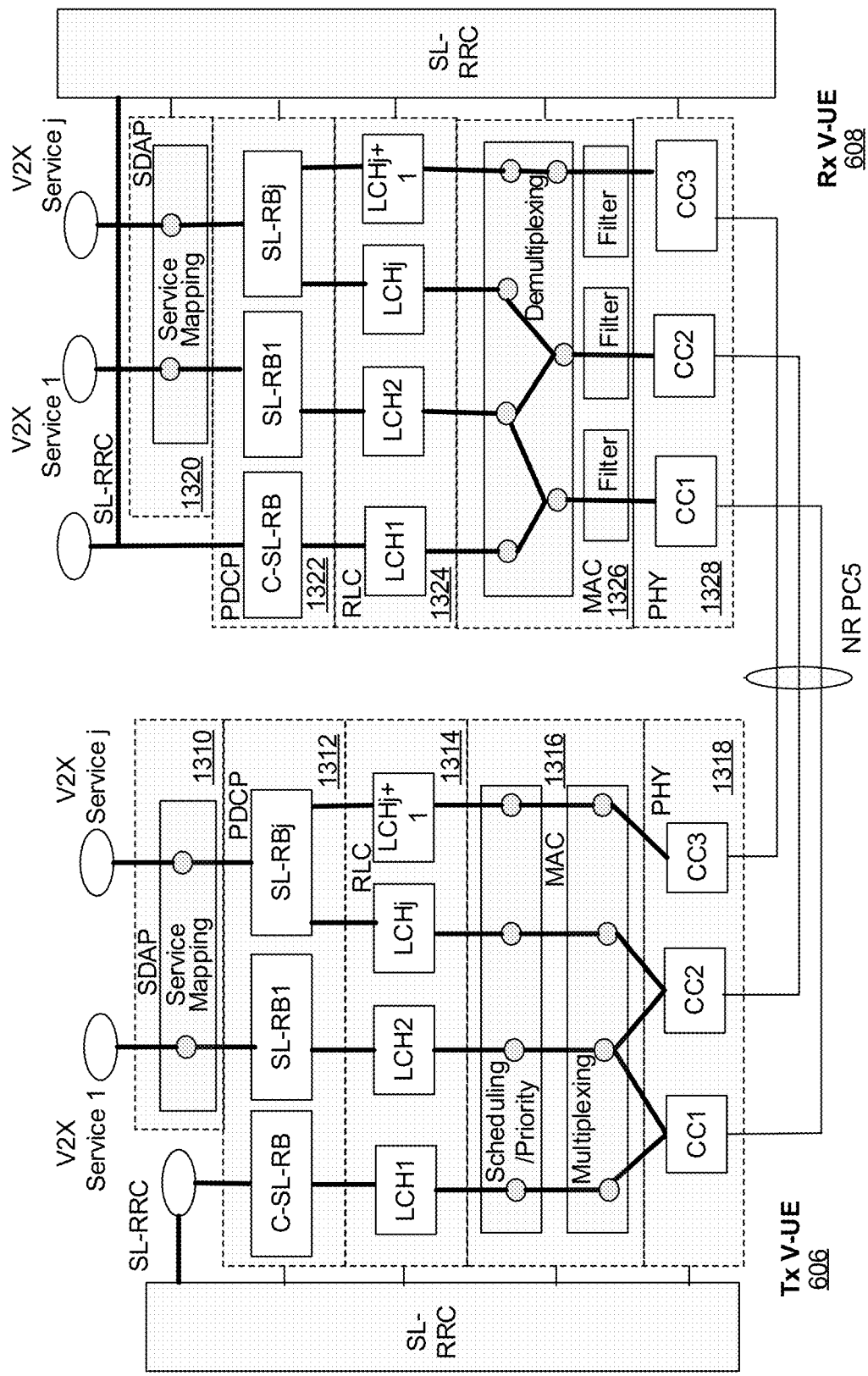
FIG. 13 illustrates an L2 protocol stack when supporting Sidelink RRC based configuration option according to an embodiment.

FIG. 13 illustrates a L2 protocol stack when supporting Sidelink RRC based configuration according to Option 3. According to an embodiment, the Option 3 Sidelink RRC based configuration may include the following. For each Tx V-UE 606 and Rx V-UE 608, the control signaling sidelink radio bearer (C-SL-RB) may comprise of the following sublayers: 1320, PDCP 1312, 1322, RLC 1314, 1324, MAC 1316, 1326, and PHY 1318 and 1328.

The alternative method to configure SL-RB is based on the sidelink RRC (SL-RRC or PC5 RRC). To support SL-RRC, the existing PC5 interface need to be enhanced so that similar CP (AS-level) signaling with SRBs used over the NG Uu interface (between the UE and RAN) can also be applied over the NR PC5 interface (between UE and UE). However, different from the conventional (NG-Uu) RRC, the capabilities supported over SL-RRC can be limited. In particular, for security and privacy reasons, the UEs can be pre-configured with certain criteria/rules for using the SL-RRC during initial access. Additionally, only certain types of UEs such as the RSUs or Leading UEs (L-UEs 506 in a platoon) may be provided with the proper authorization to perform configuration using the SL-RRC for other UEs.

In general, with enhancements on the NR PC5 interface, the SL-RRC/PC5-RRC can be used to support the following capabilities at the AS-level: configuration of SL-RBs (establishment, modification and release). The configuration of SL-RBs may comprise an authorized UE (e.g. Tx UE 606) directly provides to another UE (e.g. Rx UE 608) the SL-RB configuration for establishment of a new SL-RB, modification of an existing SL-RB, and/or release of an existing SL-RB via AS-level (SL-RRC or PC5 RRC) messages. In this case, both SL-RB configuration and SL-RB operation status (e.g. activation/deactivation of SL-RB) indications can be provided in SL-RRC messages.

In some embodiments, the NR PC5 interface may be enhanced to provide support for configuration of SL-resource pool and SL-configured grant (SPS or grant free). In some embodiments, an authorized UE directly provides to another UE the resource pool configuration or grant free resources, indicating the pool of resources or resource grants from which the Rx UE 608 can select and reserve the resource when transmitting packets to other UEs over the NR PC5 interface.

In some embodiments, the NR PC5 interface may be enhanced to support Mode switching triggering (wherein the SL-RRC may be used to switch between Mode 1 and Mode 2 operations, for example, switching from Mode 1 to Mode 2 or from Mode 2 to Mode 1) and also simultaneously support of both Mode 1 and Mode 2 operations. In some embodiments a Mode switch triggering (i) Mode 1 to Mode 2, and ii) Mode 2 to Mode 1 and iii) simultaneously support Mode 1 and Mode 2): an authorized UE directly provides to another UE with the capability to support both Mode 1 and Mode 2, a mode triggering message to change between Mode 1 and Mode 2 based on a criteria configured by RAN. The criteria may include change in QoS, change in UE location, change in availability in radio resources and change in SL channel condition. In some embodiments, the NR PC5 interface may be enhanced to support mode resource selection assistance for Mode 2 UEs (wherein the SL-RRC may be used to further support mode resource selection assistance for Mode 2 UEs). In some embodiments an authorized UE assists another UE operating in Mode 2 to either forward the resource request (scheduling request (SR)/buffer status report (BSR) or RRC messages) to the gNB (i.e, RAN node) or allocates the radio resources to the Rx UE 608.

In some embodiments, the NR PC5 interface may be enhanced to support configuration of criteria for packet duplication activation (wherein the SL-RRC may be used to further support configuration of criteria for packet duplication activation (i.e. CBR threshold)). In some embodiments an authorized UE directly configures another UE the criteria to activate and deactivate packet duplication when transmitting over NR PC5 interface. The criteria may include change in the CBR level relative to a CBR threshold, change in UE location (relative to authorized UE) and change in SL-SNR relative to an SNR threshold in a set of component carriers.

In some embodiments, the NR PC5 interface may be enhanced to support SL QoS management (wherein the SL-RRC can be used to further support SL QoS management (mapping of V2X service to SL-RBs)). In some embodiments an authorized UE directly configures in another UE, particularly in the SL-SDAP sublayer 1310 and 1320, the mapping rules to map from QoS indicators in higher layer packets (e.g. PPPP, PPPR, 5QI, PQI) to SL-RBs in AS-layer.

In some embodiments, the NR PC5 interface may be enhanced to support mobility management (wherein the SL-RRC may be used to further support mobility management including SL handover and sidelink context transfer). In some embodiments an authorized UE assists another UE in the make-before-break handover procedure by obtaining the control plane context (e.g. RACH preambles, conditional handover rules, bearer configuration, (SPS) resource configuration) from target gNB (i.e, RAN node) while still remaining within the coverage area of the source gNB (i.e, RAN node) via the NR PC5 interface.

In some embodiments, the NR PC5 interface may be enhanced to support SL channel reporting (wherein the SL-RRC may be used to further support SL channel measurement reporting). In some embodiments, an authorized UE configures in another UE to perform measurements of the radio channels (i.e. Signal to noise ratio (SNR), reference signal received power (RSRP), channel state information CSI, Channel busy ratio (CBR), Channel occupancy ratio (CR) in a set of component carriers and report the measurement results to the authorized UE.

To support SL-RRC and SL-RBs, the pre-configuration in the Tx UEs 606 and Rx UEs 608 may contain the following: the establishment of a (default) sidelink signaling RB for V2X (SRB-V or SL-SRB or PC5 RRC) and the criteria for SL-RRC usage (i.e. rules to configure SL-RBs based on QoS requirements). The SRB-V/SL-SRB can be used for the transmission and reception of any SL-RRC messages with unicast and groupcast transmission capability. In unicast, the SL-RRC messages sent by the Tx UE 606 may include the intended UE ID of the Rx UE 608 in the MAC protocol data unit (PDU) subheader. In groupcast, an authorized Tx UE 606 may perform AS-level configuration by sending the SL-RRC messages to multiple Rx UEs 608 simultaneously using the groupcast SRB-V/SL-SRB. The subheader of the MAC PDUs transporting the groupcast SL-RRC messages contain the Group ID used by all Rx UEs 608 in the group/platoon. The pre-configuration in the Tx UEs 606 and Rx UEs 608 may further contain: support for SL-RRC signaling for configuring SL-RBs via the transmission of SRB-V/SL-SRB messages, support for in-band signaling of a SL-RB operation status message using MAC CE; and support for SL-RB and the corresponding mapping from QoS indicator (e.g. QFI/5QI/PQI), PPPP, PPPR to specific L2 protocol configuration.

The pre-configuration by the network may be performed either via RRC (during initial access over NG Uu interface) or indicated via the SIBs.

Prior to transmission, the Tx UE 606 determines a SL-RB configuration that can best satisfy the QoS profile of a particular supported V2X service. Next, in order to establish a SL-RB, the parameters for the SL-RB configuration are sent as SL-RRC messages using SRB-V/SL-SRB in the Tx UE 606 to the SRB-V/SL-SRB in the Rx UE(s) 608. Note that in groupcast, the SL-RB in multiple Rx UE(s) 608 can be configured simultaneously via transmission of SL-RRC messages.

Similar SRB-V/SL-SRB messages can be used to modify (or to release) the SL-RB configuration (i.e. using SL-RRC reconfiguration procedure) when the mapping between the L2 entities or the parameters affecting the L2 entities need to be updated.

The SL-RB configuration may be usable immediately after performing SL-RRC-based configuration where the Tx UE 606 is able to send data packets using the configured SL-RB to the Rx UE 608. Alternatively, the SL-RB may be initially retained in a suspended state after SL-RRC configuration. Then, in some embodiment, the Tx UE 606 includes the SL-RB operation status in the SL-RB selection message in a MAC CE (similar to Option 1 and 2 as discussed elsewhere herein) and sends the MAC CE to the Rx UE 608 to activate a previously configured SL-RB prior to the transmission of data packets. In this embodiment, the SL-RB operation status MAC CE may follow a certain standardized bitmap, containing the list of all SL-RBs that require to be activated. In some alternative embodiments, Tx UE 606 includes the operation status message in the SL-RRC message. The Tx UE 606 may deactivate a set of SL-RBs by sending the SL-RB operation status message in a MAC CE or in a SL-RRC message to the Rx UE 608. Likewise, the Tx UE 606 may instruct the Rx UE 608 to switch between bearer designs for a SL-RB configuration by sending the SL-RB operation status message (e.g., switch message) in a MAC CE or in a SRB-V message.

The Tx UE 606 may also provide a configuration reservation duration (CRD) message to indicate the duration or time period during which the applied configuration is active (to support CPC) in a different MAC CE. Alternative to the duration, the CRD may indicate the following resource parameters: i) maximum number of data packets in the packet flow, ii) total buffer size for transmission, iii) maximum number of data packets per time interval and iv) PDCP sequence number range (initial and maximum).

If the reservation determinant can be supported, the Rx UE 608 may acknowledge the capability to the Tx UE 606 in another MAC CE. Otherwise, the Rx UE 608 determines it is unable to accommodate the reception of the data packet in the packet flow in the specified determinant, and an updated reservation determinant may be indicated, by the Rx UE 608, to the Tx UE 606.

Procedures and Signaling Flows for supporting SL-RBs will now be discussed, according to embodiments.

Figure 14:
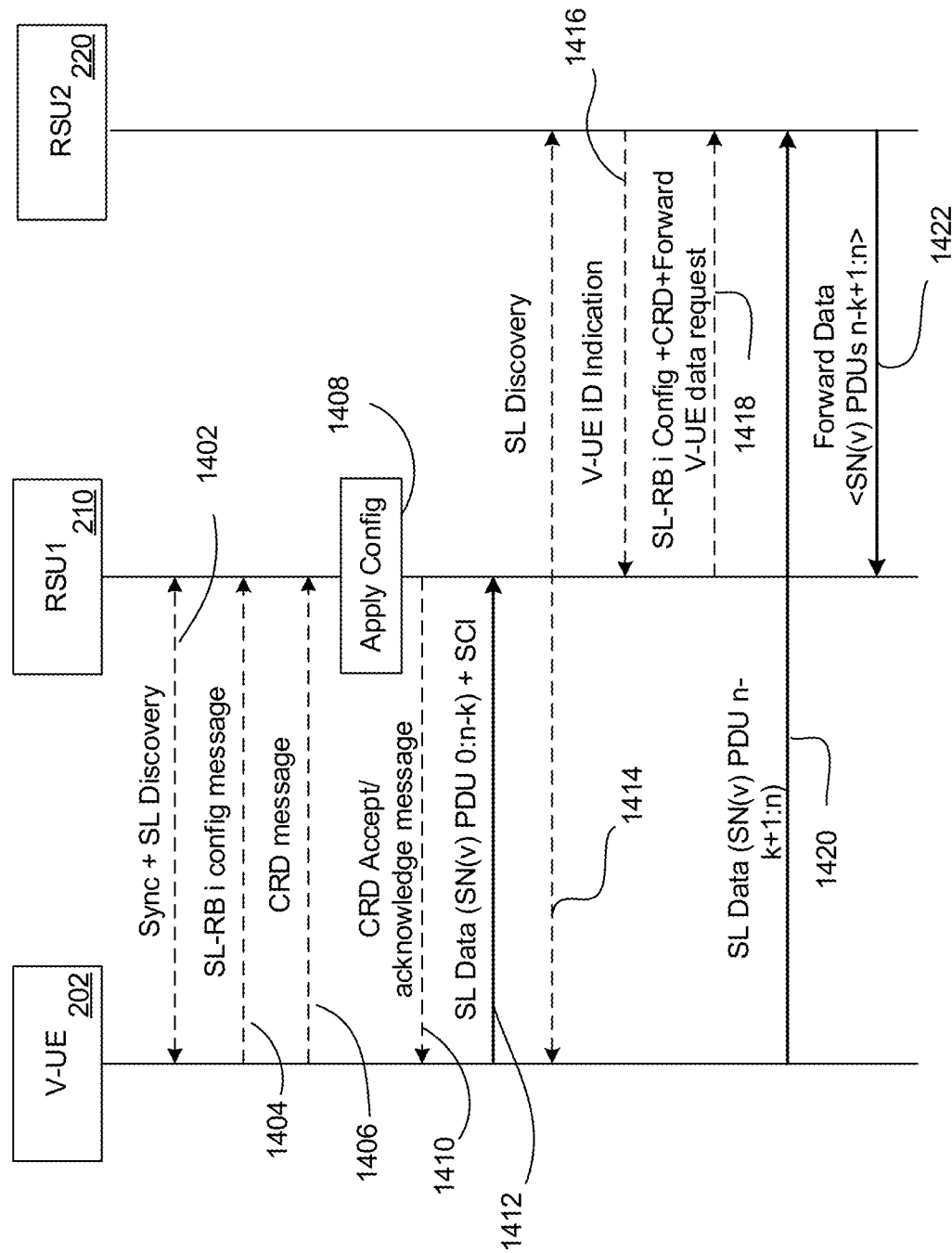
FIG. 14 is a call flow diagram illustrating transmission of a packet flow using SL-RB from a mobile V-UE to stand-alone RSUs when configuration reservation determinant (CRD) is accepted according to an embodiment.
Figure 15:
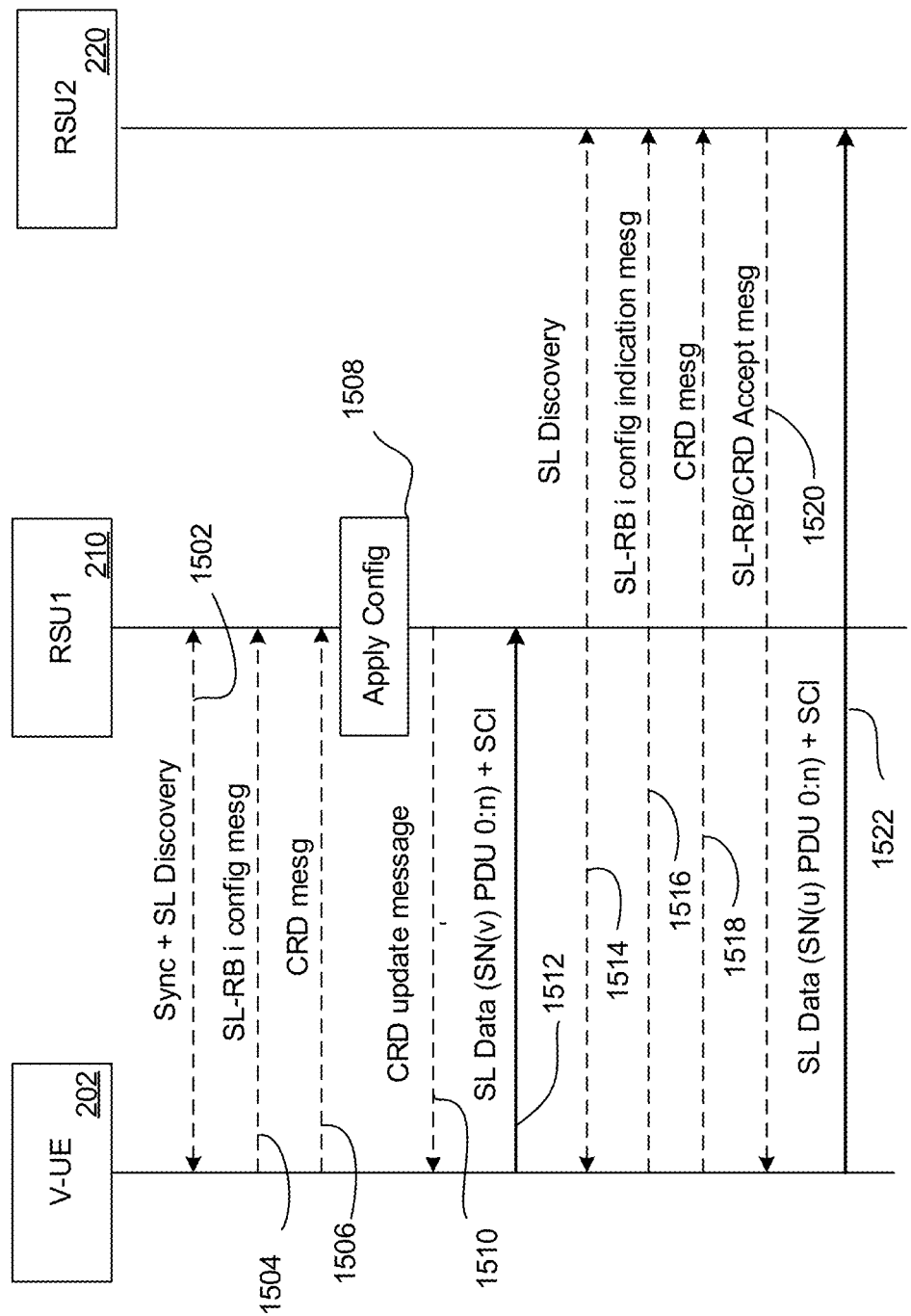
FIG. 15 is a call flow diagram illustrating transmission of a packet flow using SL-RB from a mobile V-UE to stand-alone RSUs when CRD is revised according to an embodiment.

FIG. 14 is a call flow diagram illustrating transmission of data packets in a packet flow using SL-RB from a mobile V-UE to standalone RSUs when CRD is accepted according to an embodiment. FIG. 15 is a call flow diagram illustrating transmission of data packets in a packet flow using SL-RB from a mobile V-UE to standalone RSUs when CRD is revised according to an embodiment.

The procedures for sidelink data transmission using the SL-RB between the V-UE 202 and RSUs (210, 220, 402, or 406) in both types of RSU architectures (i.e. standalone and CU-DU) will now be discussed. In the platooning case, the same signaling procedures apply between the L-UE 506 and F-UEs 508 as that of between V-UE 202 and RSU 210, 220 (in standalone RSU architecture).

The procedure (shown in FIGS. 14 and 15) for transmitting data packet in a packet flow with QoS using SL-RB from a mobile V-UE 202 to standalone RSUs, such as 210 or 220, as discussed elsewhere herein) is as follows.

The V-UE 202 (Tx UE 606) and RSU1 210 (Rx UE 608) discover the presence of each other via the SL Discovery channel 1402 and 1502. The V-UE 202 detects the RSU1 ID (L1) and the Destination ID (L2) corresponding to the V2X service/application. Likewise, the RSU1 210 detects the V-UE ID (L1) and Destination ID (L2) of the V-UE.

After identifying the appropriate SL-RB to handle the QoS requirements of the supported V2X application, the V-UE 202 transmits the SL-RB configuration message 1404, 1504 and the configuration reservation determinant (CRD) 1406 and 1506 to RSU1 210 in either one or multiple MAC CEs. Note that the SL-RB configuration message can be sent using Option 1 or ii) Option 2 or iii) Option 3, as discussed elsewhere herein.

If the SL-RB configuration indicated in the SL-RB configuration message 1404 and the CRD indicated in the CRD message 1406 (which is a SL-RB operation status message described above) can be supported in RSU1 210 as shown in FIG. 14, the SL-RB configuration is applied internally 1408 and a CRD accept/acknowledge message 1410 is included in MAC CE which is transmitted by RSU1 210 to the V-UE 202. Otherwise, as shown in FIG. 15, an updated CRD value (corresponding to the updated amount of data packets or updated duration) that can be transmitted while the V-UE 202 is within the coverage area of RSU1 210 is included in a MAC CE. The MAC CE that includes the updated CRD message 1510 is sent by the RSU1 210 to the V-UE.

Next, the V-UE 202 transmits the PDUs generated by the V2X application with SNs 0 to n in SL-RB i to RSU1 210 via the NR PC5 interface (SL Data and SCI 1412 and 1512). The transmitted data is intended only for RSU1 210.

At the edge of RSU1's 210 coverage area, the V-UE 202 detects the presence of RSU2 220 (or 406) in the SL discovery channel 1414 and 1514. If there is a connection between RSU1 210 and RSU2 220 (via the backhaul or PC5), RSU2 220 may indicate 1416 the presence of V-UE 202 (V-UE ID) to RSU1 210. In response, as shown in FIG. 14, RSU1 210 may provide the SL-RB configuration used by V-UE 202 and request forwarding 1418 of the PDUs transmitted by V-UE 202 with a certain SN range.

In the case if the PDUs with SN 0 to n have not been completely transmitted to RSU1 210 and the CRD is still valid after the V-UE 202 enters the coverage area of RSU2 220, as shown in FIG. 14, the V-UE 202 can continue transmitting the remaining PDUs 1420 to RSU2 using the same continuation of SN used in RSU1 210. RSU2 220 forwards the received PDUs 1422 with the previous SN continuation to RSU1 210.

If the previous PDUs with SN 0 to n have been completely transmitted to RSU1 210 and the previously acknowledged CRD is no longer valid, as shown in FIG. 15, the V-UE 202 may transmit the SL-RB configuration indication for SL-RB i (or a new CLS-RB j) 1516 and CRD 1518 to RSU2 220 to start a new packet flow transmission. When RSU2 220 acknowledges 1520 the CRD, the V-UE 202 may continue using SL-RB i and resets the SN to transmit a new set of PDCP PDUs with SN 0 to m 1522 to RSU2 220. The transmitted data packets in the new packet flow transmission is intended for only RSU2 220.

Figure 16:
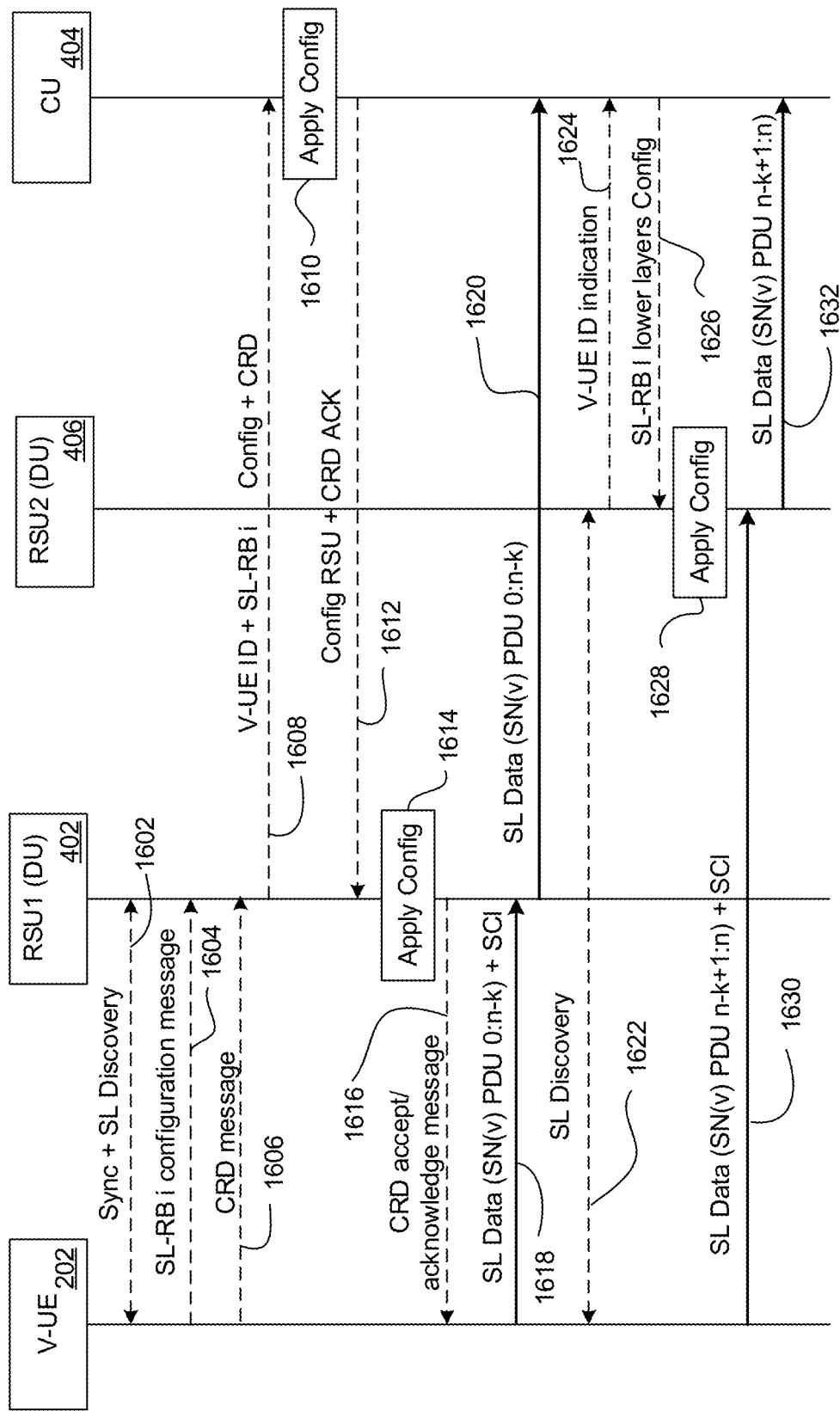
FIG. 16 is a call flow diagram illustrating transmission of a packet flow using SL-RB from a mobile V-UE to DU RSUs in CU-DU architecture according to an embodiment.

FIG. 16 is a call flow diagram illustrating transmission of data packets in a packet flow using SL-RB from a mobile V-UE to DU RSUs in CU-DU architecture according to an embodiment. The procedure (shown in FIG. 16) for transmitting data packet in a packet flow using SL-RB from a mobile V-UE 202 to DU RSUs 402 and 406 in a CU-DU architecture is as follows.

The V-UE 202 (Tx UE 606) and RSU1 402 (Rx UE 608) discover the presence of each other via the SL Discovery channel 1602. The V-UE 202 detects the RSU1 ID (L1) and the Destination ID (L2) corresponding to the V2X service/application. Note that in CU-DU architecture, each DU (RSU) 402 and 406 connected to the same CU 404 may have a common L2 ID. Likewise, the RSU 402 detects the V-UE ID (L1) and Destination ID (L2).

After identifying the appropriate SL-RB to handle the QoS requirements of the supported V2X application, the V-UE 202 transmits the SL-RB configuration message 1604 and the configuration reservation duration (CRD) message 1606 (e.g. the SL-RB operation status message described above) to RSU1 402 in either one or multiple MAC CEs. Note that the SL-RB configuration message can be sent using i) Option 1 or ii) Option 2 or iii) Option 3 as discussed elsewhere herein.

The RSU1 402 forwards the SL-RB configuration message and CRD message 1608 to the CU 404. If the SL-RB configuration indicated in the SL-RB configuration message 1604 and the CRD indicated in the CRD message 1606 can be supported in the CU-DU architecture, the CU 404 may apply the configuration 1610 received from RSU1 402 and send a configuration and CRD acknowledgement 1612 to RSU1 402. Accordingly, the RSU1 402 applies internally 1614 the SL-RB configuration and a CRD accept/acknowledge message 1616 is included in a MAC CE which is transmitted by RSU1 402 to the V-UE 202.

Next, the V-UE 202 transmits the PDUs 1618 generated by the V2X application with SNs 0 to n in SL-RB i to RSU1 402 via the NR PC5 interface (SL Data and SCI). RSU1 402 forwards 1620 the PDUs to CU 402.

At the edge of RSU1's 402 coverage area, the V-UE 202 detects the presence of RSU2 406 in the SL discovery channel 1622 which has a different RSU ID (L1) and the same Destination ID (L2) as that of RSU1 402. If the PDUs with SN 0 to n have not been completely transmitted to RSU1 402 and the CRD is still valid after the V-UE 202 enters the coverage area of RSU2 406, the V-UE 202 can continue transmitting the remaining PDUs to RSU2 406 using the same continuation of SN used in RSU1 402. RSU2 406 forwards the received PDUs with the previous SN continuation to the CU 404. In some embodiments, after RSU2 406 detects the presence of V-UE 202, the RSU2 sends the V-UE 202 ID indication to CU 404. The CU 404 responds with a SL-RB lower layers configuration message. Accordingly, the RSU2 406 applies 1628 the received configuration. The V-UE 202 then sends the SL Data (including the PDU) and SCI 1630 to RSU2 406, and the RSU2 406 forwards 1632 the received SL data (including the PDU) to CU 404.

The V-UE 202 may also send a new configuration indication and CRD to transmit a new packet flow with different SNs to RSU2 406.

Figure 17:
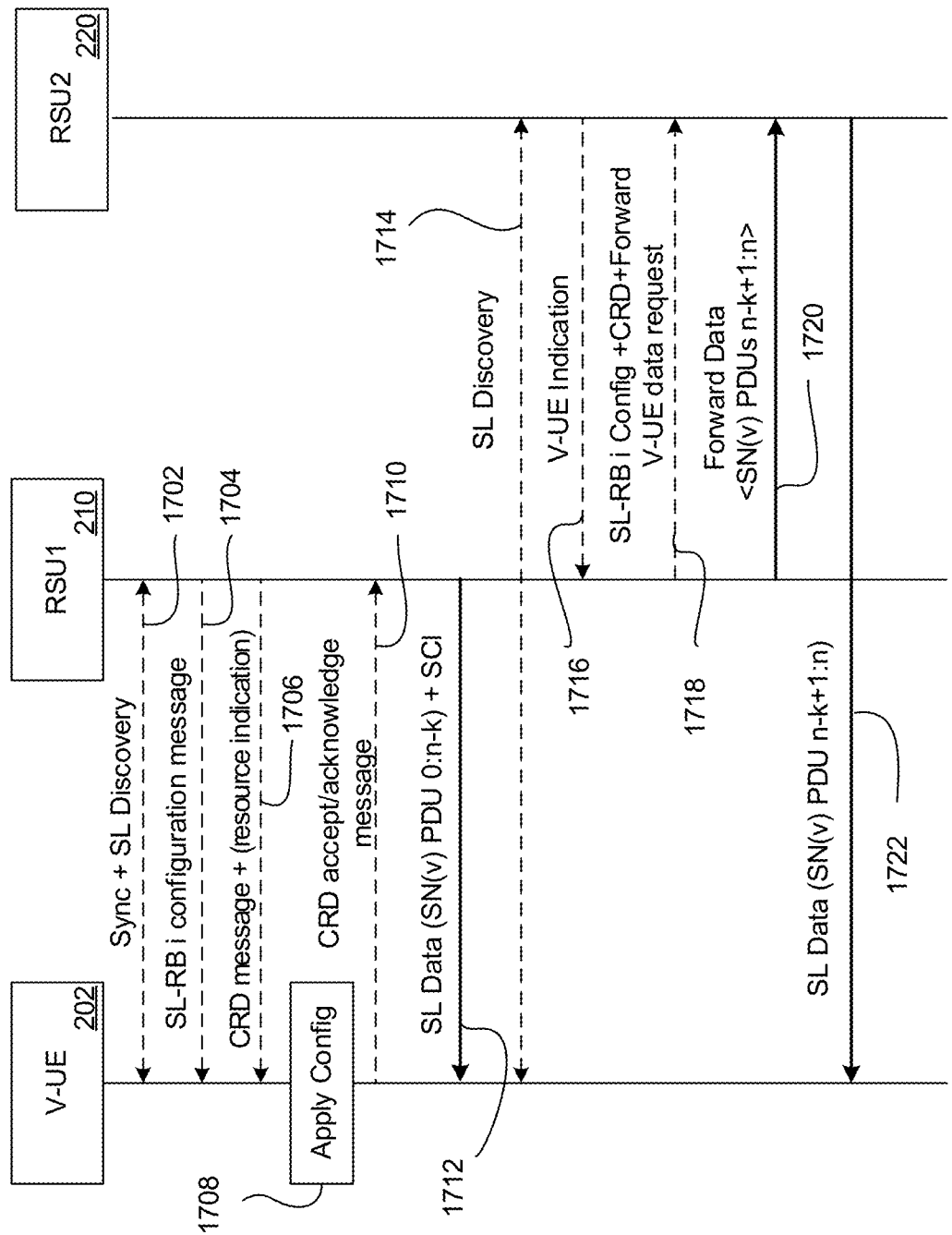
FIG. 17 is a call flow diagram illustrating transmission of a packet flow using SL-RB from a standalone RSU to mobile V-UE when CRD is accepted according to an embodiment.

FIG. 17 is a call flow diagram illustrating transmission of data packets in a packet flow using SL-RB from a standalone RSU to a mobile V-UE when CRD is accepted according to an embodiment.

Figure 18:
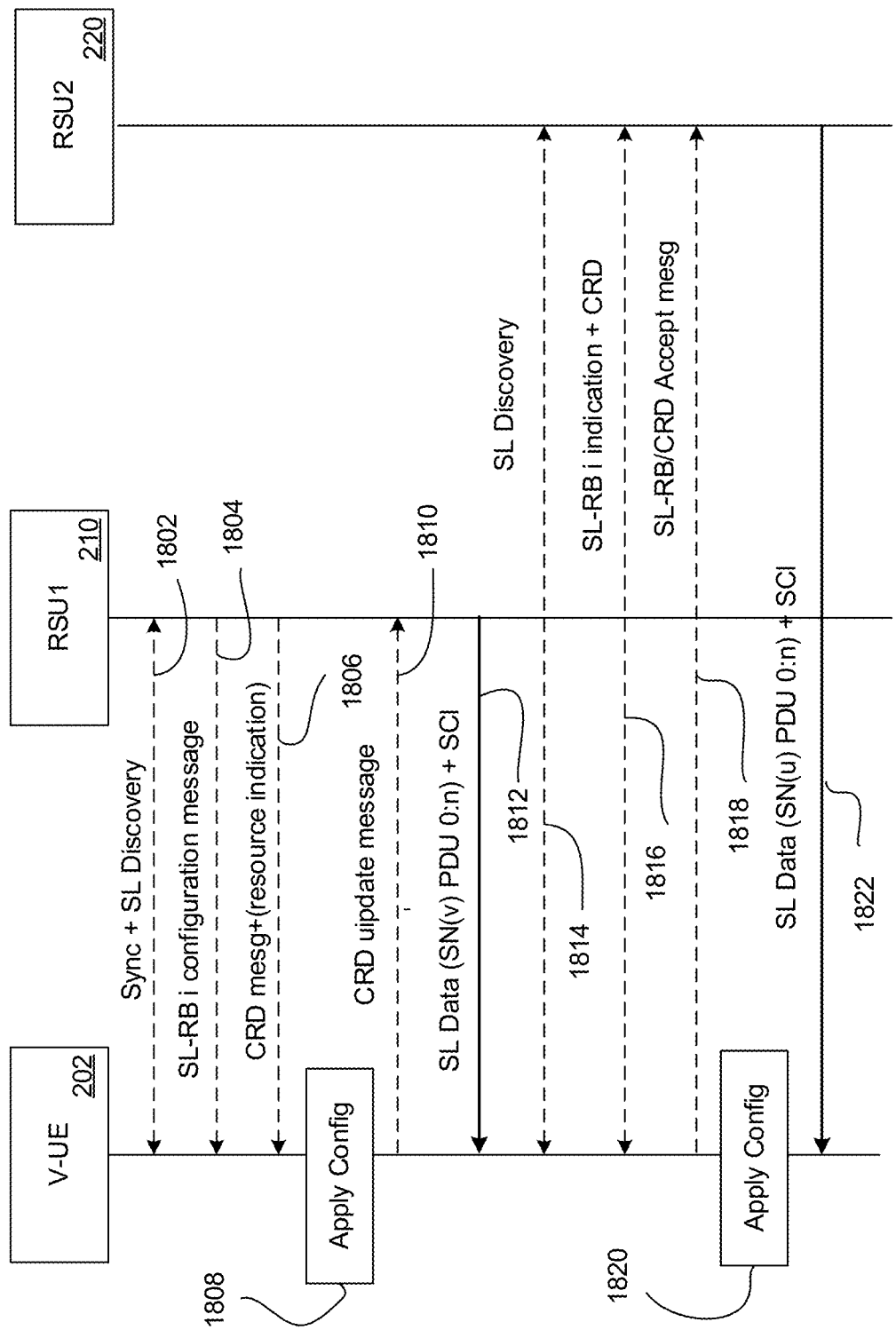
FIG. 18 is a call flow diagram illustrating transmission of a packet flow using SL-RB from a standalone RSU to Mobile V-UE when CRD is revised according to an embodiment.

FIG. 18 is a call flow diagram illustrating transmission of data packets in a packet flow using SL-RB from a standalone RSU to a mobile V-UE when CRD is revised according to an embodiment. The operations (shown in FIGS. 17 and 18) for transmitting data packet in a packet flow using SL-RB from standalone RSUs to a mobile V-UE is as follows.

The V-UE 202 (Rx UE 608) and RSU1 210 (Tx UE 606) discover the presence of each other via the SL Discovery channel 1702 and 1802. The V-UE 202 detects the RSU1 ID (L1) and the Destination ID (L2) corresponding to the V2X service/application. Likewise, the RSU1 210 detects the V-UE ID (L1) and Destination ID (L2).

After identifying the appropriate SL-RB to handle the QoS requirements of the supported V2X application, RSU1 210 transmits the SL-RB configuration message 1704 and 1804 and the configuration reservation duration (CRD) 1706 and 1806 to V-UE 202 in either one or multiple MAC CEs. Note that the SL-RB configuration message can be sent using i) Option 1 or ii) Option 2 or iii) Option 3 as discussed elsewhere herein. In addition, RSU1 210 may provide sidelink resource grant to the VUE 202 to support bi-directional transmission of data packets. The sidelink resource grant (i.e. subchannels, subframes, periodicity, maximum duration) may contain the V-UE 202 ID if it is specifically intended to a particular V-UE to respond with an ACK message or data. Otherwise, the resource grant may contain a Group ID to indicate that any of the V-UEs within the coverage of RSU1 are to use the reserved resource on a contention basis. If the SL-RB configuration indicated in the SL-RB configuration message 1704 and the CRD included in the CRD message 1706 can be supported in V-UE 202 as shown in FIG. 17, the SL-RB configuration is applied 1708 internally and a CRD accept/acknowledge message 1710 is included in a MAC CE which is transmitted by the V-UE 202 to RSU1 210. Otherwise, an updated CRD value corresponding to the amount of data packets that can be transmitted in a packet flow while the V-UE 202 is within the coverage area of RSU1 210 is included in a CRD update message 1810. The MAC CE that includes the update CRD message 1810 is transmitted by the V-UE 202 to RSU1 210 as shown in FIG. 18.

Next, RSU1 210 transmits the PDUs generated by the V2X application with SNs 0 to n in SL-RB i to V-UE 202 via the NR PC5 interface (SL Data and SCI 1712 and 1812).

At the edge of RSU1's 210 coverage area, the V-UE 202 detects the presence of RSU2 220 in the SL discovery channel 1714 and 1814. If there is a connection between RSU1 210 and RSU2 220 (via the backhaul or PC5) as shown in FIG. 17, RSU2 220 may indicate 1716 the presence of V-UE 202 (V-UE ID) to RSU1 210. In response, RSU1 210 may provide the SL-RB configuration 1718 it uses for V-UE and forwards the un-transmitted PDUs 1720 with a certain SN range.

RSU2 220 may transmit the SL-RB configuration indication for SL-RB i (or a new LS-RB j) and CRD 1816 to V-UE 202 to start a new packet flow transmission. In the case when V-UE 202 applies 1820 the received configuration and acknowledges 1818 the CRD, the V-UE 202 may continue using SL-RB i to receive a new set of PDCP PDUs 1822 with SN 1 to m from RSU2 220.

If the PDUs with SN 0 to n have not been completely transmitted by RSU1 210 and the CRD is still valid after the V-UE 202 enters the coverage area of RSU2 220, the un-transmitted PDUs 1722 with the previous SN used by RSU1 210 are transmitted by RSU2 220 to V-UE 202.

Figure 19:
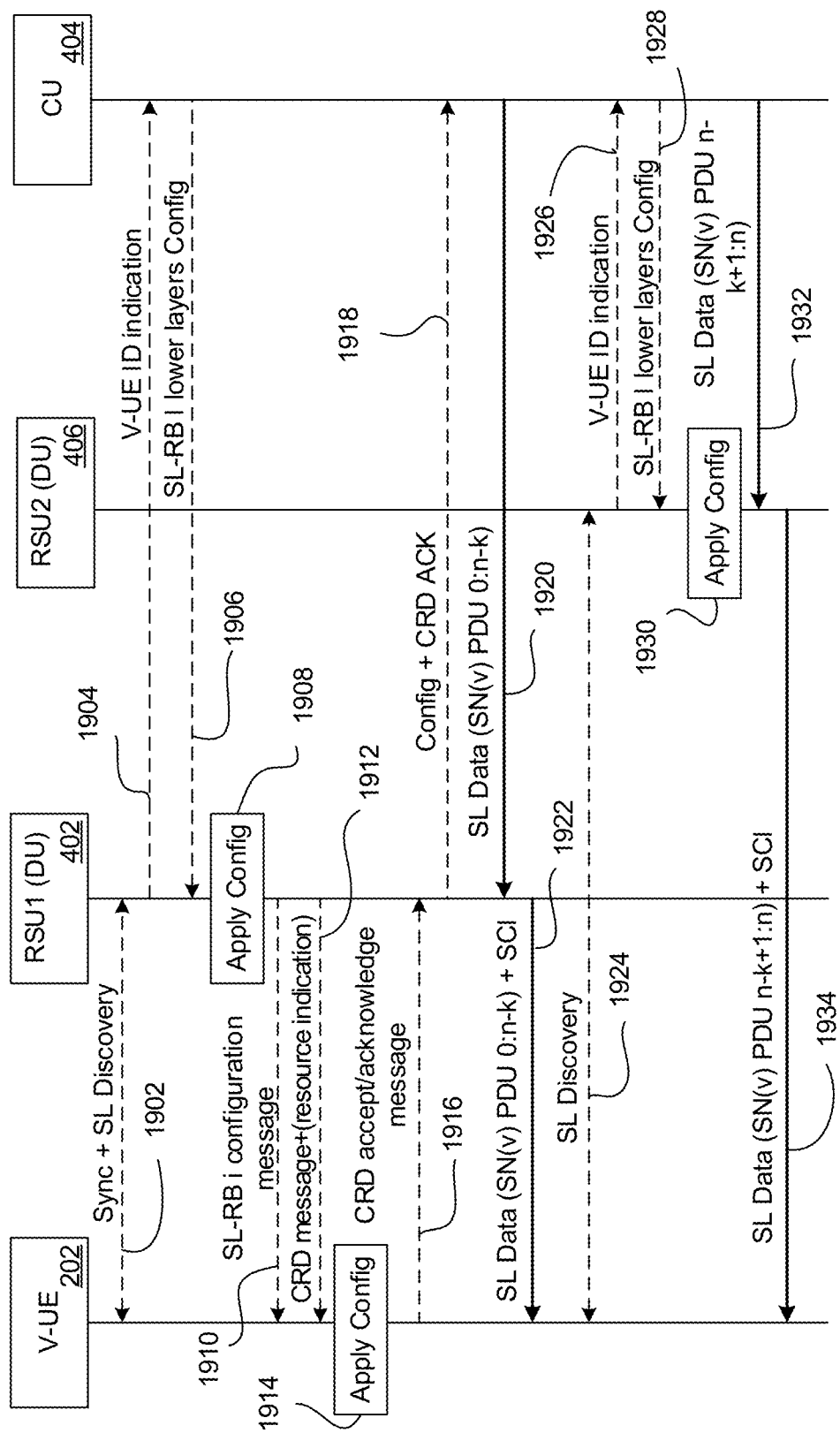
FIG. 19 is a call flow diagram illustrating transmission of a packet flow using SL-RB from the DU RSUs to mobile V-UEs in CU-DU architecture according to an embodiment.

FIG. 19 is a call flow diagram illustrating transmission of data packets in a packet flow using SL-RB from the DU RSUs to mobile V-UEs in CU-DU architecture according to an embodiment. The operations (shown in FIG. 19) for transmitting data packets in a packet flow using SL-RB from a DU RSUs 402 and 406 to a mobile V-UE 202 in a CU-DU architecture is as follows.

The V-UE 202 (Tx UE 606) and RSU1 402 (Rx UE 608) discover the presence of each other via the SL Discovery procedure 1902. The RSU1 402 sends a V-UE 202 ID indication message 1904 to CU 404, and the CU 404 sends a SL-RB lower layers configuration message 1906 to RSU1 402. Accordingly, the RSU1 402 applies 1908 the received configuration. After identifying the appropriate SL-RB to handle the QoS requirements of the supported V2X application, the CU 404 transmits the SL-RB configuration message 1910 and the configuration reservation duration (CRD) message 1912 via RSU1 402 to V-UE 202 in either one or multiple MAC CE. Note that the SL-RB configuration message can be sent using i) Option 1, or ii) Option 2 or iii) Option 3 as discussed elsewhere herein.

If the SL-RB configuration indicated in the SL-RB configuration message 1910 and the CRD indicated in the CRD message 1912 can be supported by the V-UE, the SL-RB configuration is applied 1914 internally and a CRD accept/acknowledge message 1916 is included in a MAC CE which is transmitted by the V-UE 202 to RSU1 402. RSU1 402 sends the V-UE acknowledgement 1918 to the CU 404. Next, the CU 404 transmits the PDUs 1920 and 1922 generated by the V2X application with SNs 0 to n in SL-RB i to V-UE 202 via RSU1 402 over the NR PC5 interface (SL Data and SCI). At the edge of RSU1's 402 coverage area, the RSU2 406 detects the presence of V-UE 202 in the SL discovery channel 1924 and notifies 1926 the CU 404 of the V-UE's detection. The forwarding of the PDUs from CU 404 to RSU1 402 is stopped.

If the PDUs with SN 0 to n have not been completely transmitted by RSU1 402 to V-UE 202 and the CRD is still valid after the V-UE 202 enters the coverage area of RSU2 406, the V-UE 202 can continue receive the remaining PDUs sent by CU 404 via RSU2 406 using the same continuation of SN used in RSU1.

The CU 404 may also send a new configuration indication and CRD to transmit a new packet flow with different SNs to V-UE 202 via RSU2 406. In some embodiments, the CU 404 sends a SL-RB lower layers configuration message 1928 to RSU2 406, and the RSU2 406 accordingly applies 1930 the received configuration. Then the CU 404 sends SL Data 1932 including PDU(s) to RSU2 406, which sends the SL data including the PDU(s) and SCI 1934 to V-UE 202.

Figure 20:
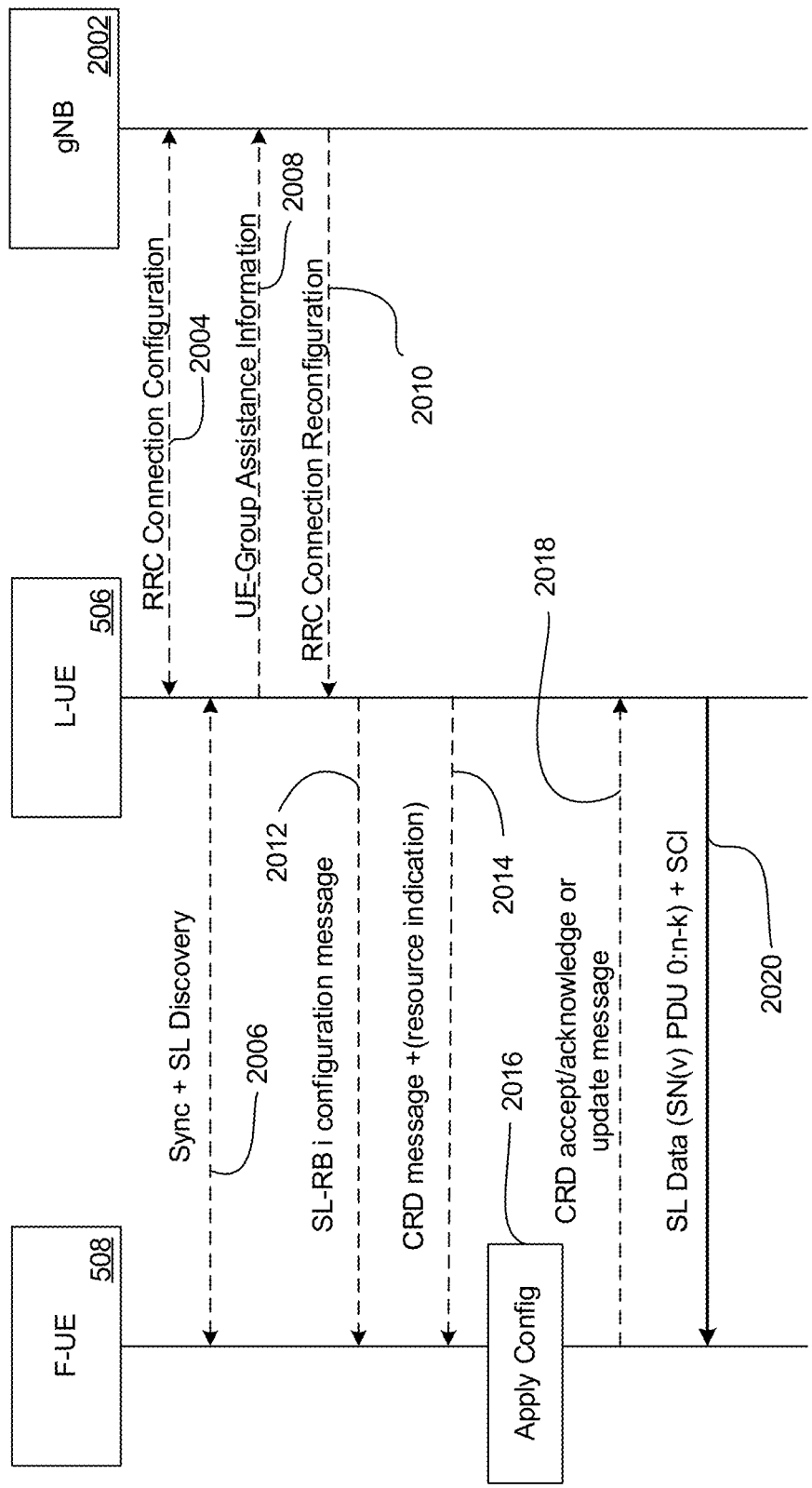
FIG. 20 is a call flow diagram illustrating transmission of a packet flow using SL-RB from the L-UE to F-UE in a vehicle platoon according to an embodiment.

FIG. 20 is a call flow diagram illustrating transmission of data packets in a packet flow using SL-RB from the L-UE to F-UE in a vehicle platoon according to an embodiment. The operations (shown in FIG. 20) for transmitting data packets in a packet flow using SL-RB from a mobile L-UE 506 to F-UE 508 in a vehicle platoon is as follows.

The L-UE 506 (operating in Mode 1) establishes a RRC connection with the network and obtains the necessary RRC configuration 2004 for supporting a vehicle platoon. The RRC configuration obtained from gNB (i.e., RAN node) 2002 may include the Group ID (i.e. including G-RNTI), groupcast SL-RB configuration and resource pool configuration intended for the platoon. The L-UE 506 may also remain in RRC Connected state throughout the duration the vehicle platoon is operational. The L-UE 506 (Tx UE 606) and F-UE 508 (Rx UE 608) discover the presence of each other via the SL Discovery 2006 procedure. The L-UE 506 detects the F-UE 508 ID (L1) and the L2 ID corresponding to the V2X service/application for the vehicle platoon. Likewise, the F-UE 508 detects the L-UE 506 ID (L1) and L2 ID corresponding to the vehicle platoon, along with capabilities of the L-UE 506 to operate as platoon leader. The L-UE 506 may initially receive the UE assistance information from the F-UEs 508 and send the UE-group assistance information 2008 to the gNB (i.e, RAN node) 2002. The UE-group assistance information pertains to all UEs in the vehicle platoon and may include one or more of the F-UEs identifiers, authorization parameters, and other parameters including a parameter indicating an expected data volume for the vehicle platoon, a traffic pattern parameter (including timing information, periodicity for SPS configuration) and QoS requirement parameter (including latency, reliability, throughput). In the response, in a RRC Connection reconfiguration message 2010 sent by the gNB (i.e, RAN node) 2002, the gNB (i.e. RAN node) 2002 may provide the resource pool configuration or resource grants (e.g. SPS configuration) to support group communications in the vehicle platoon and SL-RB configuration for groupcast transmission. The L-UE 506 transmits the SL-RB configuration message 2012 and the CRD message 2014 to F-UE 508 in either one or multiple MAC CEs. Note that the SL-RB configuration message can be sent using i) Option 1 or ii) Option 2 or iii) Option 3 as discussed elsewhere herein. In addition, the L-UE 506 may provide sidelink resource grant (taken from the initial resource pool configured for the platoon) to the F-UE 508 to support bi-directional transmission of data packets. The sidelink resource grant (i.e. sub-channels, subframes, periodicity, maximum duration) may contain the F-UE ID if it is specifically intended to a particular F-UE 508 to respond with an ACK message or SL data. Otherwise, the resource grant may contain a Group ID to indicate that any of the F-UEs 508 belonging to the platoon to use the resources in a resource pool on a contention basis.

If the SL-RB configuration and the CRD can be supported in F-UE 508 as shown in FIG. 20, the SL-RB configuration is applied internally 2016 and a CRD accept/acknowledge message 2018 is included in a MAC CE which is transmitted by F-UE 508 to the L-UE 506. Otherwise, an update CRD message 2018 including an updated CRD value (corresponding to the updated amount of packets or updated duration) is included in a MAC CE. The MAC CE that includes the update CRD message is transmitted by the F-UE 508 to the L-UE 506.

Next, the L-UE 506 transmits the PDUs generated by the V2X application with SNs 0 to n in SL-RB i (groupcast or unicast) to F-UE 508 via the NR PC5 interface (SL Data and SCI 2020).

Procedures for AS-level group (platoon) management will now be discussed, according to embodiments. The AS-level signaling, with assistance from RAN, can be applied to provide more flexibility in performing group management and coordination when dynamically forming vehicle UE groups such as a platoon. Particularly, after the higher layer group ID alignment between the UEs intending to support groupcast transmissions (in platoon), the necessary SL-RB configuration and AS techniques (e.g. HARQ, packet duplication) can be supported with AS-level signaling between the UEs in the platoon.

Figure 21:
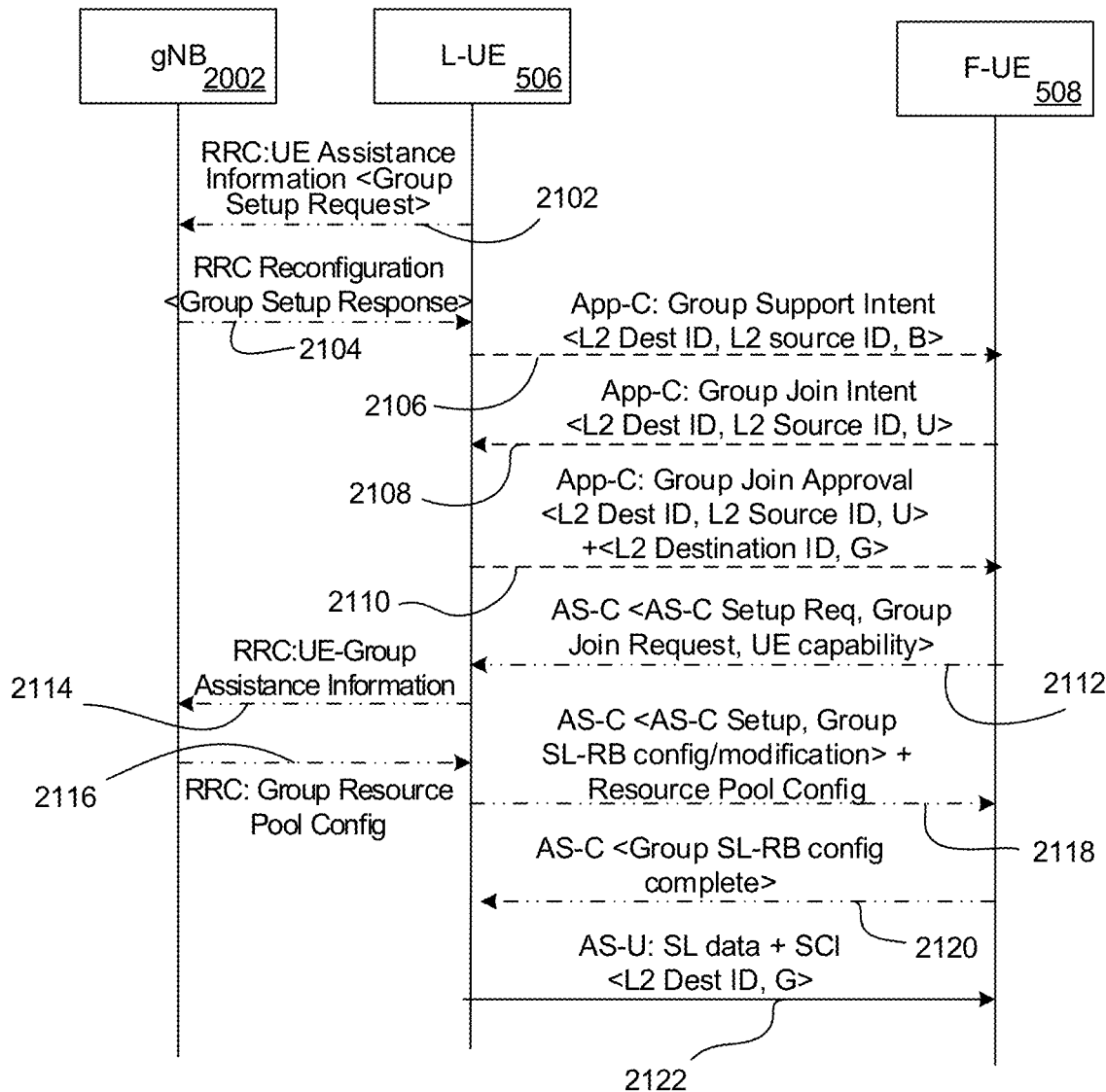
FIG. 21 is a call flow diagram illustrating signaling for a platoon group establishment and F-UE admission according to an embodiment.

FIG. 21 is a call flow diagram illustrating signaling for platoon group establishment and F-UE admission according to an embodiment. The operations (shown in FIG. 21) for performing i) group establishment between leading UE (L-UE 506) and gNB 2002 and ii) admission and configuration of SL-RB for Follower UE (F-UE 508) when joining a platoon is as follows.

The UE (operating in Mode 1 and shown as L-UE 506 in FIG. 21), with an existing RRC connection with RAN, sends a group establishment request 2102 to the gNB (i.e., RAN node) 2002 via AS-level signaling (RRC configuration procedure). The group establishment request 2102 may contain information about the UE's capability to function as a leading UE (e.g, a L-UE 506) in a vehicle platoon along with authorization parameters. The UE may also send NAS messages to the CN functions (i.e. Access and Mobility Management Function (AMF), Session Management Function (SMF), V2XCF) to establish a group (PDU) session over the sidelink.

The RAN interacts with CN functions and the V2XCF to authorize the UE as an L-UE 506 and receives authorization parameters from the CN functions, and sends a RRC reconfiguration message 2104 that includes the authorization parameters and the AS-level configuration parameters (e.g. Group-RNTI, SL-RB configuration, AS-level security parameters) to the UE (which has become a L-UE 506). The CN functions may also provide the L-UE 506 with the authorization parameters, including L2 IDs (i.e. L2 destination ID, L2 source ID) and security keys required to support group communications.

After obtaining the RRC reconfiguration message from RAN, the L-UE 506 may broadcast its ability (sent as higher layer/V2X application messages) 2106 to support a vehicle platoon to other UEs in its coverage area as part of the SL Discovery procedure. The higher layer announcement message may include the L-UE's source ID and the intended L2 destination ID (i.e. platoon service ID) along with higher layer information (e.g. L-UE's present location (coordinates), L-UE's platoon geographic mobility path, estimated duration for platoon).

A UE interested in joining the vehicle platoon (the interested UE) may send a group join intent message 2108 in a unicast (higher layer) transmission to L-UE 506. The group join intent message 2108 includes the UE's L2 source ID along with higher layer parameters informing the UE capability and intention (e.g. F-UE's present location (e.g. geo-location), F-UE's mobility path). If the join request message is acknowledged, the L-UE 506 may send the group join approval message 2110 to the interested UE which becomes a F-UE 508. The group join approval message 2110 may include L2 (destination, source) IDs to support (higher layer) groupcast transmissions.

If configured for AS-level signaling (i.e. SL-RRC), the F-UE 508 may send group join request message 2112 including information about the AS-level F-UE capability (e.g. carriers supported, antenna configuration) to the L-UE 506. The L-UE 506 may send an RRC UE-Group Assistance Information message 2114 to the gNB (i.e., RAN node) 2002, and the gNB 2002 may respond with an RRC Group Resource Pool Configuration message to L-UE 506. In response, the L-UE 506 may provide AS-level configurations 2118 (i.e. UE-ID, Group-ID (e.g. G-RNTI), sidelink CCs configuration, SL-RBs for unicast and groupcast transmissions, resource allocation/pool configuration) to the F-UE 508 in the AS-level signaling. The F-UE 508 may respond with AS configuration complete message 2120.

The L-UE 506 sends the SL data and SCI 2122 to i) all F-UEs 508 in the vehicle platoon using the SL-RB configured for groupcast transmissions (using the Group ID-in SCI) and ii) specific F-UE 508 using SL-RB configured for unicast transmissions (using the intended UE-ID in SCI). For supporting bidirectional transmission, the F-UE 508 may obtain the radio resources from the configured resource pool and send data to the L-UE 506 and other F-UEs 508s in the vehicle platoon using the appropriate SL-RBs and the corresponding UE IDs (source, destination). When supporting bi-directional transmissions of data via the sidelink between the F-UE 508 and L-UE 506, a downstream transmission involves the data packets being sent from the gnB (i.e, RAN node 2002) to the F-UE 508 via the L-UE 506 which acts as an intermediate relay node. The data packets received from the gnB (i.e., RAN node) are relayed by L-UE 506 via a sidelink between the L-UE 506 and the F-UE 508. Likewise, upstream transmission involves the data packets being sent from the F-UE 508 to the gnB (i.e., RAN node) 2002 via the L-UE 506 which acts as an intermediate relay node. The data packets received from the F-UE 508 are relayed by L-UE 506 via a sidelink between the F-UE 508 and the L-UE 506. Since the SL-RB is configured in both the F-UE 508 and L-UE 506, the downstream and upstream transmissions via the sidelink can support QoS at the AS-level. Additionally, the flexible configuration of the SL-RB using Option 1, Option 2, or Option 3 as discussed elsewhere herein, enables the data packets to be relayed via the L-UE 506 at the PHY layer, the MAC layer, the RLC layer or at the PDCP layer. Likewise, within a platoon, one of the intermediary F-UEs 508 can operate as a relay node using the SL-RB to relay the transmission of data packets from another F-UE 508 in the platoon to the L-UE 506 and vice-versa from the L-UE 506 to another F-UE 508 in the platoon via the sidelinek.

In some embodiments, when the F-UE 508 is in-coverage, where the F-UE 508 can either establish RRC connection with a RAN node 2002 (in Mode 1) or when the F-UE 508 can receive SIB from a RAN node 2002 (in Mode 2), the F-UE 508 may receive a request or a trigger to establish group/platoon association either from the RAN node 2002 or from the L-UE 508. The group establishment information/trigger may contain the AS-level Group IDs, L-UE IDs and the supported group services (e.g. vehicle platooning and data relaying via L-UE). Based on the received group establishment information, the F-UE 508 may either send the group join request containing the L-UE ID to the gnB (i.e., RAN node) 2002 (in RRC via the NR Uu interface) or directly to the L-UE 506 (after the discovery procedure, where both L-UE 506 and F-UE 508 exchange UE identifiers and supported service information). If the group join request is sent to the gnB (i.e, RAN node) 2002, gnB (i.e., the RAN node) 2002 may provide the configuration information for establishing the UE group and the related SL-RBs (i.e. QoS mapping and L2 configuration) to either the requesting F-UE 508 or both the F-UE 508 and L-UE 506 if a configuration update is necessary in both the F-UE 508 and the L-UE 506. Note when the F-UE 508 discovers more than one L-UEs 506 in its coverage range (i.e. received RSRP from L-UE exceeds a threshold value) and provides the IDs of the discovered L-UEs as candidate L-UEs to the gnB (i.e.,) 2002 in the group join request, the gnB (i.e., RAN node) 2002 may select one L-UE 506 from the candidate L-UEs to be the group lead for the F-UE 508 and sends the configuration information containing the ID of the selected L-UE to the F-UE 508. After receiving the configuration information from the gnB (i.e, RAN node 2002), the SL-RBs in the L-UE 506 and F-UE 508 can be configured to support direct SL transmissions between L-UE 506 and F-UE 508 and relaying upstream and downstream transmissions of data packets using the L-UE 506 as a relay node.

Figure 22:
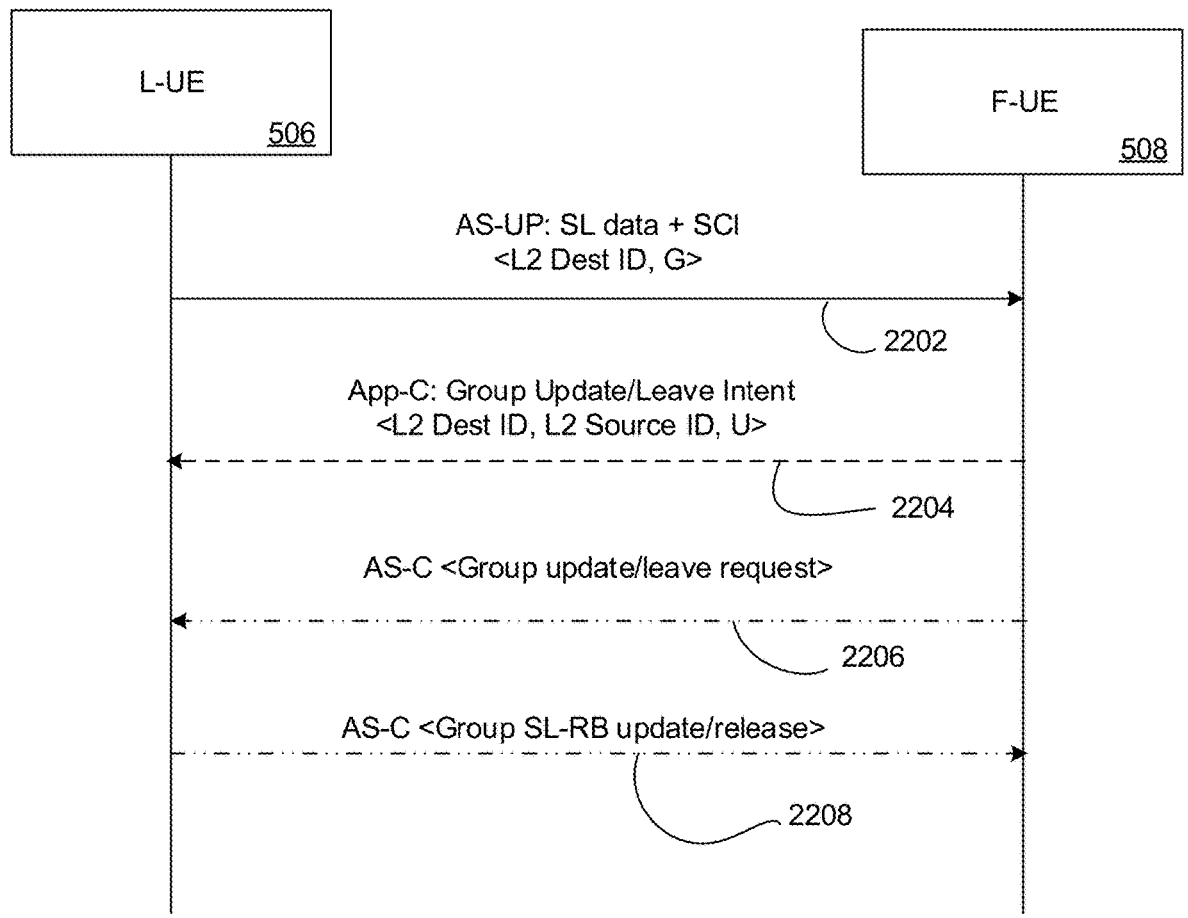
FIG. 22 is a call flow diagram illustrating signaling procedure for a platoon group update according to an embodiment.

FIG. 22 is a call flow diagram illustrating signaling procedure for updating a platoon according to an embodiment. The operations (shown in FIG. 22) for updating/releasing the SL-RB due to F-UE 508 platoon update request or F-UE 508 platoon leave request is described as follows.

Referring to FIG. 22, the L-UE 506 sends AS-UP (SL data and SCI) 2202 to all F-UE (groupcast transmission and/or unicast transmission). A F-UE 508 intending to request an update to the vehicle platoon (e.g. change positions within the vehicle platoon) or to leave the vehicle platoon sends an higher layer Group Update/Leave message 2204 (App-C: Group Update/Leave message in FIG. 22) to the L-UE 506 via AS-signaling (i.e. SL-RRC). The higher layer Group Update/Leave message may include the L2 IDs, to the L-UE 506.

At the AS-level, to update the SL-RB configuration or resource allocation/pool configuration, the F-UE 508 intending to request an update to the vehicle platoon or leave the vehicle platoon also sends a lower layer group update/leave request message 2206 (AS-C <Group update/leave request> message in FIG. 22) to the L-UE 506 via AS-signaling (i.e. SL-RRC). Based on the lower layer group update/leave request message, the L-UE506 may update/release the SL-RB configuration or resource allocation/pool configuration by sending AS-C<Group SL-RB update/release> message 2208 to the F-UEs 508 in the vehicle platoon.

When an authorized UE (e.g. platoon leader or L-UE 506) maintains the RRC connection with RAN, AS-level signaling can be used for configuring resource pool (i.e. SPS, configured grant) for usage within the vehicle platoon. Based on parameters such as a parameter indicating the number of transmissions, a traffic pattern parameter including the timing information of data transmissions in the vehicle platoon), and a parameter indicating geo-location of UEs in the vehicle platoon and estimated data volume for communications in the vehicle platoon, the authorized UE, such as L-UE 506, can request the initial set of resources for sidelink transmissions from the gNB, followed by reallocation of the resources for sidelink transmissions to other UEs, such as F-UEs 508, in the vehicle platoon.

Figure 23:
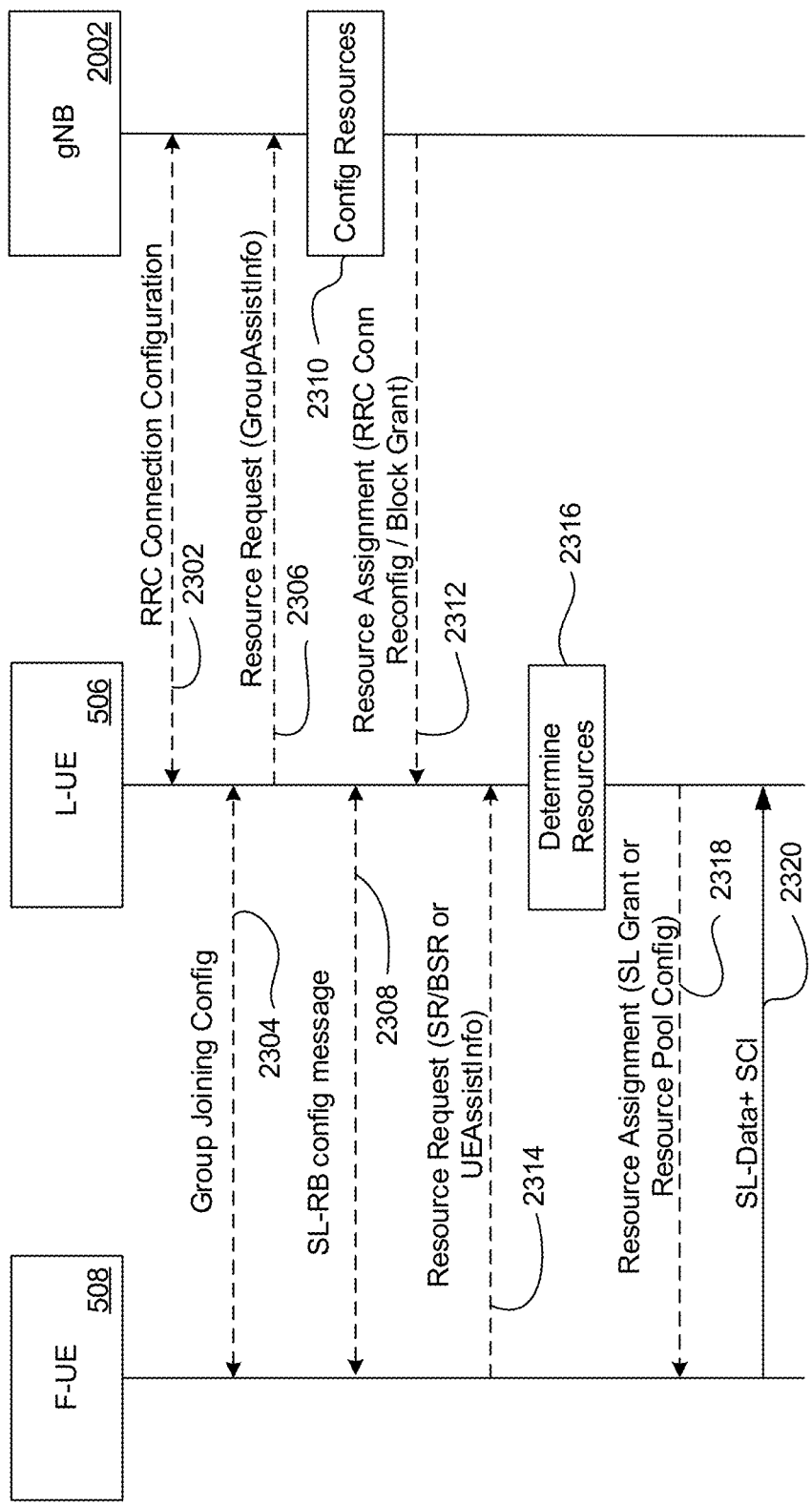
FIG. 23 is a call flow diagram illustrating signaling for directly allocating resources in a platoon group using AS-level signaling according to an embodiment.

FIG. 23 is a call flow diagram illustrating signaling for directly allocating resources in a group (e.g., a vehicle platoon) using AS-level signaling according to an embodiment. The operations (shown in FIG. 23) for allocating radio resources using AS-level signaling to UEs in a vehicle platoon is described as follows.

In a vehicle platoon, an authorized L-UE 506 with an existing RRC connection 2302 with gNB (i.e, RAN node) 2002, is able to perform V2X service level (higher layer) group formation and group admission procedures 2304 to accept the group joining request of the F-UE 508 into the platoon.

In an embodiment, the L-UE 506 and gNB (i.e, RAN node) 2002 perform a RRC Connection configuration procedure, and accordingly, the L-UE 506 and F-UE 508 perform the Group Joining Configuration procedure 2304. Based on parameters which include a parameter indicating the number of transmissions, a traffic pattern parameter including timing information of data transmissions in the group), geo-location of UEs in platoon/group and estimated data volume for group communications within the platoon for a set of unicast transmissions and groupcast transmissions over a certain duration, the L-UE 506 may send a resource request 2306 to the gNB (i.e, RAN node) 2002 in an RRC message.

The gNB (i.e, RAN node) 2002 may configure resources 2310 and may provide a set or block of radio resources along with a validity duration and validity coverage area in Resource Assignment 2312 included in an RRC message. The gNB (i.e, RAN node) 2002 sends the RRC message (which includes the Resource Assignment) to the L-UE 506. The Resource Assignment 2312 can be used by the L-UE 506 to schedule resources within the group. The resources provided are reserved for usage within the group and not allocated to other UEs in the group that may interfere with transmissions with UEs the group.

The L-UE 506 may configure 2308 SL-RBs in the F-UE 508 to support unicast and groupcast transmissions, as described above.

An F-UE 508 intending to perform transmission over the NR PC5 interface may send the UE assistance information in an SL-RRC message 2314 to the L-UE 506 to indicate the transmission parameters (i.e. data volume, periodicity of data (i.e. transmission timing information for unicast and groupcast transmission), UE geo-location). The SL-RRC message may be sent in a subframe and subchannel configured by F-UE 508 while SL-RB configuration is performed. For dynamic scheduling, the F-UE 508 may send the resource scheduling request and the SL buffer status report (SL-BSR) in a SL MAC CE to the L-UE 506. Note that both types of resource requests may indicate the SL-RB ID, LCG and the casting type.

Based on the resource request and priority level associated with the logical channel group consisting of a group of SL-RBs, the L-UE 506 determines the resources 2316 and provides the resource grant or resource pool configuration 2318 to the F-UE 508 via AS-level signaling. The resource grant may indicate the subframe and subchannels used by the F-UE 508 for transmission. The resource pool configuration may indicate the pool of resources from which the F-UE 508 may select resources after sensing the resource availability (i.e. the CBR level is below a certain configured threshold). For dynamic scheduling, the resource grant may be provided in SL-RRC or in SCI.

The F-UE 508 uses the assigned resource to perform SL data transmission 2320 to the UEs in platoon (L-UE 506 and other F-UEs 508).

Figure 24:
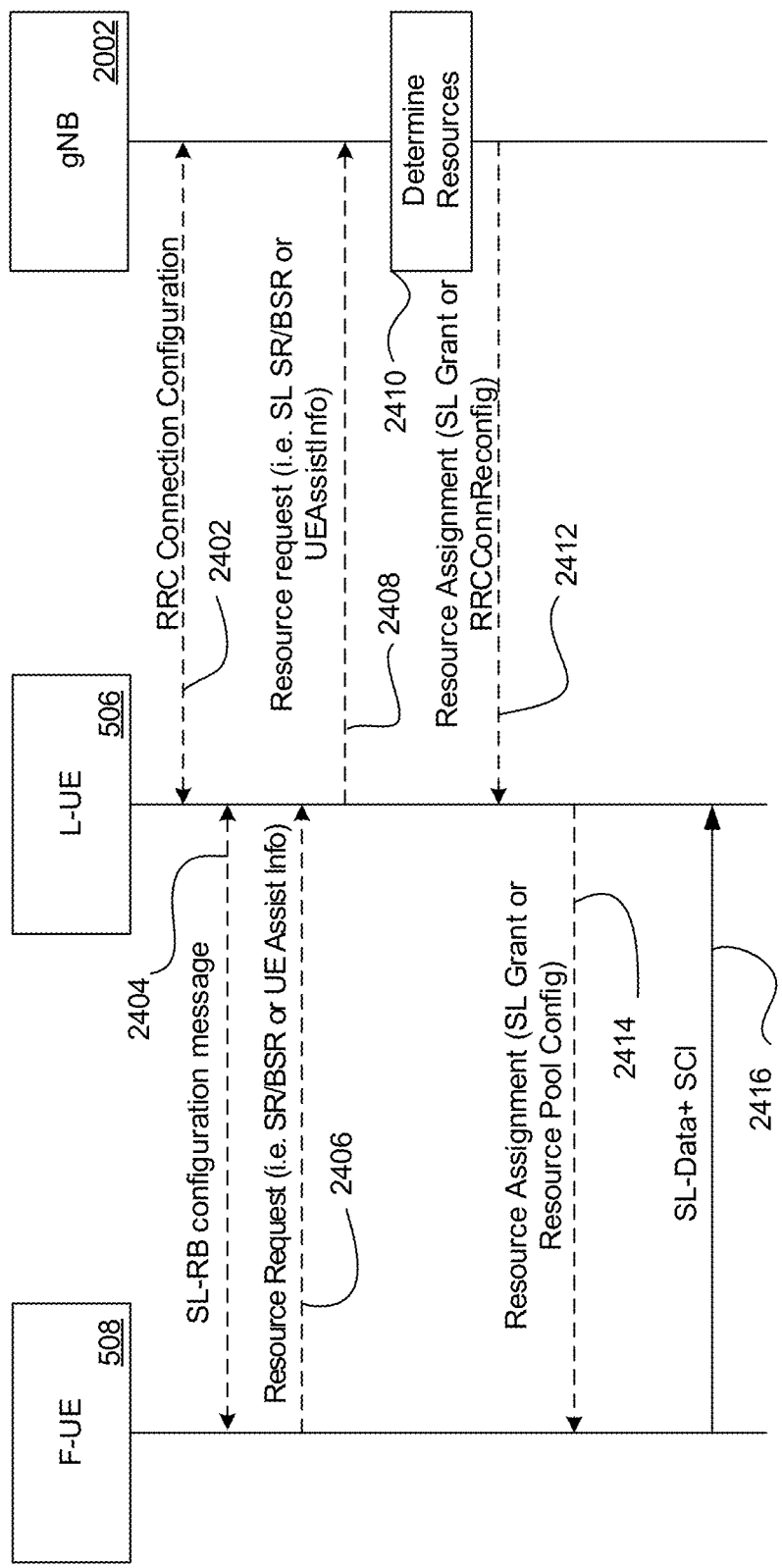
FIG. 24 is a call flow diagram illustrating signaling for allocating resources via resource request/assignment forwarding using AS-level signaling in a platoon group according to an embodiment.

FIG. 24 is a call flow diagram illustrating signaling for allocating resources via resource request/assignment forwarding using AS-level signaling in a vehicle platoon according to an embodiment. The operations (shown in FIG. 24) for allocating radio resources via AS-level signaling forwarding to UEs in a platoon is described as follows.

In the vehicle platoon, an authorized L-UE 506 with an existing RRC connection 2402 with gNB (i.e, RAN node) 2002, is able to perform V2X service level (higher layer) group formation and group admission procedures to accept the group joining request of the F-UE 508 into the vehicle platoon.

The L-UE 506 may configure 2404 SL-RBs in the F-UE 508 to support unicast and groupcast transmissions. The SL-RB configuration is performed at the AS-level by transmitting the SL-RRC messages or by transmitting MAC CE containing the SL-RB indication messages.

For semi-persistent scheduling, an F-UE 508 may send a resource request 2406 that includes the UE assistance information in a SL-RRC message to the L-UE 506 to indicate the transmission parameters (i.e. data volume, periodicity of data (i.e. transmission timing information for unicast transmissions and groupcast transmissions), UE geo-location). The SL-RRC message may be sent in a subframe and subchannel configured by F-UE 508 while SL-RB configuration is performed. For dynamic scheduling, the F-UE 508 may send the resource request and the SL buffer status report (SL-BSR) in a SL MAC CE to the L-UE 506. Note that both types of resource requests may indicate the SL-RB ID, LCG and the transmission type. The L-UE 506 forwards the resource request 2408 sent in SR/BSR or SL-RRC message by F-UE 508 to gNB (i.e, RAN node) 2002. The resource request 2408 sent by L-UE 506 to gNB (i.e, RAN node) 2002 may include the individual request of each F-UE 508 or the aggregate resource requests of all F-UEs 508s in the platoon.

Based on the resource request and priority level associated with the logical channel group consisting of a group of SL-RBs, the gNB (i.e, RAN node) 2002 determines 2410 the resources and provides the resource grant or resource pool configuration 2412 to the L-UE 506 via RRC signaling. The resource grant may indicate the subframe and subchannels used by the F-UE 508 for transmission. The resource pool configuration may indicate the pool of resources from which the F-UE 508 may select resources after sensing the resource availability (i.e. the CBR level is below a certain configured threshold).

The L-UE 506 forwards the received resource assignment 2414, containing the SL Grant or resource pool configuration, to the F-UE 508. The F-UE 508 uses the assigned resources to perform SL data transmission 2416 to the UEs in platoon (L-UE 506 and other F-UEs 508).

An aspect of the disclosure provides a method of configuring a sidelink radio bearer (SL-RB) in an electronic device. The electronic device may be a road side unit (RSU), a UE, a vehicle UE (V-UE) or an infrastructure UE (I-UE). The method includes receiving a sidelink radio-bearer configuration message from an authorized UE, the configuration message containing an update to pre-configured SL-RB parameters and an operation status message indicating the status of the SL-RB. The method further includes using the SL-RB based on the SL-RB configuration message. In some embodiments, the method further includes, prior to receiving the sidelink radio-bearer configuration message, receiving a sidelink radio bearer pre-configuration message from a gNB (i.e., RAN node), the pre-configuration message containing a default mapping between sublayers in the L2 protocol stack and pre-configured SL-RB parameters. In some embodiments, the method further includes pre-configuring, based on the sidelink radio bearer pre-configuration message, at least one SL-RB. In some embodiments, the configuration message specifies a mapping rule to map between the higher layer QoS indicators and the SL-RBs. In some embodiments, the SL-RB pre-configuration is received via RRC message from gNB. In some embodiments, the SL-RB configuration is received in a first sidelink RRC message and the SL-RB operation status is received in the second sidelink RRC message from an authorized UE. In some embodiments, the SL-RB configuration and the SL-RB operation status is received in sidelink RRC messages from an authorized UE. In some embodiments, the SL-RB configuration is received in a sidelink RRC message and the SL-RB operation status in a sidelink MAC CE message from an authorized UE. In some embodiments, the SL-RB configuration is received in a first sidelink MAC CE message and the SL-RB operation status is received in the second sidelink MAC CE message from an authorized UE. In some embodiments, the method further includes pre-configuring, based on the sidelink radio bearer pre-configuration message, at least one SL-RB to support unicast sidelink transmissions and at least one SL-RB to support groupcast transmissions. In some embodiments, the method further includes determining whether to activate, deactivate or switch between two SL-RB design types, in response to the SL-RB operation status message. In some embodiments, SL-RBs are configured to support sidelink transmission according to QoS requirements (PPPP/PPPR, bit rate, delay bound, reliability).

Another aspect of the disclosure provides a method of allocating sidelink radio resources by an authorized UE belonging to a platoon. Such a method includes sending a request for sidelink radio resource to a gNB (i.e., RAN node), the request containing the resource parameters including total estimated data volume required by all UEs in platoon, traffic pattern (i.e. timing information for groupcast and unicast transmissions, number of transmissions), geo-location of UEs in platoon/group. Such a method also includes receiving the resource configuration from gNB (i.e., RAN node), the resource configuration indicating the resource pool assigned to the platoon. Such a method also includes sending resource allocation messages to each member of the platoon. In some embodiments, the method further includes receiving a request for sidelink radio resources from a UE belonging to the platoon, the request containing the resource parameters including the estimated data volume UE identifier and the associated logical channel group identifier; determining the sidelink radio resources, based on the resource request received from the UE in platoon; and sending the resource grant and resource reservation to the UE in platoon, the resource grant and reservation indicating the determined resource allocation and validity duration of resources.

Other aspects of the disclosure provide further methods and devices as disclosed. For example, other aspects of the disclosure provide for electronic devices configured to execute the methods disclosed herein.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for configuring an AS-layer for sidelink data communications, the method comprising:
  receiving, by a first user equipment (UE) from a radio access network (RAN) node, configuration information for a sidelink signaling radio bearer;

configuring the sidelink signaling radio bearer based on the received configuration information for the sidelink signaling radio bearer to produce a preconfigured sidelink signaling radio bearer;

transmitting, by the first UE to a second UE using the preconfigured sidelink signaling radio bearer, an access stratum (AS)-layer configuration for configuring a sidelink data radio bearer for sidelink data communications in accordance with quality of service requirements for the sidelink data communications; and receiving, by the first UE, an AS-layer configuration complete message sent by the second UE using the preconfigured sidelink signaling radio bearer, the AS-layer configuration complete message indicating the AS-layer of the second UE has configured a sidelink data radio bearer of the second UE for sidelink data communications.

2. The method of claim 1, further comprising, prior to transmitting the AS-layer configuration,
receiving, by the first UE from the second UE, an indication of second UE's capability using the preconfigured sidelink signaling radio bearer.

3. The method of claim 1, further comprising:
transmitting a request, by the first UE to the second UE, for second UE's capability; and
receiving, by the first UE from the second UE, an indication of the second UE's capability using the preconfigured sidelink signaling radio bearer.

4. The method of claim 1, wherein the AS-layer configuration comprises at least one of: UE-Identifier (ID), Group-ID, sidelink component carrier configuration, SL-RB configuration for data communications, and resource allocation configuration.

5. The method of claim 1, wherein the preconfigured sidelink signaling radio bearer is a PC5 radio resource control (RRC) interface.

6. The method of claim 1, further comprising:
transmitting, by the first UE to the second UE, an AS-layer configuration modification message to modify the AS-layer configuration.

7. The method of claim 1, further comprising, prior to the transmitting:
transmitting, by the first UE to the RAN node in radio resource control (RRC) signaling, UE capability information of the first UE for supporting sidelink data communications.

8. The method of claim 7, further comprising:
receiving, by the first UE, in RRC signaling, the AS-layer configuration for the sidelink data radio bear; and
configuring, by an AS-layer of the first UE, a sidelink data radio bearer of the first UE based on the received AS-layer configuration for the sidelink data radio bearer, wherein the AS-layer configuration for the sidelink data radio bearer includes: at least one default sidelink data radio bearer to support unicast sidelink transmissions; and at least one default sidelink data radio bearer to support groupcast sidelink transmissions.

9. The method of claim 1, further comprising, prior to the transmitting:
receiving, by the first UE from the RAN node, in a system information block (SIB), configuration information for the sidelink signalling radio bearer.

10. The method of claim 9, further comprising:
receiving in the SIB, the AS-layer configuration for the sidelink data radio bearer; and configuring, by an AS-layer of the first UE, a sidelink data radio bearer of the first UE based on the received AS-layer configuration for the sidelink data radio bearer, wherein the AS-layer configuration for the sidelink data radio bearer includes: at least one default sidelink data radio bearer to support unicast sidelink transmissions; and at least one default sidelink data radio bearer to support groupcast sidelink transmissions.

11. The method of claim 1, wherein the AS-configuration is sent using RRC signaling or a MAC-CE message.

12. A user equipment (UE) comprising:
a processor;
a memory storing machine readable instructions which, when executed by the processor cause the UE to:
receive, from a radio access network (RAN) node, configuration information for a sidelink signaling radio bearer;
configure the sidelink signaling radio bearer based on the received configuration information for the sidelink signaling radio bearer to produce a preconfigured sidelink signaling radio bearer;
transmit to a second UE using the preconfigured sidelink signaling radio bearer, an access stratum (AS)-layer configuration for configuring a sidelink data radio bearer for sidelink data communications in accordance with quality of service requirements for the sidelink data communications; and
receive, from the second UE, an AS-layer configuration complete message sent by the second UE using the preconfigured sidelink signaling radio bearer, the AS-layer configuration complete message indicating the AS-layer of the second UE has configured a sidelink data radio bearer of the second UE for sidelink data communications.

13. The UE of claim 12, wherein the machine readable instructions which, when executed by the processor further cause the UE to:
receive, from the second UE, an indication of second UE's capability using the preconfigured sidelink signaling radio bearer.

14. The UE claim 12, wherein the machine readable instructions which, when executed by the processor further cause the UE to:
transmit a request to the second UE, for second UE's capability; and
receive, from the second UE, an indication of the second UE's capability using the preconfigured sidelink signaling radio bearer.

15. The UE of claim 12, wherein the AS-layer configuration comprises at least one of: UE-Identifier (ID), Group-ID, sidelink component carrier configuration, SL-RB configuration for data communications, and resource allocation configuration.

16. The UE of claim 12, wherein the preconfigured sidelink signaling radio bearer is a PC5 radio resource control (RRC) interface.

17. The UE of claim 12, wherein the machine readable instructions which, when executed by the processor further cause the UE to:
transmit to the second UE, an AS-layer configuration modification message to modify the AS-layer configuration.

18. The UE of claim 12, wherein the machine readable instructions which, when executed by the processor further cause the UE to:
prior to the transmission of the AS-layer configuration:

transmit to the RAN node in radio resource control (RRC) signaling, UE capability information of the first UE for supporting sidelink data communications.

19. The UE of claim 18, wherein the machine readable instructions which, when executed by the processor further cause the UE to:
receive in the RRC signaling, the AS-layer configuration for the sidelink data radio bearer; and
configure, by an AS-layer of the UE, a sidelink data radio bearer of the UE based on the received AS-layer configuration for the sidelink data radio bearer, wherein the AS-layer configuration for the sidelink data radio bearer includes: at least one default sidelink data radio bearer to support unicast sidelink transmissions; and at least one default sidelink data radio bearer to support groupcast sidelink transmissions.

20. The UE of claim 12, wherein the machine readable instructions which, when executed by the processor further cause the UE to:
prior to the transmission of the AS-layer configuration:
receive from the RAN node, in a system information block (SIB), configuration information for the sidelink signalling radio bearer.

21. The UE of claim 20, wherein the machine readable instructions which, when executed by the processor further cause the UE to:
receive in the SIB, the AS-layer configuration for the sidelink data radio bearer; and
configure, by an AS-layer of the UE, a sidelink data radio bearer of the UE based on the received AS-layer configuration for the sidelink data radio bearer, wherein the AS-layer configuration for the sidelink data radio bearer includes: at least one default sidelink data radio bearer to support unicast sidelink transmissions; and at least one default sidelink data radio bearer to support groupcast sidelink transmissions.

* * * * *

UNITED STATES PATENT AND TRADEMARK OFFICE
CERTIFICATE OF CORRECTION

PATENT NO. : 11,224,007 B2  
APPLICATION NO. : 16/677055  
DATED : January 11, 2022  
INVENTOR(S) : Jaya Rao, Sophie Vrzic and Hang Zhang Page 1 of 1

It is certified that error appears in the above-identified patent and that said Letters Patent is hereby corrected as shown below:

In the Claims

Column 37, Line 50, Claim 8, "configuration for the sidelink data radio bear; and" should be --configuration for the sidelink data radio bearer; and--

Signed and Sealed this  
Eleventh Day of October, 2022

Katherine Kelly Vidal  
*Director of the United States Patent and Trademark Office*